(12) United States Patent
Rahman et al.

(10) Patent No.: US 11,871,413 B2
(45) Date of Patent: Jan. 9, 2024

(54) METHOD AND APPARATUS FOR DYNAMIC BEAM INDICATION MECHANISM

(71) Applicant: Samsung Electronics Co., Ltd., Suwon-si (KR)

(72) Inventors: Md. Saifur Rahman, Plano, TX (US); Eko Onggosanusi, Coppell, TX (US); Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 98 days.

(21) Appl. No.: 17/231,810

(22) Filed: Apr. 15, 2021

(65) Prior Publication Data

US 2021/0337525 A1    Oct. 28, 2021

Related U.S. Application Data

(60) Provisional application No. 63/014,325, filed on Apr. 23, 2020, provisional application No. 63/043,036, filed on Jun. 23, 2020, provisional application No. 63/086,380, filed on Oct. 1, 2020, provisional application No. 63/091,102, filed on Oct. 13, 2020.

(51) Int. Cl.
*H04W 72/20* (2023.01)
*H04W 16/28* (2009.01)
*H04L 5/00* (2006.01)
*H04W 72/044* (2023.01)

(52) U.S. Cl.
CPC ........... *H04W 72/20* (2023.01); *H04L 5/0048* (2013.01); *H04W 16/28* (2013.01); *H04W 72/046* (2013.01)

(58) Field of Classification Search
CPC ............. H04W 72/0406; H04W 16/28; H04W 72/046; H04L 5/0048; H04L 5/0094; H04L 5/0023; H04L 5/0051; H04B 7/0404; H04B 7/0695
See application file for complete search history.

(56) References Cited

U.S. PATENT DOCUMENTS

| 2019/0141693 A1 | 5/2019 | Guo et al. |
| 2019/0222289 A1 | 7/2019 | Wilson et al. |

(Continued)

FOREIGN PATENT DOCUMENTS

| WO | 2019/097478 A1 | 5/2019 |

OTHER PUBLICATIONS

"3rd Generation Partnership Project; Technical Specification Group Radio Access Network; Evolved Universal Terrestrial Radio Access (E-UTRA); Physical channels and modulation (Release 16)", 3GPP TS 36.211 V16.4.0, Dec. 2020, 249 pages.

(Continued)

*Primary Examiner* — Eric Myers

(57) ABSTRACT

A method for operating a user equipment (UE) comprises receiving configuration information including a set of transmission configuration indicator (TCI) states; receiving a medium access control-control element (MAC-CE) indicating activation of M TCI states from the set of TCI states, where M is a positive integer; identifying a medium for indicating a TCI state update, wherein the medium is the MAC-CE or a downlink control information (DCI), and the TCI state update is from the M activated states; determining a beam based on the TCI state update; and applying the beam for a reception of both downlink (DL) control and data channels.

17 Claims, 20 Drawing Sheets

(56) References Cited

U.S. PATENT DOCUMENTS

| | | | | |
|---|---|---|---|---|
| 2019/0281587 | A1* | 9/2019 | Zhang | H04W 72/10 |
| 2020/0389883 | A1 | 12/2020 | Faxer et al. | |
| 2021/0314953 | A1* | 10/2021 | Park | H04W 76/11 |

OTHER PUBLICATIONS

"3rd Generation Partnership Project; Technical Specification Group Radio Access Network; Evolved Universal Terrestrial Radio Access (E-UTRA); Multiplexing and channel coding (Release 16)", 3GPP TS 36.212 V16.4.0, Dec. 2020, 254 pages.

"LTE; Evolved Universal Terrestrial Radio Access (E-UTRA); Physical layer procedures (3GPP TS 36.213 version 16.4.0 Release 16)", ETSI TS 136 213 V16.4.0, Feb. 2021, 577 pages.

"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 V16.3.0, Dec. 2020, 142 pages.

"LTE; Evolved Universal Terrestrial Radio Access (E-UTRA); Radio Resource Control (RRC); Protocol specification 3GPP TS 36.331 version 16.3.0 Release 16)", ETSI TS 136 331 V16.3.0, Jan. 2021, 1089 pages.

"3rd Generation Partnership Project; Technical Specification Group Radio Access Network; NR; Physical channels and modulation (Release 16)", 3GPP TS 38.211 V16.4.0, Dec. 2020, 133 pgs.

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)" 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"3rd Generation Partnership Project; Technical Specification Group Radio Access Network; NR; Physical layer measurements (Release 16)", 3GPP TS 38.215 V16.1.0, Mar. 2020, 22 pages.

"5G; NR; Medium Access Control (MAC) protocol specification (3GPP TS 38.321 version 16.1.0 Release 16)", ETSI TS 138 321 V16.1.0, Jul. 2020, 153 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

Apple Inc., "Remaining Issues on Multi-beam operation", 3GPP TSG RAN WG1 #100b, Apr. 20-30, 2020, R1-2002338, 10 pages.

ZTE, "Maintenance of enhancements on multi-beam operation", 3GPP TSG RAN WG1 Meeting #100bis-e, Apr. 20-30, 2020, R1-2001597, 13 pages.

International Search Report dated Jul. 21, 2021 in connection with International Patent Application No. PCT/KR2021/004998, 3 pages.

Written Opinion of the International Searching Authority dated Jul. 21, 2021 in connection with International Patent Application No. PCT/KR2021/004998, 4 pages.

Extended European Search Report dated Oct. 11, 2023 regarding Application No. 21792341.6, 10 pages.

Huawei et al., "MAC CE signalling enhancement for TCI indication of single-PDCCH based multi-TRP transmission", 3GPP TSG-RAN WG2 Meeting#108, R2-1914674, Nov. 2019, 5 pages.

Futurewei, TP on Multi-TRP/Panel Transmission, 3GPP TSG RAN WG1 #100bis-e, R1-2002052, Apr. 2020, 10 pages.

* cited by examiner

METHOD AND APPARATUS FOR DYNAMIC BEAM INDICATION MECHANISM

CROSS-REFERENCE TO RELATED APPLICATIONS AND CLAIM OF PRIORITY

The present application claims priority to U.S. Provisional Patent Application No. 63/014,325, filed on Apr. 23, 2020, U.S. Provisional Patent Application No. 63/043,036 filed on Jun. 23, 2020, U.S. Provisional Patent Application No. 63/086,380, filed on Oct. 1, 2020, and U.S. Provisional Patent Application No. 63/091,102 filed on Oct. 13, 2020. The content of the above-identified patent documents is incorporated herein by reference.

TECHNICAL FIELD

The present disclosure relates generally to wireless communication systems and more specifically to methods for dynamic beam indication.

BACKGROUND

Understanding and correctly estimating the channel between a user equipment (UE) and a base station (BS) (e.g., gNode B (gNB)) is important for efficient and effective wireless communication. In order to correctly estimate the DL channel conditions, the gNB may transmit a reference signal, e.g., CSI-RS, to the UE for DL channel measurement, and the UE may report (e.g., feedback) information about channel measurement, e.g., CSI, to the gNB. With this DL channel measurement, the gNB is able to select appropriate communication parameters to efficiently and effectively perform wireless data communication with the UE. For a millimeter wave communication systems, the reference signal can correspond to a spatial beam, and the CSI can correspond to a beam report which indicates a preferred spatial beam for communication. In such beamformed systems, a beam indication mechanism is needed in order to align the spatial beams at both gNB and UE.

SUMMARY

Embodiments of the present disclosure provide methods and apparatuses to enable dynamic beam indication in a wireless communication system.

In one embodiment, a UE in a wireless communication system is provided. The UE includes a transceiver configured to receive configuration information including a set of transmission configuration indicator (TCI) states, and receive a medium access control-control element (MAC-CE) indicating activation of M TCI states from the set of TCI states, where M is a positive integer. The UE further includes a processor operably coupled to the transceiver. The processor is configured to identify a medium for indicating a TCI state update, wherein the medium is the MAC-CE or a downlink control information (DCI) received via the transceiver, and the TCI state update is from the M activated states, determine a beam based on the TCI state update, and apply the beam for a reception of both downlink (DL) control and data channels, wherein: a TCI state refers to at least one source reference signal (RS) with a corresponding quasi co-location (QCL) type, the QCL type is a type of a QCL property associated with the at least one source RS, and the beam refers to the QCL type being set to a spatial property used to receive or transmit the at least one source RS included in the TCI state update.

In another embodiment, a BS in a wireless communication system is provided. The BS includes a processor configured to generate configuration information including a set of transmission configuration indicator (TCI) states, and generate a medium access control-control element (MAC-CE) indicating activation of M TCI states from the set of TCI states, where M is a positive integer. The BS further includes a transceiver operably coupled to the processor. The transceiver is configured to: transmit the configuration information, transmit, via a medium, a TCI state update indicating a beam from the M activated TCI states, wherein the medium is the MAC-CE or a downlink control information (DCI), and transmit downlink (DL) control and data channels for reception via the indicated beam, wherein: a TCI state refers to at least one source reference signal (RS) with a corresponding quasi co-location (QCL) type, the QCL type is a type of a QCL property associated with the at least one source RS, and the beam refers to the QCL type being set to a spatial property used to receive or transmit the at least one source RS included in the TCI state update.

In yet another embodiment, a method for operating a UE is provided. The method comprises: receiving configuration information including a set of transmission configuration indicator (TCI) states; receiving a medium access control-control element (MAC-CE) indicating activation of M TCI states from the set of TCI states, where M is a positive integer; identifying a medium for indicating a TCI state update, wherein the medium is the MAC-CE or a downlink control information (DCI), and the TCI state update is from the M activated states; determining a beam based on the TCI state update; and applying the beam for a reception of both downlink (DL) control and data channels, wherein: a TCI state refers to at least one source reference signal (RS) with a corresponding quasi co-location (QCL) type, the QCL type is a type of a QCL property associated with the at least one source RS, and the beam refers to the QCL type being set to a spatial property used to receive or transmit the at least one source RS included in the TCI state update.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
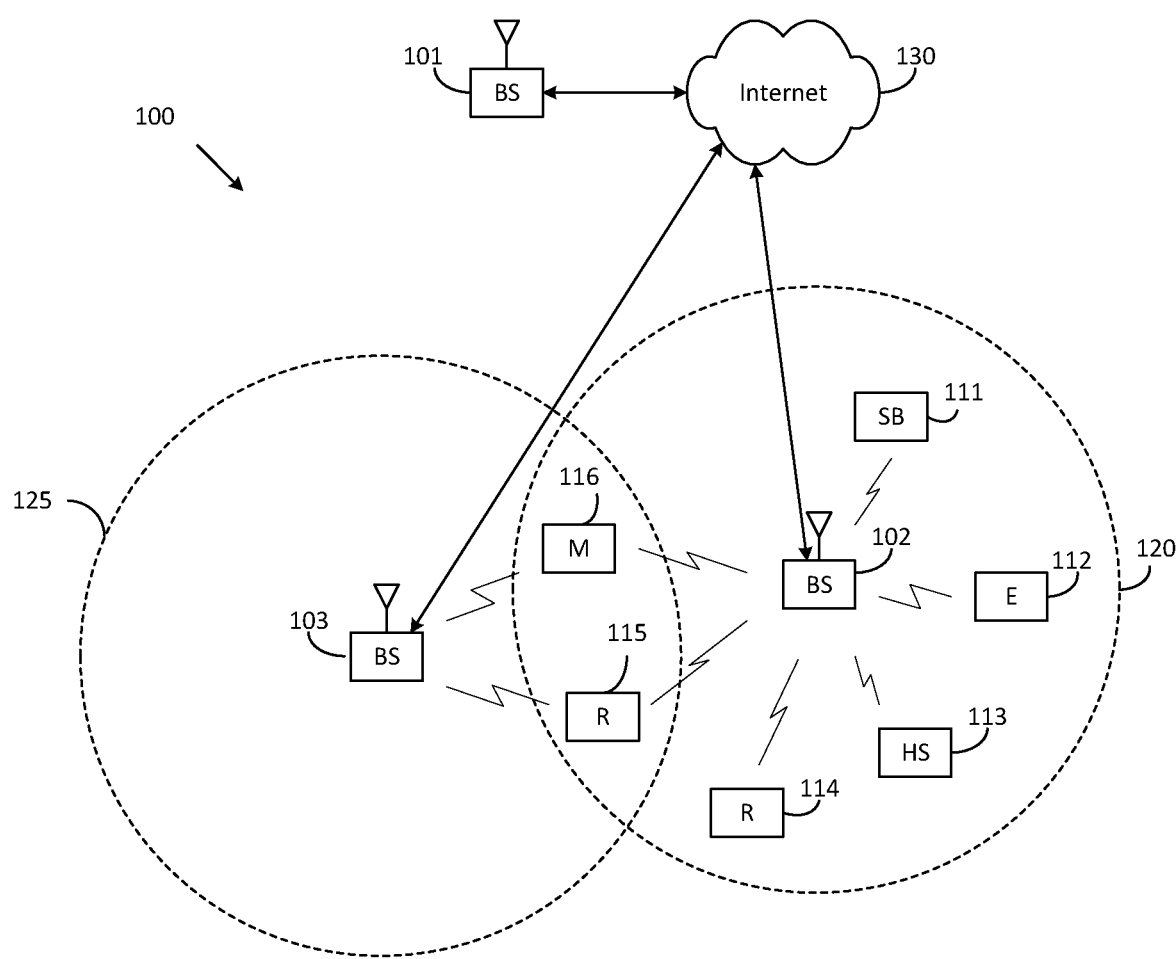
FIG. 1 illustrates an example wireless network according to embodiments of the present disclosure.

FIG. 1 through FIG. 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.4.0, "E-UTRA, Physical channels and modulation" (herein "REF 1"); 3GPP TS 36.212 v16.4.0, "E-UTRA, Multiplexing and Channel coding" (herein "REF 2"); 3GPP TS 36.213 v16.4.0, "E-UTRA, Physical Layer Procedures" (herein "REF 3"); 3GPP TS 36.321 v16.3.0, "E-UTRA, Medium Access Control (MAC) protocol specification" (herein "REF 4"); 3GPP TS 36.331 v16.3.0, "E-UTRA, Radio Resource Control (RRC) protocol specification" (herein "REF 5"); 3GPP TS 38.211 v16.4.0, "NR, Physical channels and modulation" (herein "REF 6"); 3GPP TS 38.212 v16.1.0, "NR, Multiplexing and Channel coding" (herein "REF 7"); 3GPP TS 38.213 v16.1.0, "NR, Physical Layer Procedures for Control" (herein "REF 8"); 3GPP TS 38.214 v16.1.0, "NR, Physical Layer Procedures for Data" (herein "REF 9"); 3GPP TS 38.215 v16.1.0, "NR, Physical Layer Measurements" (herein "REF 10"); 3GPP TS 38.321 v16.1.0; 3GPP TS 38.321 "NR, Medium Access Control (MAC) protocol specification" (herein "REF 11"); and 3GPP TS 38.331 v16.1.0, "NR, Radio Resource Control (RRC) Protocol Specification" (herein "REF 12").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
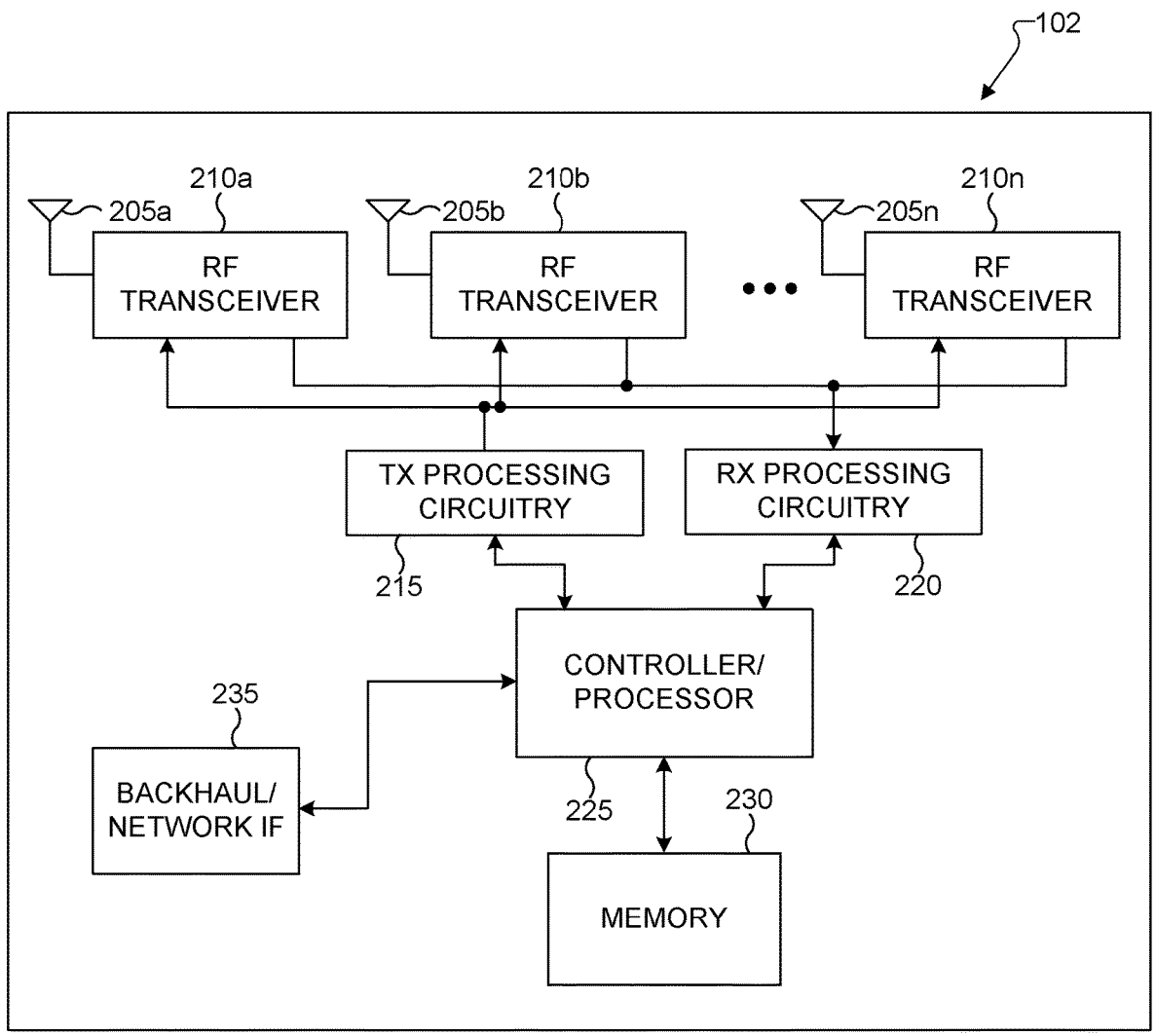
FIG. 2 illustrates an example gNB according to embodiments of the present disclosure.
Figure 3:
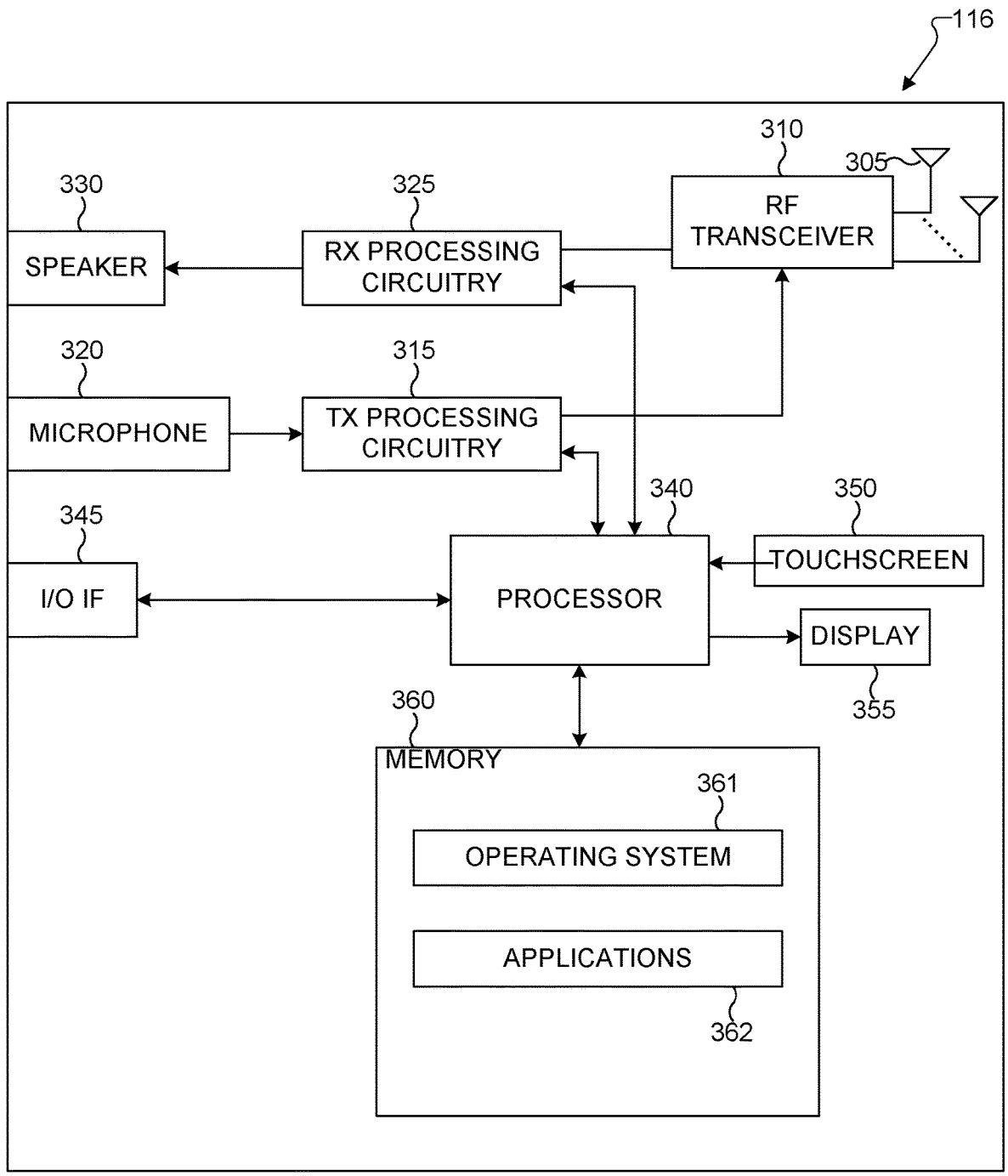
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for receiving configuration information including a set of transmission configuration indicator (TCI) states; receiving a medium access control-control element (MAC-CE) indicating activation of M TCI states from the set of TCI states, where M is a positive integer; identifying a medium for indicating a TCI state update, wherein the medium is the MAC-CE or a downlink control information (DCI), and the TCI state update is from the M activated states; determining a beam based on the TCI state update; and applying the beam for a reception of both downlink (DL) control and data channels, wherein: a TCI state refers to at least one source reference signal (RS) with a corresponding quasi co-location (QCL) type, the QCL type is a type of a QCL property associated with the at least one source RS, and the beam refers to the QCL type being set to a spatial property used to receive or transmit the at least one source RS included in the TCI state update. One or more of the gNBs 101-103 includes circuitry, programing, or a combination thereof, for generating configuration information including a set of transmission configuration indicator (TCI) states; generating a medium access control-control element (MAC-CE) indicating activation of M TCI states from the set of TCI states, where M is a positive integer; transmitting the configuration information; transmitting, via a medium, a TCI state update indicating a beam from the M activated TCI states, wherein the medium is the MAC-CE or a downlink control information (DCI); and transmitting downlink (DL) control and data channels for reception via the indicated beam, wherein: a TCI state refers to at least one source reference signal (RS) with a corresponding quasi co-location (QCL) type, the QCL type is a type of a QCL property associated with the at least one source RS, and the beam refers to the QCL type being set to a spatial property used to receive or transmit the at least one source RS included in the TCI state update.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for receiving configuration information including a set of transmission configuration indicator (TCI) states; receiving a medium access control-control element (MAC-CE) indicating activation of M TCI states from the set of TCI states, where M is a positive integer; identifying a medium for indicating a TCI state update, wherein the medium is the MAC-CE or a downlink control information (DCI), and the TCI state update is from the M activated states; determining a beam based on the TCI state update; and applying the beam for a reception of both downlink (DL) control and data channels, wherein: a TCI state refers to at least one source reference signal (RS) with a corresponding quasi co-location (QCL) type, the QCL type is a type of a QCL property associated with the at least one source RS, and the beam refers to the QCL type being set to a spatial property used to receive or transmit the at least one source RS included in the TCI state update. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
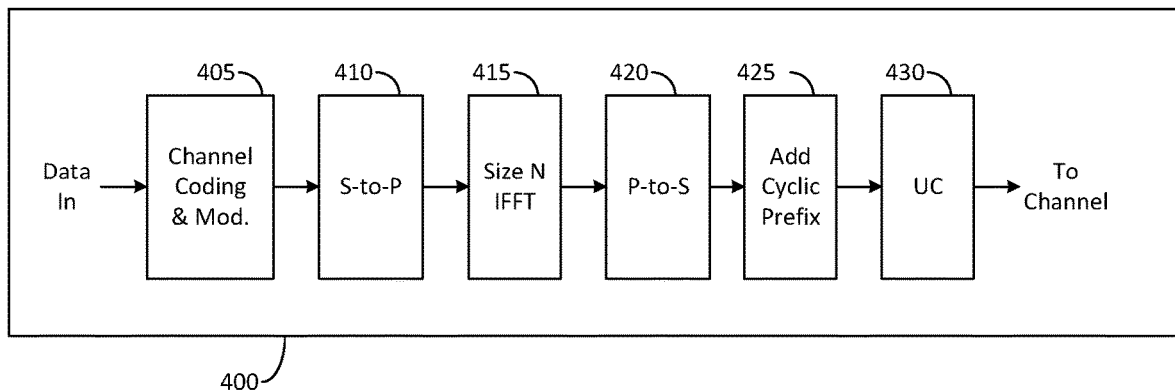
FIG. 4A illustrates a high-level diagram of an orthogonal frequency division multiple access transmit path according to embodiments of the present disclosure.
Figure 4B:
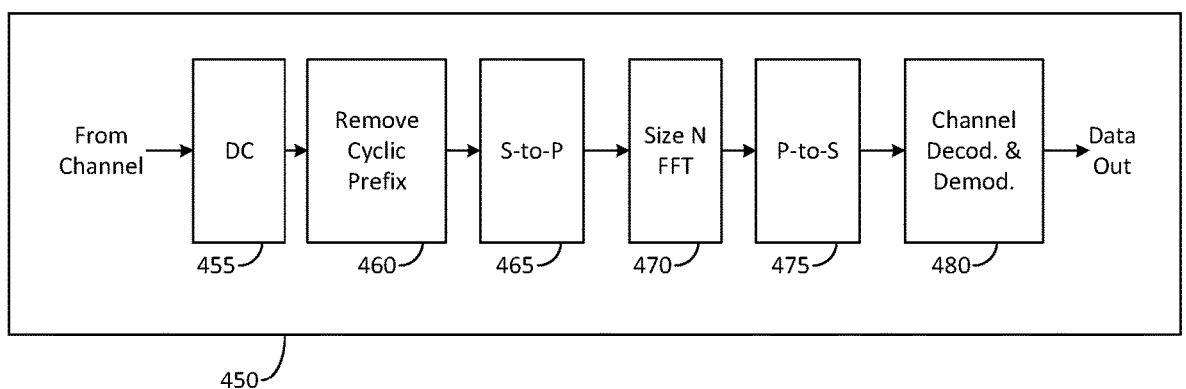
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460 and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNB s 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNB s 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{EPDCCH}$ sub-carriers, or resource elements (REs), such as 12 REs. A unit of one RB over one subframe is referred to as a PRB. A UE can be allocated $n_s = (n_{s0} + y \cdot N_{EPDCCH}) \mod D$ RBs for a total of $Z = O_F + \lfloor (n_{s0} + y \cdot N_{EPDCCH})/D \rfloor$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb} = 2 \cdot (N_{symb}^{UL} - 1) - N_{SRS}$, where $N_{SRS} = 1$ if a last subframe symbol is used to transmit SRS and $N_{SRS} = 0$ otherwise.

Figure 5:
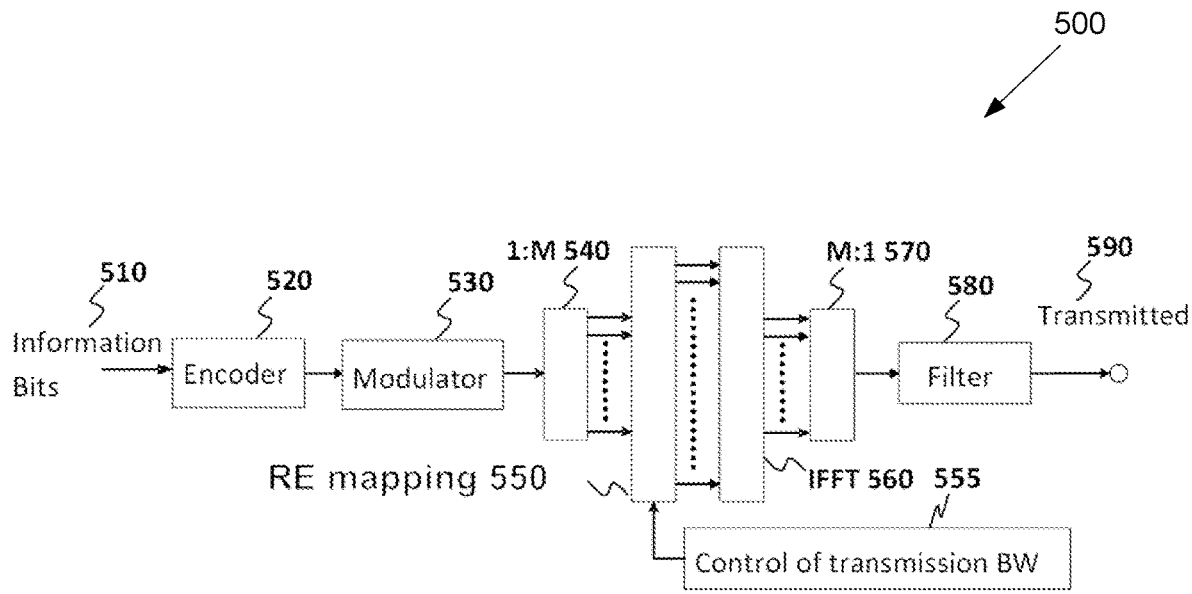
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
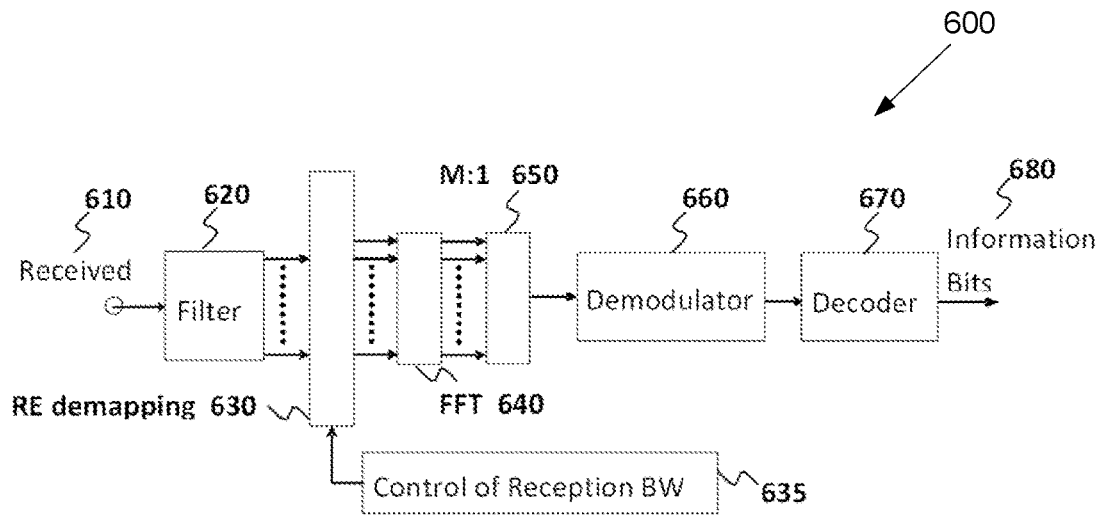
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
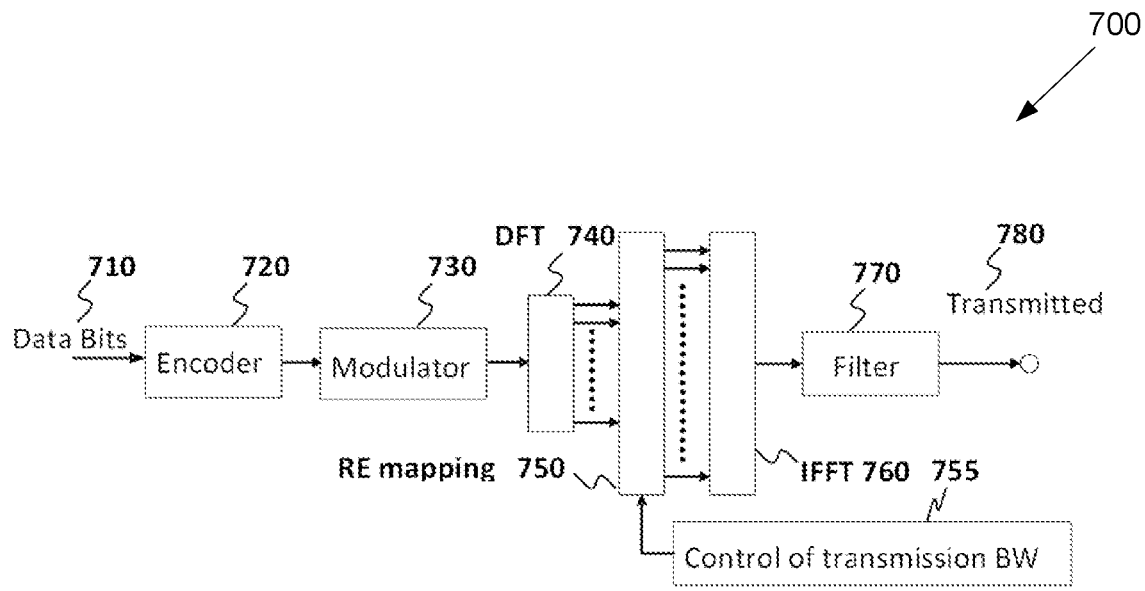
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
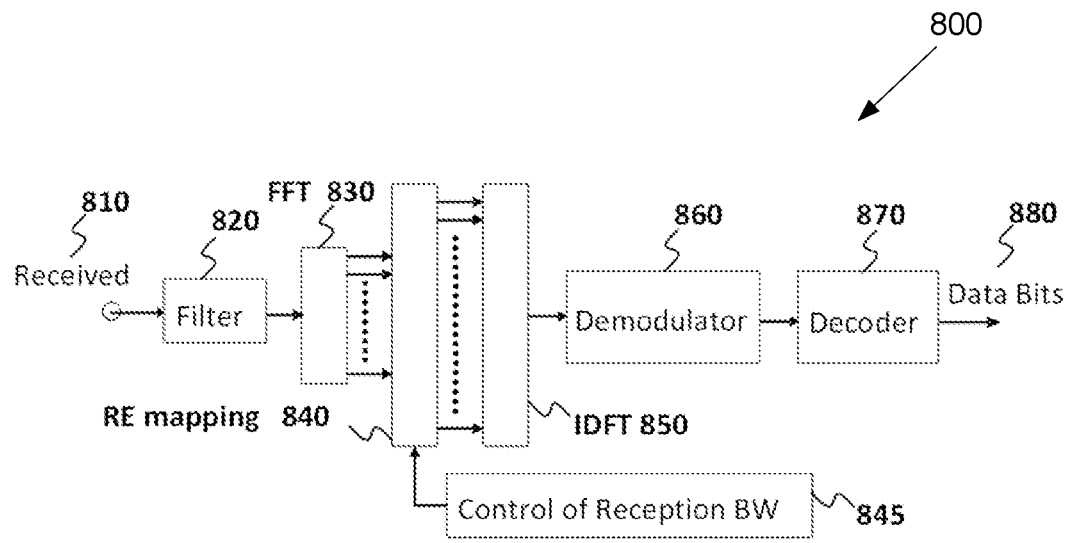
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases have been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km$^2$ with less stringent the reliability, data rate, and latency requirements.

In order for the 5G network to support such diverse services with different quality of services (QoS), one scheme has been identified in 3GPP specification, called network slicing.

To utilize PHY resources efficiently and multiplex various slices (with different resource allocation schemes, numerologies, and scheduling strategies) in DL-SCH, a flexible and self-contained frame or subframe design is utilized.

Figure 9:
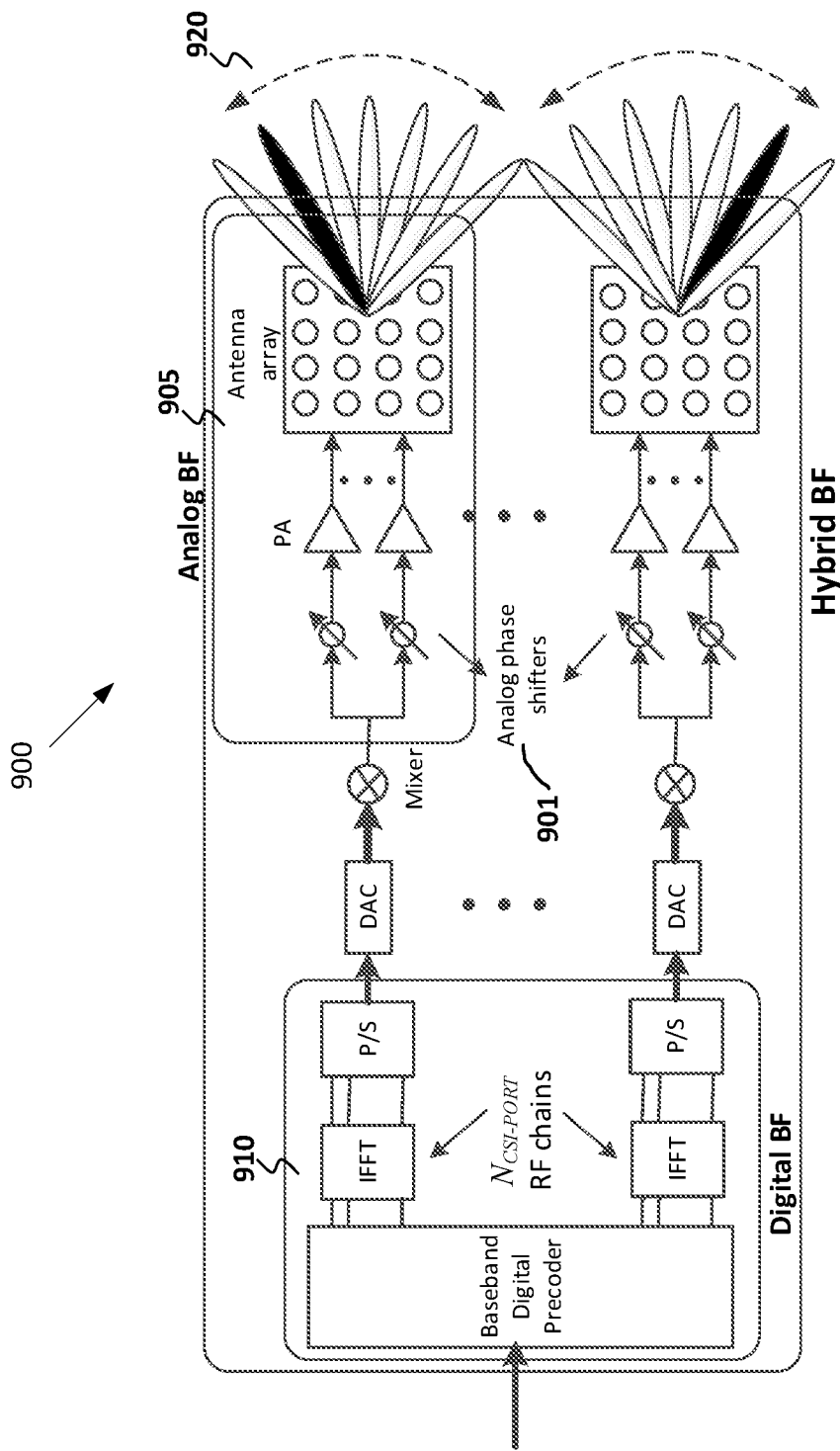
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. One or more of the components illustrated in FIG. 9 can be implemented in specialized circuitry configured to perform the noted functions or one or more of the components can be implemented by one or more processors executing instructions to perform the noted functions. FIG. 9 does not limit the scope of this disclosure to any particular implementation of the multiplexing of two slices 900.

The 3GPP NR specification supports up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901. One CSI-RS port can then correspond to one sub-array which produces a narrow analog beam through analog beamforming 905. This analog beam can be configured to sweep across a wider range of angles (920) by varying the phase shifter bank across symbols or subframes. The number of sub-arrays (equal to the number of RF chains) is the same as the number of CSI-RS ports $N_{CSI\text{-}PORT}$. A digital beamforming unit 910 performs a linear combination across $N_{CSI\text{-}PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss@100 m distance), larger number of and sharper analog beams (hence larger number of radiators in the array) will be needed to compensate for the additional path loss.

In 3GPP LTE and NR (new radio access or interface), network access and radio resource management (RRM) are enabled by physical layer synchronization signals and higher (MAC) layer procedures. In particular, a UE attempts to detect the presence of synchronization signals along with at least one cell ID for initial access. Once the UE is in the network and associated with a serving cell, the UE monitors several neighboring cells by attempting to detect their synchronization signals and/or measuring the associated cell-specific RSs (for instance, by measuring their RSRPs). For next generation cellular systems, efficient and unified radio resource acquisition or tracking mechanism which works for various use cases (such as eMBB, URLLC, mMTC, each corresponding to a different coverage requirement) and frequency bands (with different propagation losses) is desirable. Most likely designed with a different network and radio resource paradigm, seamless and low-latency RRM is also desirable. Such goals pose at least the following problems in designing an access, radio resource, and mobility management framework.

First, since NR is likely to support even more diversified network topology, the notion of cell can be redefined or replaced with another radio resource entity. As an example, for synchronous networks, one cell can be associated with a plurality of TRPs (transmit-receive points) similar to a COMP (coordinated multipoint transmission) scenario in LTE. In this case, seamless mobility is a desirable feature. Second, when large antenna arrays and beamforming are utilized, defining radio resource in terms of beams (although possibly termed differently) can be a natural approach. Given that numerous beamforming architectures can be utilized, an access, radio resource, and mobility management framework which accommodates various beamforming architectures (or, instead, agnostic to beamforming architecture) is desirable. For instance, the framework should be applicable for or agnostic to whether one beam is formed for one CSI-RS port (for instance, where a plurality of analog ports are connected to one digital port, and a plurality of widely separated digital ports are utilized) or one beam is formed by a plurality of CSI-RS ports. In addition, the framework should be applicable whether beam sweeping (as illustrated in FIG. 9) is used or not. Third, different frequency bands and use cases impose different coverage limitations. For example, mmWave bands impose large propagation losses. Therefore, some form of coverage enhancement scheme is needed. Several candidates include beam sweeping (cf. FIG. 9), repetition, diversity, and/or multi-TRP transmission. For mMTC where transmission bandwidth is small, time-domain repetition is needed to ensure sufficient coverage.

A prerequisite to seamless access is significant reduction of higher-layer procedures for UEs which are already connected to the network. For instance, the existence of cell boundaries (or in general the notion of cells) necessitates RRC (L3) reconfiguration as a UE moves from one cell to another (i.e., inter-cell mobility). For heterogeneous networks with closed subscriber groups, additional overhead associated with higher layer procedures may further tax the system. This can be achieved by relaxing the cell boundaries thereby creating a large "super-cell" wherein a large number of UEs can roam. In this case, high capacity MIMO transmission (especially MU-MIMO) becomes more prevalent. While this presents an opportunity to increase system capacity (measured in terms of the number of sustainable UEs), it requires a streamlined MIMO design. This poses a challenge if applied in the current system.

Therefore, there is a need for an access, radio resource, and mobility management framework which facilitates seamless access by reducing the amount of higher layer procedures. In addition, there is also a need for a streamlined MIMO design that facilitates high capacity MIMO transmission.

In the 3GPP NR specification, multi-beam operation is designed primarily for single transmit-receive point (TRP) and single antenna panel. Therefore, the specification supports beam indication for one TX beam wherein a TX beam is associated with a reference RS. For DL beam indication and measurement, the reference RS can be NZP (non-zero power) CSI-RS and/or SSB (synchronization signal block, which includes primary synchronization signal, secondary synchronization signal, and PBCH). Here, DL beam indication is done via the transmission configuration indicator (TCI) field in DL-related DCI which includes an index to one (and only one) assigned reference RS. A set of hypotheses or the so-called TCI states is configured via higher-layer (RRC) signaling and, when applicable, a subset of those TCI states is selected/activated via MAC CE for the TCI field code points. For UL beam indication and measurement, the reference RS can be NZP CSI-RS, SSB, and/or SRS. Here, UL beam indication is done via the SRS resource indicator (SRI) field in UL-related DCI which is linked to one (and only one) reference RS. This linkage is configured via higher-layer signaling using the SpatialRelationInfo RRC parameter. Essentially, only one TX beam is indicated to the UE.

In the 3GPP NR specification, beam management was designed to share the same framework as CSI acquisition. This, however, compromises the performance of beam management especially for FR2. This is because beam management operates mainly with analog beams (characteristic of FR2) which paradigmatically differ from CSI acquisition (designed with FR1 in mind). Consequently, the 3GPP NR specification beam management becomes cumbersome and is unlikely able to keep up with more aggressive use cases which require large number of beams and fast beam switching (e.g., higher frequency bands, high mobility, and/or larger number of narrower analog beams). In addition, the 3GPP NR specification was designed to accommodate a number of unknown or rudimentary capabilities (e.g., UEs not capable of beam correspondence). To be flexible, it results in a number of options. This becomes burdensome to L1 control signaling and therefore a number of reconfigurations are performed via RRC signaling (higher-layer configuration). While this avoids L1 control overhead, it either results in high latency (if reconfiguration is performed sparsely) or imposes high usage of PDSCH (since RRC signaling consumes PDSCH resources).

In the 3GPP NR specification, the handover procedure to handle inter-cell mobility, similar to LTE, and relies heavily on RRC (and even higher layer) reconfigurations to update cell-specific parameters. Such reconfigurations usually are slow and incur large latency (up to several milliseconds). For high mobility UEs, this issue gets worse due to the need for more frequency handovers, hence more frequency RRC reconfigurations.

For high mobility UEs in FR2, the two latency issues mentioned above, one with the hierarchical NW structure (with visible cell boundaries) and the other with the beam management, compound together and make the latency issue much worse, and lead to frequent radio link failures (RLFs). Therefore, there is a need for solutions/mechanisms which can reduce RLFs for high mobility UEs in FR2.

One such solution/mechanism is based on a unified TCI state (beam indication) framework wherein a common beam (or TCI state) is used for (associated with) the transmission/reception of both data (PDSCH/PUSCH) and control (PDCCH/PUCCH), and also for DL and UL (for example, when beam correspondence holds between DL and UL). In this common beam (or TCI state) based multi-beam operation, the common beam (TCI state) indication/update has to happen prior to (separately from) the transmission/reception of the control information (e.g., DL/UL-related DCI in PDCCH) scheduling a DL assignment for DL data (PDSCH) or an UL grant for UL data (PUSCH). Note that a common beam based multi-beam operation is supported in the 3GPP NR specification beam management, wherein a common beam for DL data (PDSCH) and control (PDCCH) is indicated via a MAC CE based signaling (when the higher layer parameter tci-PresentInDCI in PDSCH-Config is not 'enabled'). Such MAC-CE based common beam activation, however, is too sluggish due to the reasons explained above.

Since the TCI state for the data beam is updated in a time slot (or subframe) prior to the slot (or subframe) carrying the DCI scheduling the DL assignment or the UL grant, there might be some performance loss when compared with the case when the TCI state update for the data beam is performed together with the DL assignment or the UL grant. This issue can be much worse for high mobility UEs which require frequent/accurate update of data beam for seamless data transmission/reception. In this disclosure, several embodiments and examples are provided to address this issue.

In the present disclosure, the term "activation" describes an operation wherein a UE receives and decodes a signal from the network (or gNB) that signifies a starting point in time. The starting point can be a present or a future slot/subframe or symbol—the exact location either implicitly or explicitly indicated, or otherwise fixed or higher-layer configured. Upon successfully decoding the signal, the UE responds accordingly. The term "deactivation" describes an operation wherein a UE receives and decodes a signal from the network (or gNB) that signifies a stopping point in time. The stopping point can be a present or a future slot/subframe or symbol—the exact location either implicitly or explicitly indicated, or otherwise fixed or higher-layer configured. Upon successfully decoding the signal, the UE responds accordingly.

Terminology such as TCI, TCI states, SpatialRelationInfo, target RS, reference RS, and other terms is used for illustrative purposes and therefore not normative. Other terms that refer to the same functions can also be used.

A "reference RS" corresponds to a set of characteristics of DL or UL TX beam, such as direction, precoding/beamforming, number of ports, etc. For instance, as the UE receives a reference RS index/ID in a DL assigned represented by a TCI state, the UE applies the known characteristics of the reference RS to the assigned DL transmission. The reference RS can be received and measured by the UE (in this case, the reference RS is a downlink signal such as NZP CSI-RS and/or SSB) with the result of the measurement used for calculating a beam report (in the 3GPP NR specification, at least one L1-RSRP accompanied by at least one CRI). As the NW/gNB receives the beam report, the NW can be better equipped with information to assign a particular DL TX beam to the UE. Optionally, the reference RS can be transmitted by the UE (in this case, the reference RS is a downlink signal such as SRS). As the NW/gNB receives the reference RS, the NW/gNB can measure and calculate the needed information to assign a particular DL TX beam to the UE. This option is applicable when DL-UL beam pair correspondence holds.

The reference RS can be dynamically triggered by the NW/gNB (e.g., via DCI in case of aperiodic RS), preconfigured with a certain time-domain behavior (such as periodicity and offset, in case of periodic RS), or a combination of such pre-configuration and activation/deactivation (in case of semi-persistent RS).

The following embodiment is an example of DL multi-beam operation that utilizes DL beam indication after the network (NW) receives some transmission from the UE. In the first example embodiment, aperiodic CSI-RS is transmitted by the NW and measured by the UE. Although aperiodic RS is used in these two examples, periodic or semi-persistent RS can also be used.

For mmWave (or FR2) or higher frequency bands (such as >52.6 GHz or FR4) where multi-beam operation is especially relevant, transmission-reception process includes the receiver to select a receive (RX) beam for a given TX beam. For UL multi-beam operation, the gNB selects an UL RX beam for every UL TX beam (which corresponds to a reference RS). Therefore, when UL RS (such as SRS and/or DMRS) is used as reference RS, the NW/gNB triggers or configures the UE to transmit the UL RS (which is associated with a selection of UL TX beam). The gNB, upon receiving and measuring the UL RS, selects an UL RX beam. As a result, a TX-RX beam pair is derived. The NW/gNB can perform this operation for all the configured reference RSs (either per reference RS or "beam sweeping") and determine all the TX-RX beam pairs associated with all the reference RSs configured to the UE. On the other hand, when DL RS (such as CSI-RS and/or SSB) is used as reference RS (pertinent when DL-UL beam correspondence or reciprocity holds), the NW/gNB transmit the RS to the UE (for UL and by reciprocity, this corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this knowledge is unavailable to the NW/gNB, the UE—upon receiving a reference RS (hence UL RX beam) indication from the NW/gNB—can select the UL TX beam from the knowledge on all the TX-RX beam pairs.

In the present disclosure, the term "Resource Indicator", also abbreviated as REI, is used to refer to an indicator of RS resource used for signal/channel and./or interference measurement. This term is used for illustrative purposes and hence can be substituted with any other term that refers to the same function. Examples of REI include the aforementioned CSI-RS resource indicator (CRI) and SSB resource indicator (SSB-RI). Any other RS can also be used for signal/channel and/or interference measurement such as DMRS.

Figure 10:
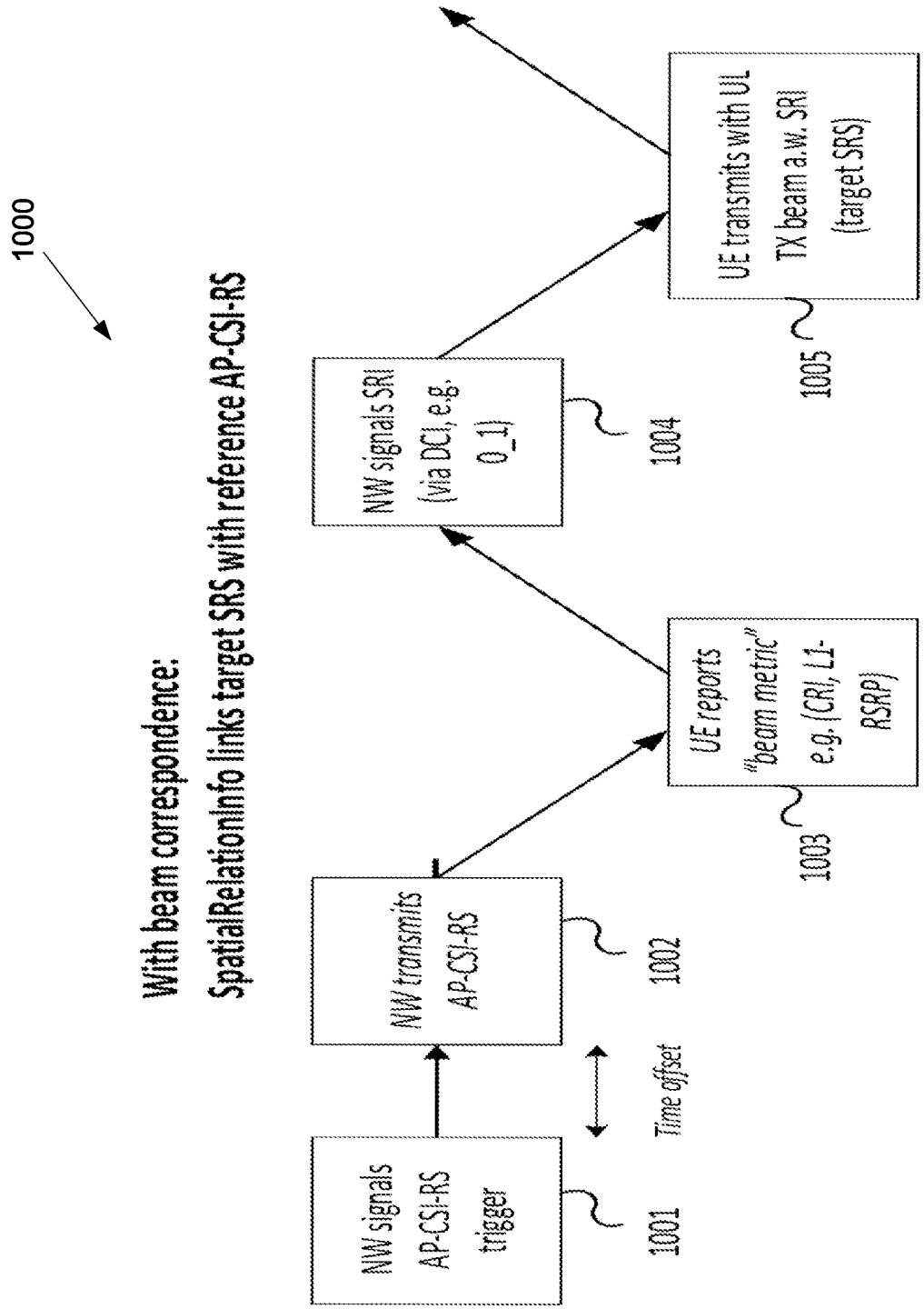
FIG. 10 illustrates an uplink multi-beam operation according to embodiments of the present disclosure.

In one example illustrated in FIG. 10, an UL multi-beam operation 1000 is shown. The embodiment of the UL multi-beam operation 1000 illustrated in FIG. 10 is for illustration only. FIG. 10 does not limit the scope of this disclosure to any particular implementation of the UL multi-beam operation 1000.

The UL multi-beam operation 1000 starts with starts with the gNB/NW signaling to a UE an aperiodic CSI-RS (AP-CSI-RS) trigger or indication (step 1001). This trigger or indication can be included in a DCI (either UL-related or DL-related, either separately or jointly signaled with an aperiodic CSI request/trigger) and indicate transmission of AP-CSI-RS in a same (zero time offset) or later slot/subframe (>0 time offset). Upon receiving the AP-CSI-RS transmitted by the gNB/NW (step 1002), the UE measures the AP-CSI-RS and, in turn, calculates and reports a "beam metric" (indicating quality of a particular TX beam hypothesis) (step 1003). Examples of such beam reporting are CSI-RS resource indicator (CRI) or SSB resource indicator (SSB-RI) coupled with its associated L1-RSRP/L1-RSRQ/L1-SINR/CQI. Upon receiving the beam report from the UE, the NW can use the beam report to select an UL TX beam for the UE and indicate the UL TX beam selection (step 1004) using the SRI field in the UL-related DCI (that carries the UL grant, such as DCI format 0_1 in NR). The SRI corresponds to a "target" SRS resource that is linked to a reference RS (in this case, an AP-CSI-RS) via SpatialRelationInfo configuration. Upon successfully decoding the UL-related DCI with the SRI, the UE performs UL transmission (such as data transmission on PUSCH) with the UL TX beam associated with the SRI (step 1005).

Figure 11:
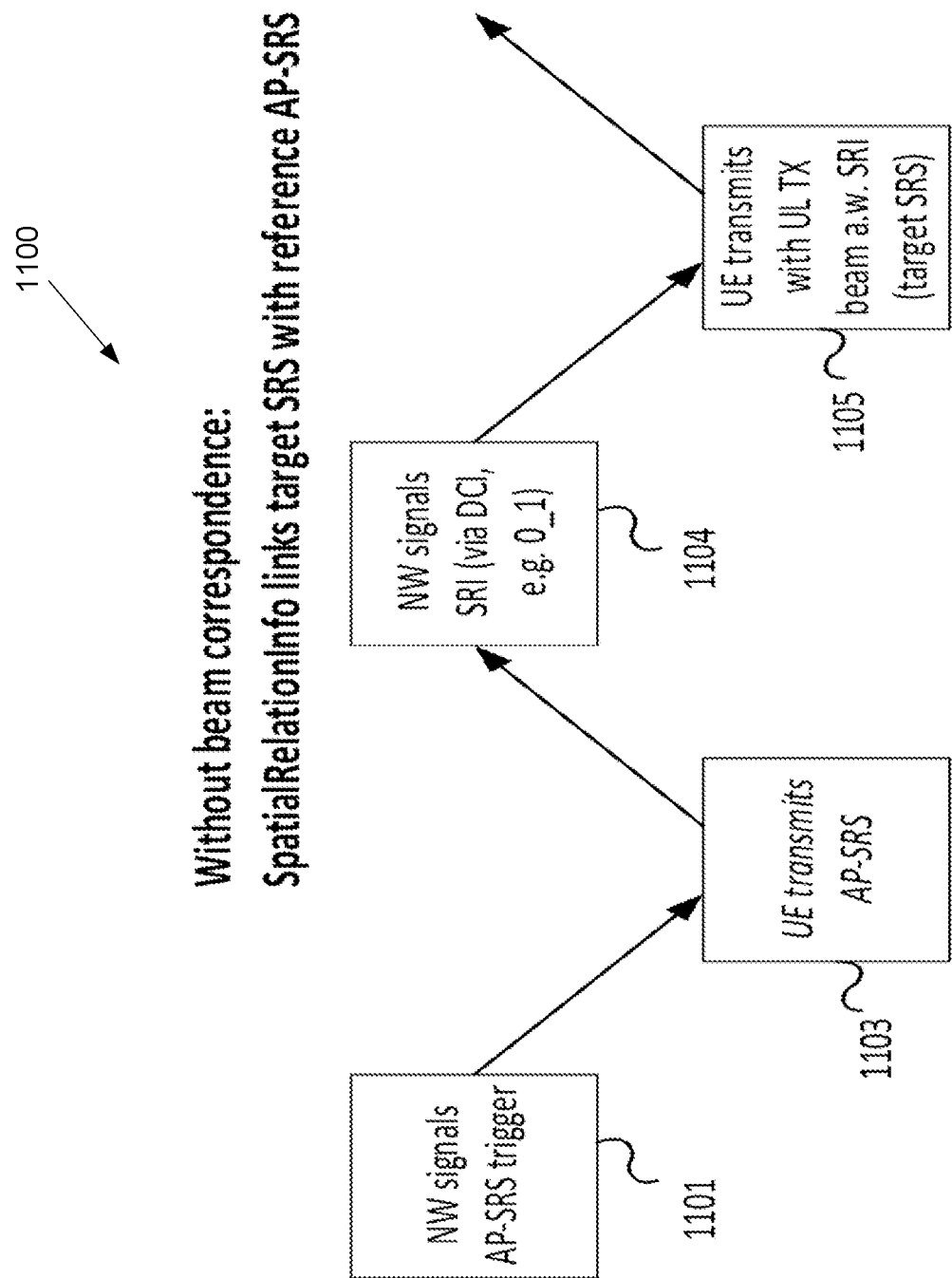
FIG. 11 illustrates an uplink multi-beam operation according to embodiments of the present disclosure.

In another example illustrated in FIG. 11, an UL multi-beam operation 1100 is shown. The embodiment of the UL multi-beam operation 1100 illustrated in FIG. 11 is for illustration only. FIG. 11 does not limit the scope of this disclosure to any particular implementation of the UL multi-beam operation 1100.

The UL multi-beam operation 1100 starts with the gNB/NW signaling to a UE an aperiodic SRS (AP-SRS) trigger or request (step 1101). This trigger can be included in a DCI (either UL-related or DL-related). Upon receiving and decoding the AP-SRS trigger (step 1102), the UE transmits AP-SRS to the gNB/NW (step 1103) so that the NW (or gNB) can measure the UL propagation channel and select an UL TX beam for the UE. The gNB/NW can then indicate the UL TX beam selection (step 1104) using the SRI field in the UL-related DCI (that carries the UL grant, such as DCI format 0_1 in NR). The SRI corresponds to a "target" SRS resource that is linked to a reference RS (in this case, an AP-SRS) via SpatialRelationInfo configuration. Upon successfully decoding the UL-related DCI with the SRI, the UE performs UL transmission (such as data transmission on PUSCH) with the UL TX beam associated with the SRI (step 1105).

Figure 12:
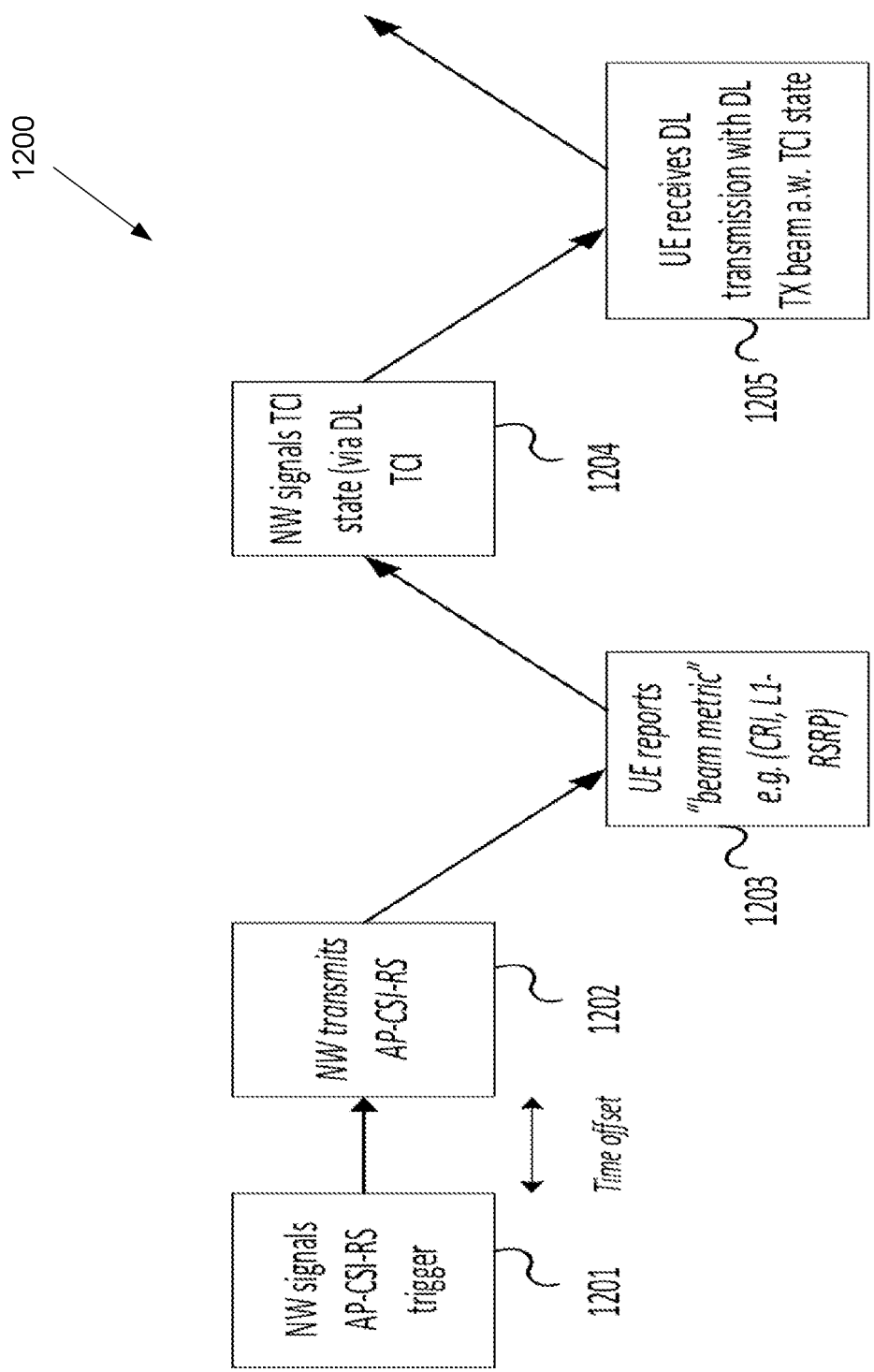
FIG. 12 illustrates a downlink multi-beam operation according to embodiments of the present disclosure.

In another example illustrated in FIG. 12, a DL multi-beam operation 1200 is shown. The embodiment of the DL multi-beam operation 1200 illustrated in FIG. 12 is for illustration only. FIG. 12 does not limit the scope of this disclosure to any particular implementation of the DL multi-beam operation 1200.

In the example illustrated in FIG. 12, where a UE is configured for measuring/receiving aperiodic CSI-RS (AP- CSI-RS) and reporting aperiodic CSI (AP CSI), a DL multi-beam operation 1200 starts with the gNB/NW signaling to a UE an aperiodic CSI-RS (AP-CSI-RS) trigger or indication (step 1201). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (step 1202), the UE measures the AP-CSI-RS and, in turn, calculates and reports a "beam metric" (included in the CSI, indicating quality of a particular TX beam hypothesis) (step 1203). Examples of such beam reporting (supported in the 3GPP NR specification) are CSI-RS resource indicator (CRI) or SSB resource indicator (SSB-RI) coupled with its associated L1-RSRP and/or L1-SINR. Upon receiving the beam report from the UE, the NW/gNB can use the beam report to select a DL TX beam for the UE and indicate the DL TX beam selection (step 1204) using the TCI field in the DL-related DCI (that carries the DL assignment, such as DCI format 1_1 in NR). The TCI state corresponds to a reference RS (in this case, an AP-CSI-RS) defined/configured via the TCI state definition (higher-layer/RRC configured, from which a subset is activated via MAC CE for the DCI-based selection). Upon successfully decoding the DL-related DCI with the TCI field, the UE performs DL reception (such as data transmission on PDSCH) with the DL TX beam associated with the TCI field (step 1205). In this example embodiment, only one DL TX beam is indicated to the UE.

To facilitate fast beam management, one requirement is to streamline the foundational components (building blocks) for beam management. One functionality of beam management is beam selection which comprises functions such as beam measurement (including training), reporting (for DL beam management, reporting via UL control channel(s)), and indication (for DL and UL beam management, indication via DL control channel(s)). Once the building blocks are streamlined [step 1], additional advanced features to facilitate faster beam management can be added [step 2].

In U.S. patent application Ser. No. 16/949,246 filed on Oct. 21, 2020, the disclosure of which is incorporated by reference herein, a "slim mode" with streamlined designs of such foundational components is proposed for fast beam management. The slim-mode design, due to its compact nature, can facilitate faster update/reconfiguration via lower-layer control signaling. In other words, L1 control signaling will be the primary signaling mechanism and higher-layer (such as MAC CE or RRC) is used only when necessary. Here, L1 control signaling includes the use of UE-group DCI as well as dedicated (UE-specific) DCI.

The aforementioned additional advanced features can include extensions of beam management (multi-beam operation) from intra-cell to inter-cell mobility. With such mechanism, seamless access/mobility for RRC_CONNECTED UEs—as if cell boundaries were not observed unless a UE is in initial access or initial-access-like condition—can be achieved. Another advanced feature includes mechanisms to minimize beam failure (BF) or radio link failure (RLF) such as low-overhead faster beam switching/selection and UE-initiated/event-triggered beam management. With such preventive mechanisms in place, beam failure recovery (BFR) will be less likely used.

In this disclosure, signaling mechanisms for enabling the above-mentioned fast (dynamic) multi-beam operations are considered. In particular, a common beam (TCI state) indication via a separate DCI is considered in which in the indicated beam is common for both data and control (as explained above).

In the rest of the disclosure, the term "beam", can be associated with a spatial transmission/reception of a resource signal (RS) from a "port", "antenna port", or "virtual antenna/port". Likewise, the term "transmit (TX) beam", can be associated with a spatial transmission of a resource signal (RS) or a channel from a "port", "antenna port", or "virtual antenna/port"; and the term "receive (RX) beam", can be associated with a spatial reception of a resource signal (RS) or a channel from a "port", "antenna port", or "virtual antenna/port". The spatial transmission/reception of a beam can be in a three-dimension (3D) space. In a beam-formed wireless system, the transmission and reception of wireless signal can be via multiple TX and multiple RX beams.

In this disclosure, a dynamic, L1-control or DCI based, common beam indication mechanisms are considered. For illustration, the following notation/terminology is used in this disclosure. Other terminology can also be used to represent the same functions and operations:

- a DCI indicating a common beam for data (PDSCH/PUSCH) and control (PDCCH/PUCCH) for both DL and UL is referred to as TCI-DCI (e.g., used when beam correspondence holds between DL and UL),
- a DCI indicating a common beam for data (PDSCH) and control (PDCCH) for DL is referred to as DL-TCI-DCI,
- a DCI indicating a common beam for data (PUSCH) and control (PUCCH) for UL is referred to as UL-TCI-DCI,
- a DCI scheduling a DL assignment is referred to as DL-DCI, and
- a DCI scheduling a UL grant is referred to as UL-DCI.

Figure 13:
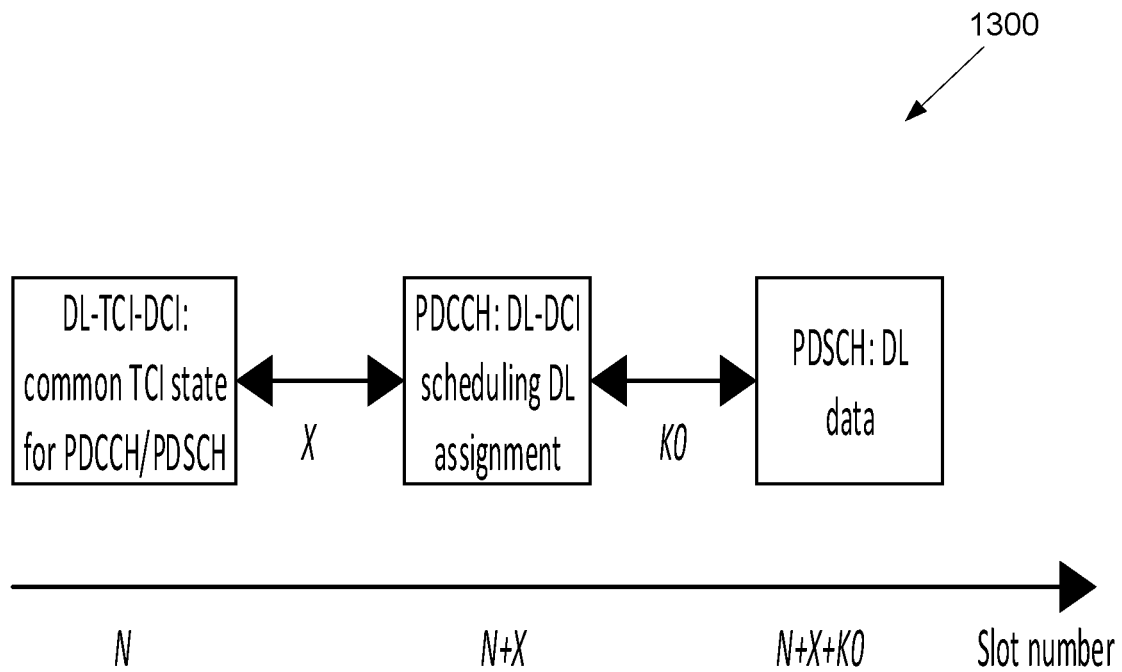
FIG. 13 illustrates an example of a dedicated DCI indicating the common beam for the reception of DL control and data according to embodiments of the present disclosure.

In U.S. patent application Ser. No. 17/214,738 filed on Mar. 26, 2021, the disclosure of which is incorporated by reference herein, a common beam indication for DL data (PDSCH) and DL control (PDCCH) via DL-TCI-DCI is proposed. An example of a dedicated DCI indicating the common beam for the reception of DL control and data 1300 is illustrated in FIG. 13. The embodiment of the dedicated DCI indicating the common beam for the reception of DL control and data 1300 illustrated in FIG. 13 is for illustration only. FIG. 13 does not limit the scope of this disclosure to any particular implementation of the example of a dedicated DCI indicating the common beam for the reception of DL control and data 1300.

As shown in FIG. 13, a UE is configured to receive a dedicated DCI (DL-TCI-DCI) indicating the common beam (TCI state) for the reception of DL control (PDCCH) and data (PDSCH). The UE receives (e.g., a DL-TCI-DCI format) and decodes DL-TCI-DCI in slot (or subframe) N, and uses the indicated beam (TCI state) to receive DL control (PDCCH) starting in the same (slot N) or later slot(s). For illustration, let X be the gap (in number of slots/subframes) between the slot carrying the DL-TCI-DCI and the slot carrying the DL control, then the UE receives DL control starting in slot N+X. The UE decodes DL-DCI (e.g., a DL-DCI format) contained in PDCCH to obtain scheduling information for the DL assignment. The UE then uses the indicated beam (TCI state) to receive DL data (PDSCH, according to the DL assignment) in slot N+X+$K_0$. Here, the value of X can be fixed. Alternatively, the value of X can be selected from a set of values. Optionally, the value of X is not configured or set in a particular manner due to the aperiodic nature of the DCI signaling (DL-TCI-DCI and/or DL-DCI). That is, the time unit location (e.g., slot, subframe) used to signal the DL-TCI-DCI can be different from that used to signal the DL-DCI.

Figure 14:
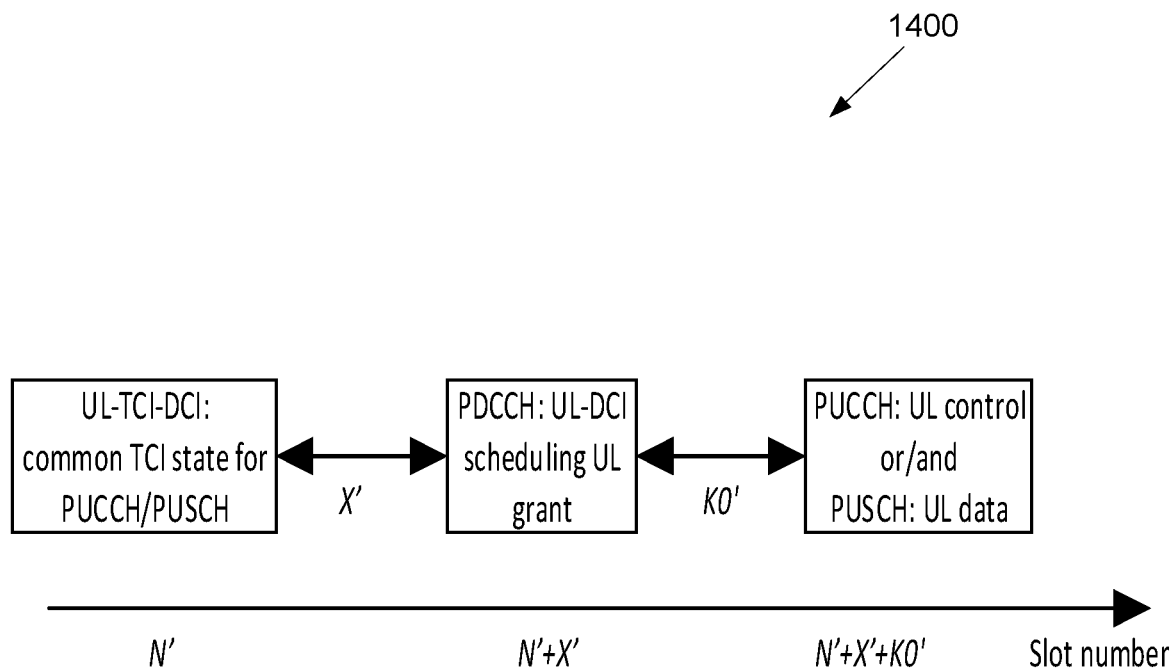
FIG. 14 illustrates an example of a dedicated DCI indicating the common beam for the transmission of UL control and data according to embodiments of the present disclosure.

In U.S. patent application Ser. No. 17/222,592 filed on Apr. 5, 2021, the disclosure of which is incorporated by reference herein, a common beam indication (via UL-TCI-DCI) for UL data (PUSCH) and UL control (PUCCH) is proposed. An example of a dedicated DCI indicating the common beam for the transmission of UL control and data 1400 is illustrated in FIG. 14. The example of a dedicated DCI indicating the common beam for the transmission of UL control and data 1400 illustrated in FIG. 14 is for illustration only. FIG. 14 does not limit the scope of this disclosure to any particular implementation of the example of a dedicated DCI indicating the common beam for the transmission of UL control and data 1400.

As shown in FIG. 14, a UE is configured to receive a dedicated DCI (UL-TCI-DCI) indicating the common beam (TCI state) for the transmission of UL control (PUCCH) and data (PUSCH), wherein PUCCH can be associated with (or in response to) DL reception and/or UL transmission. Optionally, the common beam can also be used for the transmission of PRACH. The UE receives (e.g., a UL-TCI-DCI format) and decodes UL-TCI-DCI in slot (or subframe) N', and uses either the indicated beam (TCI state) or another TCI state (beam) to receive DL control (PDCCH) starting in the same (slot N') or later slot(s). For illustration, let X' be the gap (in number of slots/subframes) between the slot carrying the DL-TCI-DCI and the slot carrying the DL control, then the UE receives DL control starting in slot N'+X'. The UE decodes UL-DCI (e.g., a UL-DCI format) contained in PDCCH to obtain scheduling information for the UL grant. The UE uses the indicated beam (TCI state) in UL-TCI-DCI to transmit UL control (PUCCH) and/or UL data (PUSCH, according to the UL grant) in slot $N'+X'+K'_0$. Here, the value of X' can be fixed. Alternatively, the value of X' can be selected from a set of values. Optionally, the value of X' is not configured or set in a particular manner due to the aperiodic nature of the DCI signaling (UL-TCI-DCI and/or UL-DCI). That is, the time unit location (e.g., slot, subframe) used to signal the UL-TCI-DCI can be different from that used to signal the UL-DCI.

Figure 15:
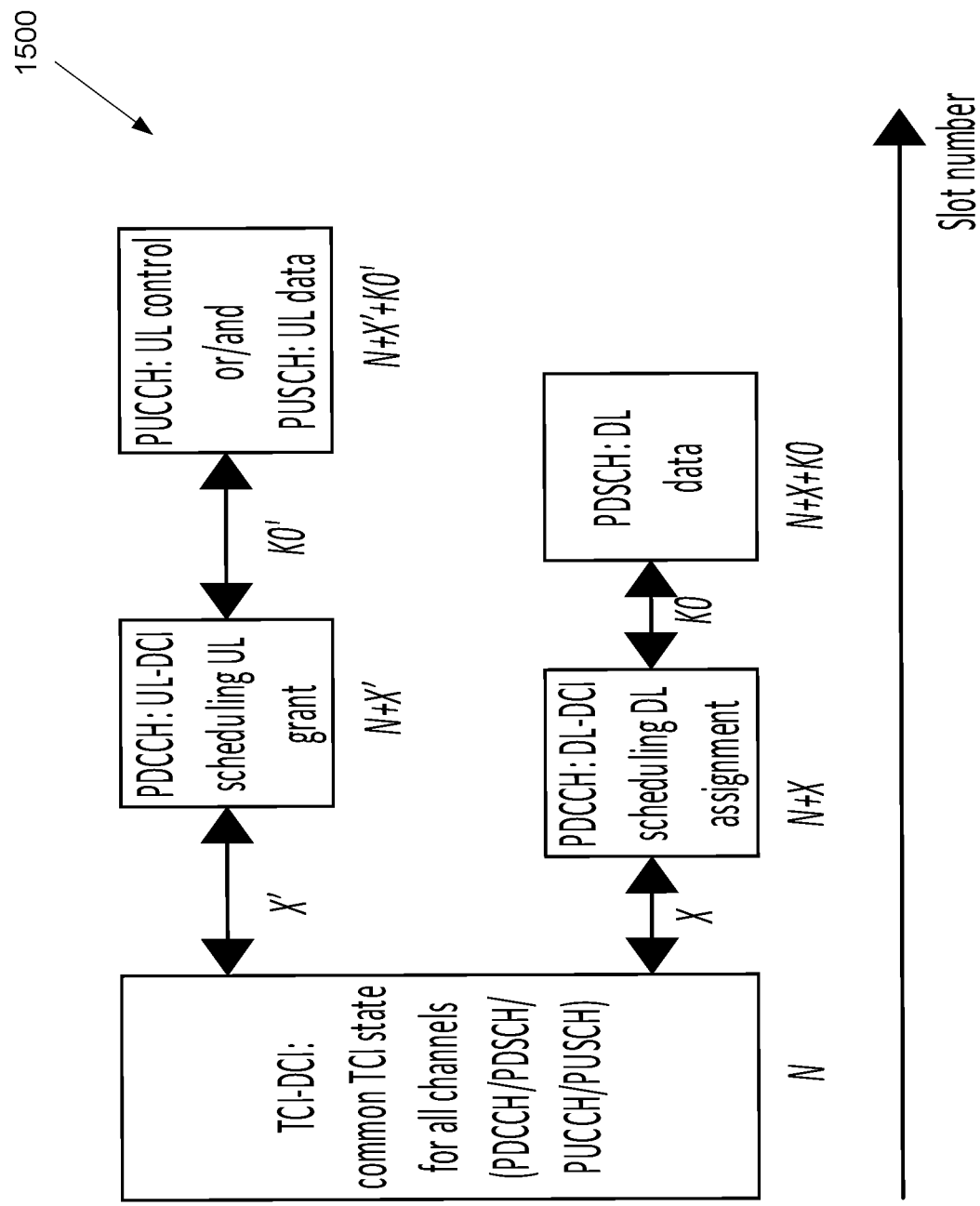
FIG. 15 illustrates an example of a dedicated DCI indicating the common beam for all DL and UL channels according to embodiments of the present disclosure.

In U.S. patent application Ser. No. 17/222,592 filed on Apr. 5, 2021 referenced above, a common beam indication (via TCI-DCI) for both DL and UL as well as data and control is proposed. An example of a dedicated DCI indicating the common beam for all DL and UL channels 1500 is illustrated in FIG. 15. The example of a dedicated DCI indicating the common beam for all DL and UL channels 1500 illustrated in FIG. 15 is for illustration only. FIG. 15 does not limit the scope of this disclosure to any particular implementation of the example of a dedicated DCI indicating the common beam for all DL and UL channels 1500.

As shown in FIG. 15, a UE is configured to receive a dedicated DCI (TCI-DCI) indicating the common beam (TCI state) for all DL and UL channels. In particular, the indicated common beam is used for the reception of DL control (PDCCH) and DL data (PDSCH) as well as for the transmission of UL control (PUCCH) and UL data (PUSCH), wherein PUCCH can be associated with (or in response to) DL reception and/or UL transmission. Optionally, the common beam can also be used for the transmission of PRACH (cf. embodiment 1.7). The UE receives (e.g., a TCI-DCI format) and decodes TCI-DCI in slot (or subframe) N, and uses either the indicated beam (TCI state) or another TCI state (beam) to receive DL control (PDCCH) scheduling DL assignment (via DL-DCI) and/or UL grant (via UL-DCI) starting in the same (slot N) or later slot(s).

For DL, let X be the gap (in number of slots/subframes) between the slot carrying the TCI-DCI and the slot carrying the DL control scheduling DL assignment (via DL-DCI), then the UE receives DL control starting in slot N+X. The UE decodes DL-DCI (e.g., a DL-DCI format) contained in PDCCH to obtain scheduling information for the DL assignment. The UE then uses the indicated beam (TCI state) to receive DL data (PDSCH, according to the DL assignment) in slot $N+X+K_0$. Here, the value of X can be fixed. Alternatively, the value of X can be selected from a set of values. Optionally, the value of X is not configured or set in a particular manner due to the aperiodic nature of the DCI signaling (TCI-DCI and/or DL-DCI). That is, the time unit location (e.g., slot, subframe) used to signal the TCI-DCI can be different from that used to signal the DL-DCI.

For UL, let X' be the gap (in number of slots/subframes) between the slot carrying the TCI-DCI and the slot carrying the DL control scheduling UL grant (via UL-DCI), then the UE receives DL control starting in slot N'+X'. The UE decodes UL-DCI (e.g., a UL-DCI format) contained in PDCCH to obtain scheduling information for the UL grant. The UE uses the indicated beam (TCI state) in TCI-DCI to transmit UL control (PUCCH) and/or UL data (PUSCH, according to the UL grant) in slot $N'+X'+K'_0$. Here, the value of X' can be fixed. Alternatively, the value of X' can be selected from a set of values. Optionally, the value of X' is not configured or set in a particular manner due to the aperiodic nature of the DCI signaling (TCI-DCI and/or UL-DCI). That is, the time unit location (e.g., slot, subframe) used to signal the TCI-DCI can be different from that used to signal the UL-DCI.

Component 1: Content of Beam Indication DCI for DL

In some embodiments of this disclosure, a UE can be configured with a dynamic beam (TCI state) indication/update for DL reception either separately from or together with the DL assignment, wherein the TCI state indication is via DL-TCI-DCI and/or DL assignment (DL-DCI), and the details about DL-TCI-DCI is according to U.S. patent application Ser. No. 17/214,738 filed on Mar. 26, 2021 referenced above. In particular, the DL-TCI-DCI can be used/configured to enable the possibility of separate update/indication of the TCI state from the DL assignment. When the beam indication is separate from the DL assignment, the indicated beam can be used for the reception of both DL control (e.g., PDCCH carrying DL-DCI scheduling DL assignment) and DL data (PDSCH). This is referred to "common beam (TCI state) indication" in the present disclosure. When the beam indication is together with the DL assignment, the indicated beam can only be used for the reception of DL data (PDSCH). In this case, the beam for the reception of DL control can be another beam (TCI state) as explained in U.S. patent application Ser. No. 17/214,738 filed on Mar. 26, 2021 referenced above.

At least one of the following embodiments can be used. In one option, only one of the following embodiments is used for the beam (TCI state) indication. In another option, multiple of the following embodiments can be used for the beam (TCI state) indication, and one of them is configured to the UE via higher layer (RRC) and/or MAC CE based and/or DCI based signaling. In the following embodiments or examples, the location of a beam (TCI state) indication refers to a carrier DCI such as DL-TCI-DCI or DL-DCI.

In embodiment I.1, the common beam (TCI state) indication is always via DL-TCI-DCI, and not via DL-DCI (scheduling DL assignment). There is only one beam indication, whose location (or carrier DCI) is fixed to DL-TCI-DCI.

In embodiment I.1A, the common beam (TCI state) indication is always via MAC CE (carried via PDSCH which is scheduled via a DCI), and not via DL-TCI-DCI or DL-DCI (scheduling DL assignment). There is only one beam indication, whose location (or carrier channel) is fixed to PDSCH carrying MAC CE. In one example, the beam indication indicates a single beam (TCI state) for both DL and UL channels/RSs. In one example, the beam indication indicates two beams (TCI states) one for DL channels/RSs and one for UL channels/RSs.

In embodiment I.2, the common beam (TCI state) indication can be via DL-TCI-DCI or DL-DCI (scheduling DL assignment). There is only one beam indication, whose location (or carrier DCI) is configured to the UE. This configuration can be via RRC and/or MAC CE. At least one of the following examples can be used.

In one example I.2.1, the location of the common beam indication is configured via a parameter P. When the parameter P takes a value (e.g., P=0), the beam indication is via DL-TCI-DCI, and when the parameter P takes another value (e.g., P=1 or P>0), the beam indication is via DL-DCI. The parameter P can be configured via a field in DL-TCI-DCI. Alternatively, the parameter P can be configured via two states of a higher layer (RRC) parameter. When the parameter P is configured via DL-TCI-DCI, it can be configured explicitly using a separate field or implicitly using another field (e.g., a joint DCI field for P and TCI state).

In one example I.2.2, the location of the common beam indication is configured via a field F in DL-TCI-DCI. When the value of the field F is a value (e.g., F=0), the beam indication is via DL-DCI, and when the value of the field is another value (e.g., F>0), the beam indication is via DL-TCI-DCI. In one example, when F>0, the value of F indicates both (a) the information that the beam indication is via DL-TCI-DCI and (b) the updated beam (TCI state) for both data and control.

In one example I.2.3, the location of the common beam indication is configured via a RRC parameter, e.g., tci-PresentInDCI (in PDSCH-Config), or a MAC CE parameter. For example, when the parameter is provided, the common beam indication is via DL-TCI-DCI, otherwise it is via DL-TCI.

In embodiment I.2A, the common beam (TCI state) indication can be via X-DCI or MAC CE, where X=DL or DL-TCI, and MAC CE is carried via PDSCH which is scheduled via a DCI. There is only one beam indication, whose location (or carrier channel) is configured to the UE. This configuration can be via RRC and/or MAC CE. In one example (E1), the beam indication indicates a single beam (TCI state) for both DL and UL channels/RSs. In one example (E2), the beam indication indicates two beams (TCI states) one for DL channels/RSs and one for UL channels/RSs. When beam indication is via X-DCI, a subset of up to N (e.g., N=8) beams can be activated via MAC CE (similar to Rel. 15) that maps to up to N code points of a DCI field in X-DCI. When beam indication is via MAC CE, a single beam, i.e., N=1 (or two beams, in case of example E2) is (or are) indicated. Note that N here is the number of TCI states in the activated TCI state set. At least one of the following examples can be used.

In one example I.2A.1, the location of the common beam indication is configured via a parameter P. When the parameter P takes a value (e.g., P=0), the beam indication is via X-DCI, and when the parameter P takes another value (e.g., P=1 or P>0), the beam indication is via MAC CE. The parameter P can be configured via a field in X-DCI. Alternatively, the parameter P can be configured via two states of a higher layer (RRC) parameter. When the parameter P is configured via X-DCI, it can be configured explicitly using a separate field or implicitly using another field (e.g., a joint DCI field for P and TCI state).

In one example I.2A.2, the location of the common beam indication is configured via a field F in X-DCI. When the value of the field F is a value (e.g., F=0), the beam indication is via MAC CE, and when the value of the field is another value (e.g., F>0), the beam indication is via X-DCI. In one example, when F>0, the value of F indicates both (a) the information that the beam indication is via X-DCI and (b) the updated beam (TCI state) for both data and control.

In one example I.2A.3, the location of the common beam indication is configured via a RRC parameter, e.g., tci-PresentInDCI (in PDSCH-Config). When the RRC parameter is provided, the common beam indication is via X-DCI, otherwise it is via MAC CE.

In embodiment I.2B, which is a variation of embodiment I.2A, the common beam (TCI state) indication can be via X-DCI or MAC CE, where X=DL or DL-TCI, based on a condition. In one example, the condition is based on the value of N (the number of activated TCI states). At least one of the following examples is used/configured.

In one example I.2B.1, if N=1, the common beam indication is via MAC CE, and if N>1, the common beam indication is via X-DCI. In one example, the value of N (or the condition whether N=1 or N>1) is configured explicitly, for example, via RRC and/or MAC CE. In another example, the value of N is configured implicitly, for example, via RRC and/or MAC CE such as examples in embodiment I.2A.

Optionally, if N=1, the common beam indication is via X-DCI, and if N>1, the common beam indication is via MAC CE. In one example, the value of N (or the condition whether N=1 or N>1) is configured explicitly, for example, via RRC and/or MAC CE. In another example, the value of N is configured implicitly, for example, via RRC and/or MAC CE such as examples in embodiment I.2A.

In one example I.2B.2, if N≤t (or N<t), the common beam indication is via MAC CE, and if N>t (or N≥t), the common beam indication is via X-DCI. The value of t can be fixed e.g., t=1, 2, 4, or 8. Alternatively, the value of t can be configured, e.g., via RRC and/or MAC CE. When configured, the set of candidate values for t can be {1,2} or {1,4}, {1,2,3}, or {1,2,4}, or {1,2,3,4}.

In one example, the value of N and/or t (or the condition whether N≤t (or N<t) or N>t (or N≥t)) is configured explicitly, for example, via RRC and/or MAC CE. In another example, the value of N and/or t (or the condition whether N≤t (or N<t) or N>t (or N≥t)) is configured implicitly, for example, via RRC and/or MAC CE such as examples in embodiment I.2A.

In one example I.2B.3, if N≤t (or N<t), the common beam indication is via X-DCI, and if N>t (or N≥t), the common beam indication is via MAC CE. The value of t can be fixed e.g., t=1, 2, 4, or 8. Alternatively, the value of t can be configured, e.g., via RRC and/or MACE CE. When configured, the set of candidate values for t can be {1,2} or {1,4}, {1,2,3}, or {1,2,4}, or {1,2,3,4}.

In one example, the value of N and/or t (or the condition whether N≤t (or N<t) or N>t (or N≥t)) is configured explicitly, for example, via RRC and/or MAC CE. In another example, the value of N and/or t (or the condition whether N≤t (or N<t) or N>t (or N≥t)) is configured implicitly, for example, via RRC and/or MAC CE such as examples in embodiment I.2A.

In embodiment I.2C, which is a variation of embodiment I.2A and I.2B, the common beam (TCI state) indication can be via X-DCI or MAC CE, where X=DL or DL-TCI, based on a condition. In one example, the condition is based on the value of N (the number of activated TCI states for DL) and M (the number of activated TCI states for UL), assuming the activated TCI state sets are different for DL and UL. At least one of the following examples is used/configured.

In one example I.2C.1, if N=M=1, the common beam indication is via MAC CE, and if N>1 or M>1, the common beam indication is via X-DCI. In one example, the value of N and/or M (or the condition whether N=M=1 or N>1 or M>1) is configured explicitly, for example, via RRC and/or MAC CE. In another example, the value of N and/or M is configured implicitly, for example, via RRC and/or MAC CE such as examples in embodiment I.2A.

Optionally, if N=M=1, the common beam indication is via X-DCI, and if N>1 or M>1, the common beam indication is via MAC CE. In one example, the value of N (or the condition whether N=1 or N>1) is configured explicitly, for example, via RRC and/or MAC CE. In another example, the value of N is configured implicitly, for example, via RRC and/or MAC CE such as examples in embodiment I.2A.

In one example I.2C.2, if N≤t and M≤Y (or N<t and M<Y), the common beam indication is via MAC CE, and otherwise, the common beam indication is via X-DCI. The value of t and/or Y can be fixed e.g., t, Y=1, 2, 4, or 8. Alternatively, the value of t and/or Y can be configured, e.g., via RRC and/or MACE CE. When configured, the set of candidate values for t and/or can be {1,2} or {1,4}, {1,2,3}, or {1,2,4}, or {1,2,3,4}.

In one example, the value of N and/or t and/or M and/or Y (or the condition whether N≤t and M≤Y or otherwise) is configured explicitly, for example, via RRC and/or MAC CE. In another example, the value of N and/or t and/or M and/or Y (or the condition whether N≤t and M≤Y or otherwise) is configured implicitly, for example, via RRC and/or MAC CE such as examples in embodiment I.2A.

In one example I.2C.3, if N≤t and M≤Y (or N<t and M<Y), the common beam indication is via X-DCI, and otherwise, the common beam indication is via MAC CE. The value of t and/or Y can be fixed e.g., t, Y=1, 2, 4, or 8. Alternatively, the value of t and/or Y can be configured, e.g., via RRC and/or MACE CE. When configured, the set of candidate values for t and/or can be {1,2} or {1,4}, {1,2,3}, or {1,2,4}, or {1,2,3,4}.

In one example, the value of N and/or t and/or M and/or Y (or the condition whether N≤t and M≤Y or otherwise) is configured explicitly, for example, via RRC and/or MAC CE. In another example, the value of N and/or t and/or M and/or Y (or the condition whether N≤t and M≤Y or otherwise) is configured implicitly, for example, via RRC and/or MAC CE such as examples in embodiment I.2A.

In one example I.2C.4, if N+M≤t (or N+M<t), the common beam indication is via MAC CE, and N+M>t (or N+M≥t), the common beam indication is via X-DCI. The value of t can be fixed e.g., t, Y=2, 4, or 8. Alternatively, the value of t and/or Y can be configured, e.g., via RRC and/or MACE CE. When configured, the set of candidate values for t and/or can be {2,4} or {2,8}, {2,3}, or {2,4,6}, or {2,4,6,8}.

In one example, the value of N and/or t and/or M (or the condition whether N+M≤t or otherwise) is configured explicitly, for example, via RRC and/or MAC CE. In another example, the value of N and/or t and/or M (or the condition whether N+M≤t or otherwise) is configured implicitly, for example, via RRC and/or MAC CE such as examples in embodiment I.2A.

In one example I.2C.5, if N+M≤t (or N+M<t), the common beam indication is via X-DCI, and N+M>t (or N+M≥t), the common beam indication is via MAC CE. The value of t can be fixed e.g., t, Y=2, 4, or 8. Alternatively, the value of t and/or Y can be configured, e.g., via RRC and/or MACE CE. When configured, the set of candidate values for t and/or can be {2,4} or {2,8}, {2,3}, or {2,4,6}, or {2,4,6,8}.

In one example, the value of N and/or t and/or M (or the condition whether N+M≤t or otherwise) is configured explicitly, for example, via RRC and/or MAC CE. In another example, the value of N and/or t and/or M (or the condition whether N+M≤t or otherwise) is configured implicitly, for example, via RRC and/or MAC CE such as examples in embodiment I.2A.

In one example I.2C.6, if max(N,M)≤t (or max(N,M)<t), the common beam indication is via MAC CE, and max(N,M)>t (or max(N,M)≥t), the common beam indication is via X-DCI. The value of t can be fixed e.g., t, Y=2, 4, or 8. Alternatively, the value of t and/or Y can be configured, e.g., via RRC and/or MACE CE. When configured, the set of candidate values for t and/or can be {2,4} or {2,8}, {2,3}, or {2,4,6}, or {2,4,6,8}.

In one example, the value of N and/or t and/or M (or the condition whether max(N,M)≤t or otherwise) is configured explicitly, for example, via RRC and/or MAC CE. In another example, the value of N and/or t and/or M (or the condition whether max(N,M)≤t or otherwise) is configured implicitly, for example, via RRC and/or MAC CE such as examples in embodiment I.2A.

In one example I.2C.7, if max(N,M)≤t (or max(N,M)<t), the common beam indication is via X-DCI, and max(N,M)>t (or max(N,M)≥t), the common beam indication is via MAC CE. The value of t can be fixed e.g., t, Y=2, 4, or 8. Alternatively, the value of t and/or Y can be configured, e.g., via RRC and/or MACE CE. When configured, the set of candidate values for t and/or can be {2,4} or {2,8}, {2,3}, or {2,4,6}, or {2,4,6,8}.

In one example, the value of N and/or t and/or M (or the condition whether max(N,M)≤t or otherwise) is configured explicitly, for example, via RRC and/or MAC CE. In another example, the value of N and/or t and/or M (or the condition whether max(N,M)≤t or otherwise) is configured implicitly, for example, via RRC and/or MAC CE such as examples in embodiment I.2A.

In embodiment I.3, the common beam (TCI state) indication can be via both DL-TCI-DCI and DL-DCI (scheduling DL assignment). There are two beam indications, one via DL-TCI-DCI and another via DL-DCI. In one example, the higher layer parameter tci-PresentInDCI (in PDSCH-Config) is set to "enabled", which indicates that the TCI state is indicated via DL-DCI (in addition to the beam indication via DL-TCI-DCI). In another example, MAC CE signaling enables/disables the TCI state indication via DL-DCI (in addition to the beam indication via DL-TCI-DCI). At least one of the following examples can be used.

In one example I.3.1, the TCI state used for the reception of DL control (e.g., PDCCH carrying DL-DCI) can be the TCI state indicated via DL-TCI-DCI, and the TCI state used for the reception of DL data (PDSCH) can be the TCI state indicated via DL-DCI.

In one example I.3.2, the TCI state used for the reception of DL control (e.g., PDCCH carrying DL-DCI) can be the TCI state indicated via DL-TCI-DCI, and the TCI state used for the reception of DL data (PDSCH) can be the latest TCI state indicated via either DL-TCI-DCI or DL-DCI.

In embodiment I.3A, the common beam (TCI state) indication can be via both X-DCI and MAC CE, where X=DL or DL-TCI, and MAC CE is carried via PDSCH which is scheduled via a DCI. There are two beam indications, one via X-DCI and another via MAC CE. In one example, the higher layer parameter tci-PresentInDCI (in PDSCH-Config) is set to "enabled", which indicates that the TCI state is indicated via X-DCI (in addition to the beam indication via MAC CE). In another example, MAC CE signaling enables/disables the TCI state indication via X-DCI (in addition to the beam indication via MAC CE). In one example (E1), the beam indication indicates a single beam (TCI state) for both DL and UL channels/RSs. In one example (E2), the beam indication indicates two beams (TCI states) one for DL channels/RSs and one for UL channels/RSs. When beam indication is via X-DCI, a subset of up to N (e.g., N=8) beams can be activated via MAC CE (similar to Rel. 15) that maps to up to N code points of a DCI field in X-DCI. When beam indication is via MAC CE, a single beam (or two beams, in case of example E2) is (or are) indicated. At least one of the following examples can be used.

In one example I.3A.1, the TCI state used for the reception of DL control (e.g., PDCCH carrying DL-DCI) can be the TCI state indicated via MAC CE, and the TCI state used for the reception of DL data (PDSCH) can be the TCI state indicated via X-DCI.

In one example I.3A.2, the TCI state used for the reception of DL control (e.g., PDCCH carrying DL-DCI) can be the TCI state indicated via MAC CE, and the TCI state used for the reception of DL data (PDSCH) can be the latest TCI state indicated via either MAC CE or X-DCI.

In one example I.3A.3, the TCI state used for the reception of both DL control (e.g., PDCCH carrying DL-DCI) and DL data (PDSCH) can be the latest TCI state indicated via either MAC CE or X-DCI.

In embodiment I.4, the common beam (TCI state) indication can be via one or both of DL-TCI-DCI and DL-DCI. At least one of the following examples can be used.

In one example I.4.1, the common beam (TCI state) indication can be via one of the two states (a) DL-TCI-DCI only or (b) both DL-TCI-DCI and DL-DCI. In one option, one of the two states is configured via higher layer signaling and/or MAC CE signaling. In another option, the DL-TCI-DCI indicates one of the two states. When the configured/indicated state is (a), then the common beam indication is according to some of the embodiments of this disclosure, and when the configured/indicated state is (b), then the common beam indication is according to embodiment I.3. In an example, DL-TCI-DCI includes a parameter Z, indicating a number of TCI states. When Z=1, the beam indication is via (a), and when Z=2, the beam indication is via (b). In one example, one of the two states is configured by two RRC parameters, e.g., setting tci-dci-IsPresent='enabled' and enabling/disabling tci-PresentInDCI (in PDSCH-Config). In another example, one of the two states is configured using one RRC parameter, e.g., tci-dci-IsPresent or tci-PresentIn-DCI (in PDSCH-Config).

In one example I.4.2, the common beam (TCI state) indication can be via one of the two states (a) DL-DCI only or (b) both DL-TCI-DCI and DL-DCI. In one option, one of the two states is configured via higher layer signaling and/or MAC CE signaling. In another option, the DL-TCI-DCI indicates one of the two states. When the configured/indicated state is (a), then the common beam indication is according to some of the embodiments of this disclosure, and when the configured/indicated state is (b), then the common beam indication is according to embodiment I.3. In an example, DL-TCI-DCI includes a parameter Z, indicating a number of TCI states. When Z=1, the beam indication is via (a), and when Z=2, the beam indication is via (b). In one example, one of the two states is configured by two RRC parameters, e.g., setting tci-PresentInDCI (in PDSCH-Config)='enabled' and enabling/disabling tci-dci-IsPresent. In another example, one of the two states is configured using one RRC parameter, e.g., tci-dci-IsPresent or tci-PresentIn-DCI (in PDSCH-Config).

In one example I.4.3, the common beam (TCI state) indication can be via one of the three states (a) DL-TCI-DCI only or (b) DL-DCI only or (c) both DL-TCI-DCI and DL-DCI. In one option, one of the three states is configured via higher layer signaling and/or MAC CE signaling. In another option, the DL-TCI-DCI indicates one of the three states. When the configured/indicated state is (a) or (b), then the common beam indication is according to some of the embodiments of this disclosure, and when the configured/indicated state is (c), then the common beam indication is according to embodiment I.3. In an example, DL-TCI-DCI includes a parameter Z, indicating a number of TCI states. When Z=0, the beam indication is via (a); when Z=1, the beam indication is via (b); and when Z=2, the beam indication is via (c). In one example, one of the three states is configured by enabling/disabling two RRC parameters, e.g., tci-dci-IsPresent and tci-PresentInDCI (in PDSCH-Config). In another example, one of the three states is configured using one RRC parameter, e.g., tci-dci-IsPresent or tci-PresentInDCI (in PDSCH-Config).

In embodiment I.4A, the common beam (TCI state) indication can be via one or both of X-DCI and MAC CE. In one example (E1), the beam indication indicates a single beam (TCI state) for both DL and UL channels/RSs. In one example (E2), the beam indication indicates two beams (TCI states) one for DL channels/RSs and one for UL channels/RSs. When beam indication is via X-DCI, a subset of up to N (e.g., N=8) beams can be activated via MAC CE (similar to Rel. 15) that maps to up to N code points of a DCI field in X-DCI. When beam indication is via MAC CE, a single beam (or two beams, in case of example E2) is (or are) indicated. At least one of the following examples can be used.

In one example I.4A.1, the common beam (TCI state) indication can be via one of the two states (a) X-DCI only or (b) both X-DCI and MAC CE. In one option, one of the two states is configured via higher layer signaling and/or MAC CE signaling. In another option, the X-DCI (or MAC CE) indicates one of the two states. When the configured/indicated state is (a), then the common beam indication is according to some of the embodiments of this disclosure, and when the configured/indicated state is (b), then the common beam indication is according to embodiment I.3A. In an example, X-DCI (or MAC CE) includes a parameter Z, indicating a number of TCI states. When Z=1, the beam indication is via (a), and when Z=2, the beam indication is via (b). In one example, one of the two states is configured by two RRC parameters, e.g., setting tci-mac-ce-IsPresent='enabled' and enabling/disabling tci-PresentInDCI (in PDSCH-Config). In another example, one of the two states is configured using one RRC parameter, e.g., tci-mac-ce-IsPresent or tci-PresentInDCI (in PDSCH-Config).

In one example I.4A.2, the common beam (TCI state) indication can be via one of the two states (a) MAC CE only or (b) both X-DCI and MAC CE. In one option, one of the two states is configured via higher layer signaling and/or MAC CE signaling. In another option, the X-DCI (or MAC CE) indicates one of the two states. When the configured/indicated state is (a), then the common beam indication is according to some of the embodiments of this disclosure, and when the configured/indicated state is (b), then the common beam indication is according to embodiment I.3A. In an example, X-DCI (or MAC CE) includes a parameter Z, indicating a number of TCI states. When Z=1, the beam indication is via (a), and when Z=2, the beam indication is via (b). In one example, one of the two states is configured by two RRC parameters, e.g., setting tci-mac-ce-IsPresent (in PDSCH-Config)='enabled' and enabling/disabling tci-PresentInDCI. In another example, one of the two states is configured using one RRC parameter, e.g., tci-mac-ce-IsPresent or tci-PresentInDCI (in PDSCH-Config).

In one example I.4A.3, the common beam (TCI state) indication can be via one of the three states (a) X-DCI only or (b) MAC CE only or (c) both X-DCI and MAC CE. In one option, one of the three states is configured via higher layer signaling and/or MAC CE signaling. In another option, the X-DCI (or MAC CE) indicates one of the three states. When the configured/indicated state is (a) or (b), then the common beam indication is according to some of the embodiments of this disclosure, and when the configured/indicated state is (c), then the common beam indication is according to embodiment I.3A. In an example, X-DCI (or MAC CE) includes a parameter Z, indicating a number of TCI states. When Z=0, the beam indication is via (a); when Z=1, the beam indication is via (b); and when Z=2, the beam indication is via (c). In one example, one of the three states is configured by enabling/disabling two RRC parameters, e.g., tci-mac-ce-IsPresent and tci-PresentInDCI (in PDSCH-Config). In another example, one of the three states is configured using one RRC parameter, e.g., tci-mac-ce-IsPresent or tci-PresentInDCI (in PDSCH-Config).

In embodiment I.5, the DL-TCI-DCI can be a two-stage DCI comprising a first stage DCI and a second stage DCI, wherein the first stage DCI is always present (i.e., configured and hence can be received by the UE), has a fixed payload, and indicates the presence (i.e., configured and hence can be received by the UE) or absence (i.e., not configured and/or hence not received) of the second stage DCI. When the second stage DCI is absent (not configured and/or not received), the UE assumes that there is no update in the TCI state. When the second stage DCI is present (configured and hence can be received by the UE), the UE uses/updates the TCI state according to the second stage DCI. At least one of the following examples can be used.

In one example I.5.1, the location of the second stage DCI is fixed to DL-DCI (scheduling DL assignment).

In one example I.5.2, the location of the second stage DCI is fixed to a dedicated (second stage) DL-TCI-DCI.

In one example I.5.3, the location of the second stage DCI can be DL-DCI or a dedicated (second stage) DL-TCI-DCI. In this case, when the first stage DCI indicates that the second stage is present (configured to the UE), the location of the second stage DCI is also indicated (via the first stage DCI). For example, when a field Y in the first stage DCI is set to 00, the second stage DCI is absent; when the field Y in the first stage DCI is set to 01, the second stage DCI is present and the location of the second stage DCI is DL-DCI; and when the field Y in the first stage DCI is set to 10, the second stage DCI is present and the location of the second stage DCI is (second stage) DL-TCI-DCI.

In embodiment I.5AA, the common beam indication can be a two-stage indication comprising a first stage indication and a second stage indication, wherein the first stage indication is always present (i.e., configured and hence can be received by the UE), has a fixed payload, and indicates the presence (i.e., configured and hence can be received by the UE) or absence (i.e., not configured and/or hence not received) of the second stage indication. When the second stage indication is absent (not configured and/or not received), the UE assumes that there is no update in the TCI state. When the second stage indication is present (configured and hence can be received by the UE), the UE uses/updates the TCI state according to the second stage DCI. At least one of the following examples can be used. In one example, the first stage indication is via MAC CE, and the second stage indication is via X-DCI.

In one example I.5AA.1, the first stage indication is via MAC CE, and the location of the second stage indication is fixed to X-DCI, where X=DL or DL-TCI-DCI.

In one example I.5AA.2, the first stage indication is via a first stage MAC CE, and the location of the second stage indication is fixed to a second stage MAC CE.

In one example I.5AA.3, the first stage indication is via X-DCI, where X=DL or DL-TCI-DCI, and the location of the second stage indication is fixed to MAC CE.

In one example I.5AA.4, the first stage indication is via MAC CE, and the location of the second stage DCI can be X-DCI or MAC CE. In this case, when the first stage indication indicates that the second stage is present (configured to the UE), the location of the second stage indication is also indicated (via the first stage indication). For example, when a field Y in the first stage indication is set to 00, the second stage indication is absent; when the field Y in the first stage indication is set to 01, the second stage indication is present and the location of the second stage indication is X-DCI; and when the field Y in the first stage indication is set to 10, the second stage indication is present and the location of the second stage indication is (second stage) MAC CE.

In one embodiment I.5A, the common beam (TCI state) indication can be via one or both of DL-TCI-DCI and DL-DCI. At least one of the following examples can be used.

In one example I.5A.1, the common beam (TCI state) indication is based in two RRC parameters, for example, tci-dci-IsPresent and tci-PresentInDCI as follows. When tci-dci-IsPresent=enabled, tci-PresentInDCI=enabled, and
  When a time threshold is met, then the TCI state for DL control reception is via DL-TCI-DCI, and the TCI state for DL data reception is via DL-DCI, and
  When a time threshold is not met, then the TCI state for both DL data and DL control reception is via DL-TCI-DCI.
When tci-dci-IsPresent=enabled and tci-PresentInDCI is not provided, then TCI state for both DL data and DL control reception is via DL-TCI-DCI.

In one example I.5A.2, the common beam (TCI state) indication is via both DL-TCI-DCI and DL-DCI. In particular, TCI state 1 is indicated via DL-TCI-DCI and TCI state 2 is indicated via DL-DCI (e.g., by setting tci-PresentInDCI=enabled). Then, the TCI state for DL control reception is the latest of TCI state 1 and TCI state 2. Alternatively, the TCI state for DL control reception is the latest of TCI state 1 or TCI state 2 or a TCI state indicated via MAC CE. The TCI state for DL data reception is TCI state 2.

In one example I.5A.3, the common beam (TCI state) indication is via both DL-TCI-DCI and DL-DCI. In particular, TCI state 1 is indicated via DL-TCI-DCI and TCI state 2 is indicated via DL-DCI (e.g., by setting tci-PresentInDCI=enabled). The TCI state for both DL data and DL control reception is the latest of TCI state 1 and TCI state 2. Alternatively, the TCI state for both DL data and DL control reception is the latest of TCI state 1 or TCI state 2 or a TCI state indicated via MAC CE. Alternatively, the TCI state for both DL data and DL control reception is the latest of TCI state 1 or TCI state 2 or a TCI state indicated via MAC CE subject to fixed timeline restrictions.

In embodiment I.5AAA, the common beam (TCI state) indication can be via one or both of X-DCI and MAC CE. At least one of the following examples can be used.

In one example I.5AAA.1, the common beam (TCI state) indication is based in two RRC parameters, for example, tci-mac-ce-IsPresent and tci-PresentInDCI as follows. When tci-dci-IsPresent=enabled, tci-PresentInDCI=enabled, and
When a time threshold is met, then the TCI state for DL control reception is via MAC CE, and the TCI state for DL data reception is via X-DCI, and
When a time threshold is not met, then the TCI state for both DL data and DL control reception is via MAC CE.
When tci-mac-ce-IsPresent=enabled and tci-PresentInDCI is not provided, then TCI state for both DL data and DL control reception is via MAC CE. When tci-PresentInDCI=enabled and tci-mac-ce-IsPresent is not provided, then TCI state for both DL data and DL control reception is via X-DCI.

In one example I.5AAA.2, the common beam (TCI state) indication is via both X-DCI and MAC CE. In particular, TCI state 1 is indicated via MAC CE and TCI state 2 is indicated via X-DCI (e.g., by setting tci-PresentInDCI=enabled). Then, the TCI state for DL control reception is the latest of TCI state 1 and TCI state 2. The TCI state for DL data reception is TCI state 2. Alternatively, the TCI state for both DL control and data reception is the latest of TCI state 1 and TCI state 2.

In one example I.5AAA.3, the common beam (TCI state) indication is via both X-DCI and MAC CE. In particular, TCI state 1 is indicated via MAC CE and TCI state 2 is indicated via X-DCI (e.g., by setting tci-PresentInDCI=enabled). The TCI state for both DL data and DL control reception is the latest of TCI state 1 and TCI state 2. Alternatively, the TCI state for both DL data and DL control reception is the latest of TCI state 1 or TCI state 2 subject to fixed timeline restrictions.

In embodiment I.5B, the common beam (TCI state) indication can be via one of or multiple of DL-TCI-DCI or DL-DCI or PDSCH. In one example, PDSCH can carry a MAC CE parameter (or activation command or bitmap) for the common beam indication, where the MAC CE parameter is included in the MAC control message that the UE is configured to receive via a MAC CE PDSCH, and such a configuration can be received via a DCI in PDCCH. Also, the MAC CE PDSCH can be dedicated for MAC control message (without any DL data), or it can be a PDSCH with both MAC CE control message and DL-data multiplexed together. In one example, PDSCH can carry the common beam indication multiplexed with DL data (i.e., without any MAC control message). At least one of the following examples can be used.

In one example I.5B.1, the common beam (TCI state) indication is via both X-DCI and PDSCH, where X=DL or DL-TCI. In particular, TCI state 1 is indicated via X-DCI and TCI state 2 is indicated via PDSCH. Then, the TCI state for DL control reception is the latest of TCI state 1 and TCI state 2. Alternatively, the TCI state for DL control reception is the latest of TCI state 1 or TCI state 2 or a TCI state indicated via MAC CE. The TCI state for DL data reception is TCI state 1. In one example, X is fixed to DL. In one example, X is fixed to DL-TCI. In one example, X is configured via RRC and/or MAC CE. When there are HARQ retransmissions for the PDSCH reception (due to PDSCH decoding failure in previous transmission/retransmissions), the TCI state indicated via retransmissions can be the same as the first PDSCH transmission, or it can change during the retransmissions.

In one example I.5B.2, the common beam (TCI state) indication is via all of DL-TCI-DCI, DL-DCI, and PDSCH. In particular, TCI state 1 is indicated via DL-TCI-DCI, TCI state 2 is indicated DL-TCI, TCI state 3 is indicated via PDSCH. Then, the TCI state for DL control reception is the latest of TCI state 1 or TCI state 3. Alternatively, the TCI state for DL control reception is the latest of TCI state 1 or TCI state 3 or a TCI state via MAC CE. The TCI state for DL data reception is TCI state 2. Alternatively, the TCI state for DL data reception is the latest of TCI state 1 and TCI state 2. When there are HARQ retransmissions for the PDSCH reception (due to PDSCH decoding failure in previous transmission/retransmissions), the TCI state indicated via retransmissions can be the same as the first PDSCH transmission, or it can change during the retransmissions.

In embodiment I.6, a UE can be configured with semi-persistent scheduling (SPS) for DL data (PDSCH) using an RRC information element (IE) sps-Config, which includes the configuration for cs-RNTI (RNTI used for the reception of DCI activating/releasing SPS). A UE shall monitor PDCCH with CRC scrambled by the cs-RNTI in every slot as the gNB can activate/re-activate/release SPS at any time using a DCI (e.g., DCI Format 1_1 or 1_2 in NR). In SPS, the UE is configured with PDSCH reception without any DL-TCI (as in dynamic scheduling explained above). The UE is configured to receive a common beam (TCI state) indication/update indicating the common beam for the reception of PDCCH, and if activated by the received PDCCH, also for the reception of PDSCH. This common beam indication can be via a dedicated DCI (DL-TCI-DCI) and/or another DCI activating/releasing PDSCH reception (according to the configured SPS). The details about this common beam indication are analogous to some embodiments (e.g., embodiment I.1 through I.5/I.5A/I.5B) of this disclosure.

In one example I.6.1, a UE is configured to receive a dedicated DCI (e.g., DL-TCI-DCI) via PDCCH, which includes (a) a field for the common beam (TCI state) and (b) another field for the activation/release of PDSCH reception (according to the configured SPS). When PDSCH reception is activated by field (b), the UE can be indicated/updated with a new (TCI state) beam for PDSCH reception (with or without PDCCH reception) using the field (a). Once PDSCH reception is not activated or released by field (b), the UE can be indicated/updated with a new (TCI state) beam for PDCCH reception only using the field (a).

In one example I.6.2, a UE is configured to receive two DCIs: (a) a dedicated DCI (e.g., DL-TCI-DCI) for the common beam (TCI state) and (b) another DCI for the activation/release of PDSCH reception (according to the configured SPS). The two DCIs can be in indicated via two separate PDCCHs, or two parts of a PDCCH. In one example, the another DCI can also include a beam indication/update (in addition to the beam indication via DL-TCI-DCI).

Component 2: Content of Beam Indication DCI for UL

In some embodiments of this disclosure, a UE can be configured with a dynamic beam (TCI state) indication/update for UL transmission either separately from or together with the UL grant, wherein the TCI state indication is via UL-TCI-DCI and/or UL grant (UL-DCI), and the details about UL-TCI-DCI is according to U.S. patent application Ser. No. 17/222,592 filed on Apr. 5, 2021 referenced above. In particular, the UL-TCI-DCI can be used/configured to enable the possibility of separate update/indication of the TCI state from the UL grant.

When the beam indication is separate from the UL grant (i.e., it is via UL-TCI-DCI), the UE receives and decodes UL-TCI-DCI, and uses either the indicated beam (TCI state) or another TCI state (beam) to receive DL control (PDCCH) starting in the same or later slot(s). The UE decodes UL-DCI (e.g., a UL-DCI format) contained in PDCCH to obtain scheduling information for the UL grant. The UE then uses the indicated beam (TCI state) in UL-TCI-DCI to transmit UL control (PUCCH) and/or UL data (PUSCH, according to the UL grant) in the granted slot(s). Optionally, the common beam can also be used for the transmission of PRACH.

When the beam indication is together with the UL grant (i.e., it is via UL-DCI), the indicated beam can only be used for the transmission of UL data (PUSCH) and/or UL control (PUCCH) and/or PRACH. In this case, the beam for the reception of UL-DCI can be another beam (TCI state) as explained in U.S. patent application Ser. No. 17/222,592 filed on Apr. 5, 2021 referenced above.

At least one of the following embodiments can be used. In one option, only one of the following embodiments is used for the beam (TCI state) indication. In another option, multiple of the following embodiments can be used for the beam (TCI state) indication, and one of them is configured to the UE via higher layer (RRC) and/or MAC CE based and/or DCI based signaling. In the following embodiments or examples, the location of a beam (TCI state) indication refers to a carrier DCI such as UL-TCI-DCI or UL-DCI.

In embodiment I.7, the common beam (TCI state) indication is always via UL-TCI-DCI, and not via UL-DCI (scheduling UL grant). There is only one beam indication, whose location (or carrier DCI) is fixed to UL-TCI-DCI.

In embodiment I.7A, the common beam (TCI state) indication is always via MAC CE (carried via PDSCH which is scheduled via a DCI), and not via UL-TCI-DCI or UL-DCI (scheduling UL grant). There is only one beam indication, whose location (or carrier channel) is fixed to PDSCH carrying MAC CE. In one example, the beam indication indicates a single beam (TCI state) for both DL and UL channels/RSs. In one example, the beam indication indicates two beams (TCI states) one for DL channels/RSs and one for UL channels/RSs.

In embodiment I.8, the common beam (TCI state) indication can be via UL-TCI-DCI or UL-DCI (scheduling UL grant). There is only one beam indication, whose location (or carrier DCI) is configured to the UE. At least one of the following examples can be used.

In one example I.8.1, the location of the common beam indication is configured via a parameter P. When the parameter P takes a value (e.g., P=0), the beam indication is via UL-TCI-DCI, and when the parameter P takes another value (e.g., P=1 or P>0), the beam indication is via UL-DCI. The parameter P can be configured via a field in UL-TCI-DCI. Alternatively, the parameter P can be configured via two states of a higher layer (RRC) parameter. When the parameter P is configured via UL-TCI-DCI, it can be configured explicitly using a separate field or implicitly using another field (e.g., a joint DCI field for P and TCI state).

In one example I.8.2, the location of the common beam indication is configured via a field F in UL-TCI-DCI. When the value of the field F is a value (e.g., F=0), the beam indication is via UL-DCI, and when the value of the field is another value (e.g., F>0), the beam indication is via UL-TCI-DCI. In one example, when F>0, the value of F indicates both (a) the information that the beam indication is via UL-TCI-DCI and (b) the updated beam (TCI state) for both data and control.

In one example I.8.3, the location of the common beam indication is configured via a RRC parameter, e.g., tci-PresentInDCI (in PUSCH-Config), or a MAC CE parameter. For example, when the parameter is provided, the common beam indication is via UL-TCI-DCI, otherwise it is via UL-TCI.

In embodiment I.8A, the common beam (TCI state) indication can be via X-DCI or MAC CE, where X=UL or UL-TCI, and MAC CE is carried via PDSCH which is scheduled via a DCI. There is only one beam indication, whose location (or carrier channel) is configured to the UE. This configuration can be via RRC and/or MAC CE. In one example (E1), the beam indication indicates a single beam (TCI state) for both DL and UL channels/RSs. In one example (E2), the beam indication indicates two beams (TCI states) one for DL channels/RSs and one for UL channels/RSs. When beam indication is via X-DCI, a subset of up to M (e.g., M=8) beams can be activated via MAC CE (similar to Rel. 15) that maps to up to M code points of a DCI field in X-DCI. When beam indication is via MAC CE, a single beam, i.e., M=1 (or two beams, in case of example E2) is (or are) indicated. Note that M here is the number of TCI states in the activated TCI state set. At least one of the following examples can be used.

In one example I.8A.1, the location of the common beam indication is configured via a parameter P. When the parameter P takes a value (e.g., P=0), the beam indication is via X-DCI, and when the parameter P takes another value (e.g., P=1 or P>0), the beam indication is via MAC CE. The parameter P can be configured via a field in X-DCI. Alternatively, the parameter P can be configured via two states of a higher layer (RRC) parameter. When the parameter P is configured via X-DCI, it can be configured explicitly using a separate field or implicitly using another field (e.g., a joint DCI field for P and TCI state).

In one example I.8A.2, the location of the common beam indication is configured via a field F in X-DCI. When the value of the field F is a value (e.g., F=0), the beam indication is via MAC CE, and when the value of the field is another value (e.g., F>0), the beam indication is via X-DCI. In one example, when F>0, the value of F indicates both (a) information that the beam indication is via X-DCI and (b) the updated beam (TCI state) for both data and control.

In one example I.8A.3, the location of the common beam indication is configured via a RRC parameter, e.g., tci-PresentInDCI (in PUSCH-Config). When the RRC parameter is provided, the common beam indication is via X-DCI, otherwise it is via MAC CE.

In embodiment I.8B, which is a variation of embodiment I.2A, the common beam (TCI state) indication can be via X-DCI or MAC CE, where X=DL or DL-TCI, based on a condition. In one example, the condition is based on the value of M (the number of activated TCI states for UL). At least one of the following examples is used/configured.

In one example I.8B.1, if M=1, the common beam indication is via MAC CE, and if M>1, the common beam indication is via X-DCI. In one example, the value of M (or the condition whether M=1 or M>1) is configured explicitly, for example, via RRC and/or MAC CE. In another example, the value of M is configured implicitly, for example, via RRC and/or MAC CE such as examples in embodiment I.8A.

In one example I.8B.2, if M<Y (or M≤Y), the common beam indication is via MAC CE, and if M>Y (or M≥Y), the common beam indication is via X-DCI. The value of Y can be fixed e.g., Y=1, 2, 4, or 8. Alternatively, the value of Y can be configured, e.g., via RRC and/or MACE CE. When configured, the set of candidate values for Y can be {1,2} or {1,4}, {1,2,3}, or {1,2,4}, or {1,2,3,4}.

In one example, the value of M and/or Y (or the condition whether M<Y (or M≤Y) or M>Y (or M≥Y)) is configured explicitly, for example, via RRC and/or MAC CE. In another example, the value of M and/or Y (or the condition whether M<Y (or M≤Y) or M>Y (or M≥Y)) is configured implicitly, for example, via RRC and/or MAC CE such as examples in embodiment I.8A.

In one example I.8B.3, if M≤Y (or M<Y), the common beam indication is via X-DCI, and if M>Y (or M≥Y), the common beam indication is via MAC CE. The value of Y can be fixed e.g., Y=1, 2, 4, or 8. Alternatively, the value of Y can be configured, e.g., via RRC and/or MACE CE. When configured, the set of candidate values for Y can be {1,2} or {1,4}, {1,2,3}, or {1,2,4}, or {1,2,3,4}.

In one example, the value of M and/or Y (or the condition whether M≤Y (or M<Y) or M>Y (or M>Y)) is configured explicitly, for example, via RRC and/or MAC CE. In another example, the value of M and/or Y (or the condition whether M≤Y (or M<Y) or M>Y (or M≥Y)) is configured implicitly, for example, via RRC and/or MAC CE such as examples in embodiment I.8A.

In embodiment I.8C, which is a variation of embodiment I.8A and I.8B, the common beam (TCI state) indication can be via X-DCI or MAC CE, where X=DL or DL-TCI, based on a condition. In one example, the condition is based on the value of N (the number of activated TCI states for DL) and M (the number of activated TCI states for UL), assuming the activated TCI state sets are different for DL and UL. At least one of the examples I.2C.1 through I.2C.7 is used/configured.

In embodiment I.9, the common beam (TCI state) indication can be via both UL-TCI-DCI and UL-DCI (scheduling UL grant). There are two beam indications, one via UL-TCI-DCI and another via UL-DCI. In one example, the higher layer parameter ul-tci-PresentInDCI (e.g., in PUSCH-Config) is set to "enabled", which indicates that the TCI state is indicated via UL-DCI (in addition to the beam indication via UL-TCI-DCI). In another example, MAC CE signaling enables/disables the TCI state indication via UL-DCI (in addition to the beam indication via UL-TCI-DCI). At least one of the following examples can be used.

In one example I.9.1, the TCI state used for the reception of DL control (e.g., PDCCH carrying UL-DCI) can be the TCI state indicated via UL-TCI-DCI, and the TCI state used for the transmission of UL data (PUSCH) and/or UL control (PUCCH) and/or PRACH can be the TCI state indicated via UL-DCI.

In one example I.9.2, the TCI state used for the reception of DL control (e.g., PDCCH carrying DL-UCI) can be the TCI state indicated via UL-TCI-DCI, and the TCI state used for the transmission of UL data (PUSCH) and/or UL control (PUCCH) and/or PRACH can be the latest TCI state indicated via either UL-TCI-DCI or UL-DCI.

In embodiment I.9A, the common beam (TCI state) indication can be via both X-DCI and MAC CE, where X=UL or UL-TCI, and MAC CE is carried via PDSCH which is scheduled via a DCI. There are two beam indications, one via X-DCI and another via MAC CE. In one example, the higher layer parameter tci-PresentInDCI (in PUSCH-Config) is set to "enabled", which indicates that the TCI state is indicated via X-DCI (in addition to the beam indication via MAC CE). In another example, MAC CE signaling enables/disables the TCI state indication via X-DCI (in addition to the beam indication via MAC CE). In one example (E1), the beam indication indicates a single beam (TCI state) for both DL and UL channels/RSs. In one example (E2), the beam indication indicates two beams (TCI states) one for DL channels/RSs and one for UL channels/RSs. When beam indication is via X-DCI, a subset of up to N (e.g., N=8) beams can be activated via MAC CE (similar to Rel. 15) that maps to up to N code points of a DCI field in X-DCI. When beam indication is via MAC CE, a single beam (or two beams, in case of example E2) is (or are) indicated. At least one of the following examples can be used.

In one example I.9A.1, the TCI state used for the reception of DL control (e.g., PDCCH carrying UL-DCI) can be the TCI state indicated via MAC CE, and the TCI state used for the transmission of UL data (PUSCH) and/or UL control (PUCCH) and/or PRACH can be the TCI state indicated via X-DCI.

In one example I.9A.2, the TCI state used for the reception of DL control (e.g., PDCCH carrying UL-DCI) can be the TCI state indicated via MAC CE, and the TCI state used for the transmission of UL data (PUSCH) and/or UL control (PUCCH) and/or PRACH can be the latest TCI state indicated via either MAC CE or X-DCI.

In one example I.9A.3, the TCI state used for the reception of both DL control (e.g., PDCCH carrying UL-DCI) and the transmission of UL data (PUSCH) and/or UL control (PUCCH) and/or PRACH can be the latest TCI state indicated via either MAC CE or X-DCI.

In embodiment I.10, the common beam (TCI state) indication can be via one or both of UL-TCI-DCI and UL-DCI. At least one of the following examples can be used.

In one example I.10.1, the common beam (TCI state) indication can be via one of the two states (a) UL-TCI-DCI only or (b) both UL-TCI-DCI and UL-DCI. In one option, one of the two states is configured via higher layer signaling and/or MAC CE signaling. In another option, the UL-TCI-DCI indicates one of the two states. When the configured/indicated state is (a), then the common beam indication is according to some of the embodiments of this disclosure, and when the configured/indicated state is (b), then the common beam indication is according to embodiment I.9. In an example, UL-TCI-DCI includes a parameter Z, indicating a number of TCI states. When Z=1, the beam indication is via (a), and when Z=2, the beam indication is via (b). In one example, one of the two states is configured by two RRC parameters, e.g., setting ul-tci-dci-IsPresent='enabled' and enabling/disabling tci-PresentInDCI (e.g., in PUSCH-Config). In another example, one of the two states is configured using one RRC parameter, e.g., ul-tci-dci-IsPresent or tci-PresentInDCI (e.g., in PUSCH-Config).

In one example I.10.2, the common beam (TCI state) indication can be via one of the two states (a) UL-DCI only or (b) both UL-TCI-DCI and UL-DCI. In one option, one of the two states is configured via higher layer signaling and/or MAC CE signaling. In another option, the UL-TCI-DCI indicates one of the two states. When the configured/indicated state is (a), then the common beam indication is according to some of the embodiments of this disclosure, and when the configured/indicated state is (b), then the common beam indication is according to embodiment I.9. In an example, UL-TCI-DCI includes a parameter Z, indicating a number of TCI states. When Z=1, the beam indication is via (a), and when Z=2, the beam indication is via (b). In one example, one of the two states is configured by two RRC parameters, e.g., setting ul-tci-dci-IsPresent='enabled' and enabling/disabling tci-PresentInDCI (e.g., in PUSCH-Config). In another example, one of the two states is configured using one RRC parameter, e.g., ul-tci-dci-IsPresent or tci-PresentInDCI (e.g., in PUSCH-Config).

In one example I.10.3, the common beam (TCI state) indication can be via one of the three states (a) UL-TCI-DCI only or (b) UL-DCI only or (c) both UL-TCI-DCI and UL-DCI. In one option, one of the three states is configured via higher layer signaling and/or MAC CE signaling. In another option, the UL-TCI-DCI indicates one of the three states. When the configured/indicated state is (a) or (b), then the common beam indication is according to some of the embodiments of this disclosure, and when the configured/indicated state is (c), then the common beam indication is according to embodiment I.9. In an example, UL-TCI-DCI includes a parameter Z, indicating a number of TCI states. When Z=0, the beam indication is via (a); when Z=1, the beam indication is via (b); and when Z=2, the beam indication is via (c). In one example, one of the two states is configured by two RRC parameters, e.g., setting ul-tci-dci-IsPresent='enabled' and enabling/disabling tci-PresentInDCI (e.g., in PUSCH-Config). In another example, one of the two states is configured using one RRC parameter, e.g., ul-tci-dci-IsPresent or tci-PresentInDCI (e.g., in PUSCH-Config).

In embodiment I.10A, the common beam (TCI state) indication can be via one or both of X-DCI and MAC CE. In one example (E1), the beam indication indicates a single beam (TCI state) for both DL and UL channels/RSs. In one example (E2), the beam indication indicates two beams (TCI states) one for DL channels/RSs and one for UL channels/RSs. When beam indication is via X-DCI, a subset of up to N (e.g., N=8) beams can be activated via MAC CE (similar to Rel. 15) that maps to up to N code points of a DCI field in X-DCI. When beam indication is via MAC CE, a single beam (or two beams, in case of example E2) is (or are) indicated. At least one of the following examples can be used.

In one example I.10A.1, the common beam (TCI state) indication can be via one of the two states (a) X-DCI only or (b) both X-DCI and MAC CE. In one option, one of the two states is configured via higher layer signaling and/or MAC CE signaling. In another option, the X-DCI (or MAC CE) indicates one of the two states. When the configured/indicated state is (a), then the common beam indication is according to some of the embodiments of this disclosure, and when the configured/indicated state is (b), then the common beam indication is according to embodiment I.9A. In an example, X-DCI (or MAC CE) includes a parameter Z, indicating a number of TCI states. When Z=1, the beam indication is via (a), and when Z=2, the beam indication is via (b). In one example, one of the two states is configured by two RRC parameters, e.g., setting tci-mac-ce-IsPresent='enabled' and enabling/disabling tci-PresentInDCI (in PUSCH-Config). In another example, one of the two states is configured using one RRC parameter, e.g., tci-mac-ce-IsPresent or tci-PresentInDCI (in PUSCH-Config).

In one example I.10A.2, the common beam (TCI state) indication can be via one of the two states (a) MAC CE only or (b) both X-DCI and MAC CE. In one option, one of the two states is configured via higher layer signaling and/or MAC CE signaling. In another option, the X-DCI (or MAC CE) indicates one of the two states. When the configured/indicated state is (a), then the common beam indication is according to some of the embodiments of this disclosure, and when the configured/indicated state is (b), then the common beam indication is according to embodiment I.9A.

In an example, X-DCI (or MAC CE) includes a parameter Z, indicating a number of TCI states. When Z=1, the beam indication is via (a), and when Z=2, the beam indication is via (b). In one example, one of the two states is configured by two RRC parameters, e.g., setting tci-mac-ce-IsPresent='enabled' (in PD=USCH-Config)='enabled' and enabling/disabling tci-PresentInDCI. In another example, one of the two states is configured using one RRC parameter, e.g., tci-mac-ce-IsPresent or tci-PresentInDCI (in PUSCH-Config).

In one example I.10A.3, the common beam (TCI state) indication can be via one of the three states (a) X-DCI only or (b) MAC CE only or (c) both X-DCI and MAC CE. In one option, one of the three states is configured via higher layer signaling and/or MAC CE signaling. In another option, the X-DCI (or MAC CE) indicates one of the three states. When the configured/indicated state is (a) or (b), then the common beam indication is according to some of the embodiments of this disclosure, and when the configured/indicated state is (c), then the common beam indication is according to embodiment I.9A. In an example, X-DCI (or MAC CE) includes a parameter Z, indicating a number of TCI states. When Z=0, the beam indication is via (a); when Z=1, the beam indication is via (b); and when Z=2, the beam indication is via (c). In one example, one of the three states is configured by enabling/disabling two RRC parameters, e.g., tci-mac-ce-IsPresent and tci-PresentInDCI (in PUSCH-Config). In another example, one of the three states is configured using one RRC parameter, e.g., tci-mac-ce-IsPresent or tci-PresentInDCI (in PUSCH-Config).

In embodiment I.11, the UL-TCI-DCI can be a two-stage DCI comprising a first stage DCI and a second stage DCI, wherein the first stage DCI is always present (i.e., configured and hence can be received by the UE), has a fixed payload, and indicates the presence (i.e., configured and hence can be received by the UE) or absence (i.e., not configured and/or hence not received) of the second stage DCI. When the second stage DCI is absent (not configured and/or not received), the UE assumes that there is no update in the TCI state. When the second stage DCI is present (configured and hence can be received by the UE), the UE uses/updates the TCI state according to the second stage DCI. At least one of the following examples can be used.

In one example I.11.1, the location of the second stage DCI is fixed to UL-DCI (scheduling UL grant).

In one example I.11.2, the location of the second stage DCI is fixed to a dedicated (second stage) UL-TCI-DCI.

In one example I.11.3, the location of the second stage DCI can be UL-DCI or a dedicated (second stage) UL-TCI-DCI. In this case, when the first stage DCI indicates that the second stage is present (configured to the UE), the location of the second stage DCI is also indicated (via the first stage DCI). For example, when a field Y in the first stage DCI is set to 00, the second stage DCI is absent; when the field Y in the first stage DCI is set to 01, the second stage DCI is present and the location of the second stage DCI is UL-DCI; and when the field Y in the first stage DCI is set to 10, the second stage DCI is present and the location of the second stage DCI is (second stage) UL-TCI-DCI.

In embodiment I.11AA, the common beam indication can be a two-stage indication (cf. U.S. provisional patent application 62/987,497, filed on Mar. 10, 2020) comprising a first stage indication and a second stage indication, wherein the first stage indication is always present (i.e., configured and hence can be received by the UE), has a fixed payload, and indicates the presence (i.e., configured and hence can be received by the UE) or absence (i.e., not configured and/or hence not received) of the second stage indication. When the second stage indication is absent (not configured and/or not received), the UE assumes that there is no update in the TCI state. When the second stage indication is present (configured and hence can be received by the UE), the UE uses/updates the TCI state according to the second stage DCI. At least one of the following examples can be used. In one example, the first stage indication is via MAC CE, and the second stage indication is via X-DCI.

In one example I.11AA.1, the first stage indication is via MAC CE, and the location of the second stage indication is fixed to X-DCI, where X=UL or UL-TCI-DCI.

In one example I.11AA.2, the first stage indication is via a first stage MAC CE, and the location of the second stage indication is fixed to a second stage MAC CE.

In one example I.11AA.3, the first stage indication is via X-DCI, where X=UL or UL-TCI-DCI, and the location of the second stage indication is fixed to MAC CE.

In one example I.11AA.4, the first stage indication is via MAC CE, and the location of the second stage DCI can be X-DCI or MAC CE. In this case, when the first stage indication indicates that the second stage is present (configured to the UE), the location of the second stage indication is also indicated (via the first stage indication). For example, when a field Y in the first stage indication is set to 00, the second stage indication is absent; when the field Y in the first stage indication is set to 01, the second stage indication is present and the location of the second stage indication is X-DCI; and when the field Y in the first stage indication is set to 10, the second stage indication is present and the location of the second stage indication is (second stage) MAC CE.

In embodiment I.11A, the common beam (TCI state) indication can be via one or both of UL-TCI-DCI and UL-DCI. At least one of the following examples can be used.

In one example I.11A.1, the common beam (TCI state) indication is based in two RRC parameters, for example, ul-tci-dci-IsPresent and tci-PresentInDCI as follows. When ul-tci-dci-IsPresent=enabled, tci-PresentInDCI=enabled, and
  When a time threshold is met, then the TCI state for UL control transmission is via UL-TCI-DCI, and the TCI state for UL data transmission is via UL-DCI, and
  When a time threshold is not met, then the TCI state for both UL data and UL control transmission is via UL-TCI-DCI.
When ul-tci-dci-IsPresent=enabled and tci-PresentInDCI is not provided, then TCI state for both UL data and UL control transmission is via UL-TCI-DCI. The TCI state for PRACH transmission can be the one via UL-TCI-DCI or UL-DCI. Alternatively, the TCI state for PRACH transmission can be indicated separately, e.g., via MAC CE and/or a separate DCI.

In one example I.11A.2, the common beam (TCI state) indication is via both UL-TCI-DCI and UL-DCI. In particular, TCI state 1 is indicated via UL-TCI-DCI and TCI state 2 is indicated via UL-DCI (e.g., by setting ul-tci-PresentInDCI=enabled). Then, the TCI state for UL control transmission is the latest of TCI state 1 and TCI state 2. Alternatively, the TCI state for UL control transmission is the latest of TCI state 1 or TCI state 2 or a TCI state indicated via MAC CE. The TCI state for UL data transmission is TCI state 2. The TCI state for PRACH transmission can be the one via UL-TCI-DCI or UL-DCI. Alternatively, the TCI state for PRACH transmission can be indicated separately, e.g., via MAC CE and/or a separate DCI.

In one example I.11A.3, the common beam (TCI state) indication is via both UL-TCI-DCI and UL-DCI. In particular, TCI state 1 is indicated via UL-TCI-DCI and TCI state 2 is indicated via UL-DCI (e.g., by setting ul-tci-PresentInDCI=enabled). The TCI state for both UL data and UL control transmission is the latest of TCI state 1 and TCI state 2. Alternatively, the TCI state for both UL data and UL control transmission is the latest of TCI state 1 or TCI state 2 or a TCI state indicated via MAC CE. Alternatively, the TCI state for both UL data and UL control transmission is the latest of TCI state 1 or TCI state 2 or a TCI state indicated via MAC CE subject to fixed timeline restrictions. The TCI state for PRACH transmission can be the one via UL-TCI-DCI or UL-DCI. Alternatively, the TCI state for PRACH transmission can be indicated separately, e.g., via MAC CE and/or a separate DCI.

In embodiment I.11AAA, the common beam (TCI state) indication can be via one or both of X-DCI and MAC CE. At least one of the following examples can be used.

In one example I.11AAA.1, the common beam (TCI state) indication is based in two RRC parameters, for example, tci-mac-ce-IsPresent and tci-PresentInDCI as follows. When tci-dci-IsPresent=enabled, tci-PresentInDCI=enabled, and
  When a time threshold is met, then the TCI state for UL control transmission is via MAC CE, and the TCI state for UL data transmission is via X-DCI, and
  When a time threshold is not met, then the TCI state for both UL data and UL control transmission is via MAC CE.
When tci-mac-ce-IsPresent=enabled and tci-PresentInDCI is not provided, then TCI state for both UL data and UL control transmission is via MAC CE. When tci-PresentInDCI=enabled and tci-mac-ce-IsPresent is not provided, then TCI state for both UL data and UL control transmission is via X-DCI. The TCI state for PRACH transmission can be the one via X-DCI or MAC CE. Alternatively, the TCI state for PRACH transmission can be indicated separately, e.g., via MAC CE and/or a separate DCI.

In one example I.11AAA.2, the common beam (TCI state) indication is via both X-DCI and MAC CE. In particular, TCI state 1 is indicated via MAC CE and TCI state 2 is indicated via X-DCI (e.g., by setting tci-PresentInDCI=enabled). Then, the TCI state for UL control transmission is the latest of TCI state 1 and TCI state 2. The TCI state for UL data transmission is TCI state 2. Alternatively, the TCI state for both UL control and data transmission is the latest of TCI state 1 and TCI state 2.

In one example I.11AAA.3, the common beam (TCI state) indication is via both X-DCI and MAC CE. In particular, TCI state 1 is indicated via MAC CE and TCI state 2 is indicated via X-DCI (e.g., by setting tci-PresentInDCI=enabled). The TCI state for both UL control and data transmission is the latest of TCI state 1 and TCI state 2. Alternatively, the TCI state for both UL control and data transmission is the latest of TCI state 1 or TCI state 2 subject to fixed timeline restrictions.

In embodiment I.11B, the common beam (TCI state) indication can be via one of or multiple of UL-TCI-DCI or UL-DCI or PDSCH. In one example, PDSCH can carry a MAC CE parameter (or activation command or bitmap) for the common beam indication, where the MAC CE parameter is included in the MAC control message that the UE is configured to receive via a MAC CE PDSCH, and such a configuration can be received via a DCI in PDCCH. Also, the MAC CE PDSCH can be dedicated for MAC control message (without any DL data), or it can be a PDSCH with both MAC CE control message and DL-data multiplexed together. In one example, PDSCH can carry the common beam indication multiplexed with DL data (i.e., without any MAC control message). At least one of the following examples can be used.

In one example I.11B.1, the common beam (TCI state) indication is via both X-DCI and PDSCH, where X=UL or UL-TCI. In particular, TCI state 1 is indicated via X-DCI and TCI state 2 is indicated via PDSCH. Then, the TCI state for UL control transmission is the latest of TCI state 1 and TCI state 2. Alternatively, the TCI state for UL control transmission is the latest of TCI state 1 or TCI state 2 or a TCI state indicated via MAC CE. The TCI state for UL data transmission is TCI state 1. In one example, X is fixed to UL. In one example, X is fixed to UL-TCI. In one example, X is configured via RRC and/or MAC CE. When there are HARQ retransmissions for the PDSCH reception (due to PDSCH decoding failure in previous transmission/retransmissions), the TCI state indicated via retransmissions can be the same as the first PDSCH transmission, or it can change during the retransmissions. The TCI state for PRACH transmission can be the one via X-DCI or PDSCH. Alternatively, the TCI state for PRACH transmission can be indicated separately, e.g., via MAC CE and/or a separate DCI.

In one example I.11B.2, the common beam (TCI state) indication is via all of UL-TCI-DCI, UL-DCI, and PDSCH. In particular, TCI state 1 is indicated via UL-TCI-DCI, TCI state 2 is indicated UL-TCI, TCI state 3 is indicated via PDSCH. Then, the TCI state for UL control transmission is the latest of TCI state 1 or TCI state 3. Alternatively, the TCI state for UL control transmission is the latest of TCI state 1 or TCI state 3 or a TCI state via MAC CE. The TCI state for UL data transmission is TCI state 2. Alternatively, the TCI state for UL data transmission is the latest of TCI state 1 and TCI state 2. When there are HARQ retransmissions for the PDSCH reception (due to PDSCH decoding failure in previous transmission/retransmissions), the TCI state indicated via retransmissions can be the same as the first PDSCH transmission, or it can change during the retransmissions. The TCI state for PRACH transmission can be the one via UL-TCI-DCI, UL-DCI or PDSCH. Alternatively, the TCI state for PRACH transmission can be indicated separately, e.g., via MAC CE and/or a separate DCI.

In embodiment I.12, a UE can be configured with PUSCH transmission(s) that correspond to a configured grant Type 1 or Type 2. The configured grant Type 1 PUSCH transmission is semi-statically configured to operate upon the reception of higher layer parameter of configuredGrantConfig including rrc-ConfiguredUplinkGrant without the detection of an UL grant in a DCI. The configured grant Type 2 PUSCH transmission is semi-persistently scheduled (SPS) by an UL grant in a valid activation DCI after the reception of higher layer parameter configuredGrantConfig not including rrc-ConfiguredUplinkGrant. If Configuredgrantconfig-ToAddModList-r16 is configured, more than one configured grant configuration of configured grant Type 1 and/or configured grant Type 2 may be active at the same time on an active BWP of a serving cell. For the configured grant Type 2 PUSCH transmission, the UE is configured with cs-RNTI (RNTI used for the reception of DCI activating/releasing SPS). A UE shall monitor PDCCH with CRC scrambled by the cs-RNTI in every slot as the gNB can activate/reactivate/release SPS at any time using a DCI (e.g., DCI Format 0_1 or 0_2 in NR).

The UE can be configured with PUCCH transmission(s) that correspond to a periodic or semi-persistent CSI-report sent on PUCCH. Such PUCCH transmissions are configured by CSI-ReportConfig, without the detection of an UL grant in a UL-DCI. The semi-persistent CSI report on PUCCH can be activated/de-activated by a MAC CE.

The UE can be configured to receive a common beam (TCI state) indication/update indicating the common beam for the transmission of configured grant Type 1 or Typ2 PUSCH and/or PUCCH. This common beam indication can be via a dedicated DCI (UL-TCI-DCI) and/or another DCI activating/releasing PUSCH transmission (configured grant Type 2). The details about this common beam indication are analogous to some embodiments (e.g., embodiment I.7 through I.11/I.11A/I.11B) of this disclosure.

In one example I.12.1, a UE is configured to receive a dedicated DCI (e.g., UL-TCI-DCI) via PDCCH, which includes (a) a field for the common beam (TCI state) and (b) another field for the activation/release of PUSCH transmission (for the configured grant Type 2 PUSCH transmission). When PUSCH transmission is activated by field (b), the UE can be indicated/updated with a new (TCI state) beam for PUSCH transmission (with or without PUCCH transmission) using the field (a). Once PUSCH transmission is not activated or released by field (b), the UE can be indicated/updated with a new (TCI state) beam for PUCCH transmission only using the field (a).

In one example I.12.2, a UE is configured to receive two DCIs: (a) a dedicated DCI (e.g., UL-TCI-DCI) for the common beam (TCI state) and (b) another DCI for the activation/release of PUSCH transmission (for the configured grant Type 2 PUSCH transmission). The two DCIs can be indicated via two separate PDCCHs, or two parts of a PDCCH. In one example, the another DCI can also include a beam indication/update (in addition to the beam indication via UL-TCI-DCI).

In one example I.12.3, a UE is configured to receive a dedicated DCI (UL-TCI-DCI) indicating the common beam (TCI state) for the transmission of UL control (PUCCH) and/or data (PUSCH). The UE receives (e.g., a UL-TCI-DCI format) and decodes UL-TCI-DCI, and uses the indicated beam (TCI state) to transmit UL control (PUCCH) (e.g., periodic PUCCH or semi-persistent PUCCH) and/or data (PUSCH) (e.g., configured grant Type 1).

In one example I.12.4, a UE is configured to receive a DCI and a MAC CE: (a) the MAC CE is for the common beam (TCI state) indication and (b) the DCI is for the activation/release of PUSCH transmission (for the configured grant Type 2 PUSCH transmission). The DCI and a DCI that scheduled MAC CE can be indicated via two separate PDCCHs, or two parts of a PDCCH. In one example, the DCI can also include a beam indication/update (in addition to the beam indication via MAC CE).

When the beam indication is via MAC CE, it is according to a straightforward extension of at least one of embodiments I.7A, I.8A, I.9A, I.10A, I.11AA, I.11AAA, or I.1A, I.2A, I.3A, I.4A, I.5AA, I.5AAA.

In embodiment I.13, a UE can be configured with a dynamic beam (TCI state) indication/update for transmission of PDCCH-triggered contention-free random access (CFRA) preambles either separately from or together with the PDCCH order, wherein the TCI state indication is via RACH-TCI-DCI and/or PDCCH order, and the details about RACH-TCI-DCI is according to the U.S. provisional patent application 63/009,234 filed on Apr. 13, 2020. In particular, the RACH-TCI-DCI can be used/configured to enable the possibility of separate update/indication of the TCI state from the PDCCH order. When the beam indication is separate from the PDCCH order, the indicated beam can be used for both reception of DL control (e.g., PDCCH order)

and transmission of PRACH preamble. This is referred to "common beam (TCI state) indication" in the present disclosure. When the beam indication is together with the PDCCH order, the indicated beam can only be used for the transmission of PRACH preamble. In this case, the beam for the reception of DL control (i.e., PDCCH order) can be another beam (TCI state) as explained in U.S. patent application Ser. No. 17/222,592 filed on Apr. 5, 2021 referenced above.

At least one of the following embodiments can be used. In one option, only one of the following embodiments is used for the beam (TCI state) indication. In another option, multiple of the following embodiments can be used for the beam (TCI state) indication, and one of them is configured to the UE via higher layer (RRC) and/or MAC CE based and/or DCI based signaling. In the following embodiments or examples, the location of a beam (TCI state) indication refers to a carrier DCI such as RACH-TCI-DCI or PDCCH order.

In embodiment I.13.1, the common beam (TCI state) indication is always via RACH-TCI-DCI, and not via PDCCH order. There is only one beam indication, whose location (or carrier DCI) is fixed to RACH-TCI-DCI.

In embodiment I.13.2, the common beam (TCI state) indication can be via RACH-TCI-DCI or PDCCH order. There is only one beam indication, whose location (or carrier DCI) is configured to the UE. At least one of the following examples can be used.

In one example I.13.2.1, the location of the common beam indication is configured via a parameter P. When the parameter P takes a value (e.g., P=0), the beam indication is via RACH-TCI-DCI, and when the parameter P takes another value (e.g., P=1 or P>0), the beam indication is via PDCCH order. The parameter P can be configured via a field in RACH-TCI-DCI. Alternatively, the parameter P can be configured via two states of a higher layer (RRC) parameter. When the parameter P is configured via RACH-TCI-DCI, it can be configured explicitly using a separate field or implicitly using another field (e.g., a joint DCI field for P and TCI state).

In one example I.13.2.2, the location of the common beam indication is configured via a field F in RACH-TCI-DCI. When the value of the field F is a value (e.g., F=0), the beam indication is via PDCCH order, and when the value of the field is another value (e.g., F>0), the beam indication is via RACH-TCI-DCI. In one example, when F>0, the value of F indicates both (a) the information that the beam indication is via RACH-TCI-DCI and (b) the updated beam (TCI state) for both data and control.

In embodiment I.13.3, the common beam (TCI state) indication can be via both RACH-TCI-DCI and PDCCH order. There are two beam indications, one via RACH-TCI-DCI and another via PDCCH order. In one example, a higher layer parameter is set to "enabled", which indicates that the TCI state is indicated via PDCCH order. In another example, MAC CE signaling enables/disables the TCI state indication via PDCCH order (in addition to the beam indication via RACH-TCI-DCI). At least one of the following examples can be used.

In one example I.13.3.1, the TCI state used for the reception of PDCCH order can be the TCI state indicated via RACH-TCI-DCI, and the TCI state used for the transmission of the PRACH preamble can be the TCI state indicated via PDCCH order.

In one example I.13.3.2, the TCI state used for the reception of PDCCH order can be the TCI state indicated via RACH-TCI-DCI, and the TCI state used for the transmission of PRACH preamble can be the latest TCI state indicated via either RACH-TCI-DCI or PDCCH order.

In one example I.13.3.3, the TCI state/spatial relation used for the transmission PRACH preamble follows the TCI state used for the PDCCH order.

In embodiment I.13.4, the common beam (TCI state) indication can be via one or both of RACH-TCI-DCI and PDCCH order. At least one of the following examples can be used.

In one example I.13.4.1, the common beam (TCI state) indication can be via one of the two states (a) RACH-TCI-DCI only or (b) both RACH-TCI-DCI and PDCCH order. In one option, one of the two states is configured via higher layer signaling and/or MAC CE signaling. In another option, the RACH-TCI-DCI indicates one of the two states. When the configured/indicated state is (a), then the common beam indication is according to some of the embodiments of this disclosure, and when the configured/indicated state is (b), then the common beam indication is according to embodiment I.13.3. In an example, RACH-TCI-DCI includes a parameter Z, indicating a number of TCI states. When Z=1, the beam indication is via (a), and when Z=2, the beam indication is via (b). In one example, one of the two states is configured by two RRC parameters. In another example, one of the two states is configured using one RRC parameter.

In one example I.13.4.2, the common beam (TCI state) indication can be via one of the two states (a) PDCCH order only or (b) both RACH-TCI-DCI and PDCCH order. In one option, one of the two states is configured via higher layer signaling and/or MAC CE signaling. In another option, the RACH-TCI-DCI indicates one of the two states. When the configured/indicated state is (a), then the common beam indication is according to some of the embodiments of this disclosure, and when the configured/indicated state is (b), then the common beam indication is according to embodiment I.13.3. In an example, RACH-TCI-DCI includes a parameter Z, indicating a number of TCI states. When Z=1, the beam indication is via (a), and when Z=2, the beam indication is via (b). In one example, one of the two states is configured by two RRC parameters. In another example, one of the two states is configured using one RRC parameter.

In one example I.13.4.3, the common beam (TCI state) indication can be via one of the three states (a) RACH-TCI-DCI only or (b) PDCCH order only or (c) both RACH-TCI-DCI and PDCCH order. In one option, one of the three states is configured via higher layer signaling and/or MAC CE signaling. In another option, the RACH-TCI-DCI indicates one of the three states. When the configured/indicated state is (a) or (b), then the common beam indication is according to some of the embodiments of this disclosure, and when the configured/indicated state is (c), then the common beam indication is according to embodiment I.13.3. In an example, RACH-TCI-DCI includes a parameter Z, indicating a number of TCI states. When Z=0, the beam indication is via (a); when Z=1, the beam indication is via (b); and when Z=2, the beam indication is via (c). In one example, one of the three states is configured by enabling/disabling two RRC parameters. In another example, one of the three states is configured using one RRC parameter.

In embodiment I.13.5, the RACH-TCI-DCI can be a two-stage DCI comprising a first stage DCI and a second stage DCI, wherein the first stage DCI is always present (i.e., configured and hence can be received by the UE), has a fixed payload, and indicates the presence (i.e., configured and hence can be received by the UE) or absence (i.e., not configured and/or hence not received) of the second stage DCI. When the second stage DCI is absent (not configured and/or not received), the UE assumes that there is no update in the TCI state. When the second stage DCI is present (configured and hence can be received by the UE), the UE uses/updates the TCI state according to the second stage DCI. At least one of the following examples can be used.

In one example I.13.5.1, the location of the second stage DCI is fixed to PDDCH order.

In one example I.13.5.2, the location of the second stage DCI is fixed to a dedicated (second stage) RACH-TCI-DCI.

In one example I.13.5.3, the location of the second stage DCI can be PDCCH order or a dedicated (second stage) RACH-TCI-DCI. In this case, when the first stage DCI indicates that the second stage is present (configured to the UE), the location of the second stage DCI is also indicated (via the first stage DCI). For example, when a field Y in the first stage DCI is set to 00, the second stage DCI is absent; when the field Y in the first stage DCI is set to 01, the second stage DCI is present and the location of the second stage DCI is DL-DCI; and when the field Y in the first stage DCI is set to 10, the second stage DCI is present and the location of the second stage DCI is (second stage) DL-TCI-DCI.

In embodiment I.13A, the common beam (TCI state) indication can be via one or both of RACH-TCI-DCI and PDCCH order. At least one of the following examples can be used.

In one example I.13A.1, the common beam (TCI state) indication is based in two RRC parameters, for example, rach-tci-dci-IsPresent and tci-PresentInDCI as follows. When rach-tci-dci-IsPresent=enabled, tci-PresentInDCI=enabled, and
  When a time threshold is met, then the TCI state for PDCCH order reception is via RACH-TCI-DCI, and the TCI state for RACH preamble transmission is via PDCCH order, and
  When a time threshold is not met, then the TCI state for both PDCCH order reception and RACH preamble transmission is via RACH-TCI-DCI.
When rach-tci-dci-IsPresent=enabled and tci-PresentInDCI is not provided, then TCI state for both PDCCH order reception and RACH preamble transmission is via RACH-TCI-DCI.

In one example I.13A.2, the common beam (TCI state) indication is via both RACH-TCI-DCI and PDCCH order. In particular, TCI state 1 is indicated via RACH-TCI-DCI and TCI state 2 is indicated via PDCCH order. Then, the TCI state for PDCCH order reception is the latest of TCI state 1 and TCI state 2. Alternatively, the TCI state for PDCCH order reception is the latest of TCI state 1 or TCI state 2 or a TCI state indicated via MAC CE. The TCI state for RACH preamble transmission is TCI state 2.

In one example I.13A.3, the common beam (TCI state) indication is via both RACH-TCI-DCI and PDCCH order. In particular, TCI state 1 is indicated via RACH-TCI-DCI and TCI state 2 is indicated via PDCCH order. The TCI state for both PDCCH order reception and RACH preamble transmission is the latest of TCI state 1 and TCI state 2. Alternatively, the TCI state for both PDCCH order reception and RACH preamble transmission is the latest of TCI state 1 or TCI state 2 or a TCI state indicated via MAC CE. Alternatively, the TCI state for both PDCCH order reception and RACH preamble transmission is the latest of TCI state 1 or TCI state 2 or a TCI state indicated via MAC CE subject to fixed timeline restrictions.

In embodiment I.13B, the common beam (TCI state) indication can be via one of or multiple of RACH-TCI-DCI or PDCCH order or PDSCH. At least one of the following examples can be used.

In one example I.13B.1, the common beam (TCI state) indication is via both X and PDSCH, where X=RACH-TCI-DCI or PDCCH order. In particular, TCI state 1 is indicated via X and TCI state 2 is indicated via PDSCH. Then, the TCI state for PDCCH order reception is the latest of TCI state 1 and TCI state 2. Alternatively, the TCI state for PDCCH order reception is the latest of TCI state 1 or TCI state 2 or a TCI state indicated via MAC CE. The TCI state for RACH preamble transmission is TCI state 1. In one example, X is fixed to RACH-TCI-DCI. In one example, X is fixed to PDCCH order. In one example, X is configured via RRC and/or MAC CE. When there are HARQ retransmissions for the PDSCH reception (due to PDSCH decoding failure in previous transmission/retransmissions), the TCI state indicated via retransmissions can be the same as the first PDSCH transmission, or it can change during the retransmissions.

In one example I.13B.2, the common beam (TCI state) indication is via all of RACH-TCI-DCI, PDCCH order, and PDSCH. In particular, TCI state 1 is indicated via RACH-TCI-DCI, TCI state 2 is indicated PDCCH order, TCI state 3 is indicated via PDSCH. Then, the TCI state for PDCCH order reception is the latest of TCI state 1 or TCI state 3. Alternatively, the TCI state for PDCCH order reception is the latest of TCI state 1 or TCI state 3 or a TCI state via MAC CE. The TCI state for RACH preamble transmission is TCI state 2. Alternatively, the TCI state for RACH preamble transmission is the latest of TCI state 1 and TCI state 2. When there are HARQ retransmissions for the PDSCH reception (due to PDSCH decoding failure in previous transmission/retransmissions), the TCI state indicated via retransmissions can be the same as the first PDSCH transmission, or it can change during the retransmissions.

The common beam indication for UL can also be via MAC CE (and/or DCI). When the beam indication is via MAC CE, it is according to a straightforward extension of at least one of embodiments I.7A, I.8A, I.9A, I.10A, I.11AA, I.11AAA, or I.1A, I.2A, I.3A, I.4A, I.5AA, I.5AAA.

Component 3: Content of Beam Indication DCI for DL and UL

In some embodiments of this disclosure, a UE is configured with a dynamic beam (TCI state) indication/update for both DL reception and UL transmission either separately from or together with the DL assignment/UL grant, wherein the TCI state indication is via TCI-DCI and/or DL assignment (DL-DCI) and/or UL grant (UL-DCI), and the details about TCI-DCI is according to U.S. patent application Ser. No. 17/222,592 filed on Apr. 5, 2021 referenced above. In particular, the TCI-DCI can be used/configured to enable the possibility of separate update/indication of the TCI state from the DL assignment/UL grant.

The indicated beam (TCI state) can be common for all DL and UL channels. In particular, the indicated common beam is used for the reception of DL control (PDCCH) and DL data (PDSCH) as well as for the transmission of UL control (PUCCH) and UL data (PUSCH), wherein PUCCH can be associated with (or in response to) DL reception and/or UL transmission. Optionally, the common beam can also be used for the transmission of PRACH.

Optionally, the indicated beam (TCI state) can be common for at least one DL channel and at least one UL channel. In particular, the indicated common beam is used for the reception of at least one DL channel (where the at least one DL channel corresponds to PDCCH or PDSCH) and for the transmission of at least one UL channel (where the at least one UL channel corresponds to PUCCH or PUSCH or PRACH).

When the beam indication is separate from the DL assignment/UL grant (i.e., it is via TCI-DCI), the indicated beam can be used for the reception of DL control (e.g., PDCCH carrying DL-DCI/UL-DCI) and/or DL data (PDSCH) as well as for the transmission of UL control (PUCCH) and/or UL data (PUSCH) and/or PRACH.

When the beam indication is together with the DL assignment (i.e., it is via DL-DCI), the indicated beam can only be used for the reception of DL data (the beam for the reception of DL-DCI can be another beam (TCI state) as explained in U.S. patent application Ser. No. 17/214,738 filed on Mar. 26, 2021 referenced above and/or DL control carrying UL-DCI. Also, the indicated beam can also be used for the transmission of UL data (PUSCH) and/or UL control (PUCCH) and/or PRACH.

When the beam indication is together with the UL grant (i.e., it is via UL-DCI), the indicated beam can be used for the transmission of UL data (PUSCH) and/or UL control (PUCCH) and/or PRACH. Also, the indicated beam can also be used for the reception of DL control (e.g., PDCCH carrying DL-DCI) and/or DL data (PDSCH).

At least one of the following embodiments can be used. In one option, only one of the following embodiments is used for the beam (TCI state) indication. In another option, multiple of the following embodiments can be used for the beam (TCI state) indication, and one of them is configured to the UE via higher layer (RRC) and/or MAC CE based and/or DCI based signaling.

In the following embodiments or examples, the location of a beam (TCI state) indication refers to a carrier DCI such as TCI-DCI or DL-DCI or UL-DCI.

In embodiment I.14, the common beam (TCI state) indication is always via TCI-DCI, and not via DL-DCI or UL-DCI. There is only one beam indication, whose location (or carrier DCI) is fixed to TCI-DCI.

In embodiment I.14A, the common beam (TCI state) indication is always via MAC CE (carried via PDSCH which is scheduled via a DCI), and not via TCI-DCI or UL-DCI or DL-DCI. There is only one beam indication, whose location (or carrier channel) is fixed to PDSCH carrying MAC CE. In one example, the beam indication indicates a single beam (TCI state) for both DL and UL channels/RSs. In one example, the beam indication indicates two beams (TCI states) one for DL channels/RSs and one for UL channels/RSs.

In embodiment I.15, the common beam (TCI state) indication can be via A-DCI. There is only one beam indication, whose location A (or carrier DCI) is configured to the UE from the set {TCI-DCI, DL} or {TCI-DCI, UL} or {TCI-DCI, DL-DCI, UL-DCI}. At least one of the following examples can be used.

In one example I.15.1, the location A of the common beam indication is configured via a parameter P. For instance, for A being configured from {TCI-DCI, DL} or {TCI-DCI, UL}, when the parameter P takes a value (e.g., P=0), the beam indication is via TCI-DCI, and when the parameter P takes another value (e.g., P=1 or P>0), the beam indication is via DL-DCI or UL-DCI. The parameter P can be configured via a field in TCI-DCI. Alternatively, the parameter P can be configured via a higher layer (RRC) parameter. When the parameter P is configured via TCI-DCI, it can be configured explicitly using a separate field or implicitly using another field (e.g., a joint DCI field for P and TCI state).

In one example I.15.2, the location A of the common beam indication is configured via a field F in TCI-DCI. For instance, for A being configured from {TCI-DCI, DL} or {TCI-DCI, UL}, when the value of the field F is a value (e.g., F=0), the beam indication is via DL-DCI or UL-DCI, and when the value of the field is another value (e.g., F>0), the beam indication is via TCI-DCI. In one example, when F>0, the value of F indicates both (a) the information that the beam indication is via TCI-DCI and (b) the updated beam (TCI state) for both data and control.

In one example I.15.3, the location of the common beam indication is configured via a RRC parameter, e.g., tci-PresentInDCI (in PDSCH-Config), or a MAC CE parameter. For example, when the parameter is provided, the common beam indication is via TCI-DCI, otherwise it is via A-TCI, where A=DL or UL.

In embodiment I.15A, the common beam (TCI state) indication can be via X-DCI or MAC CE, where X=DL or UL or TCI, and MAC CE is carried via PDSCH which is scheduled via a DCI. There is only one beam indication, whose location (or carrier channel) is configured to the UE. This configuration can be via RRC and/or MAC CE. In one example (E1), the beam indication indicates a single beam (TCI state) for both DL and UL channels/RSs. In one example (E2), the beam indication indicates two beams (TCI states) one for DL channels/RSs and one for UL channels/RSs. When beam indication is via X-DCI, a subset of up to N (e.g., N=8) beams can be activated via MAC CE (similar to Rel. 15) that maps to up to N code points of a DCI field in X-DCI. When beam indication is via MAC CE, a single beam, i.e., N=1 (or two beams, in case of example E2) is (or are) indicated. Note that N here is the number of TCI states in the activated TCI state set. At least one of the following examples can be used.

In one example I.15A.1, the location of the common beam indication is configured via a parameter P. When the parameter P takes a value (e.g., P=0), the beam indication is via X-DCI, and when the parameter P takes another value (e.g., P=1 or P>0), the beam indication is via MAC CE. The parameter P can be configured via a field in X-DCI. Alternatively, the parameter P can be configured via two states of a higher layer (RRC) parameter. When the parameter P is configured via X-DCI, it can be configured explicitly using a separate field or implicitly using another field (e.g., a joint DCI field for P and TCI state).

In one example I.15A.2, the location of the common beam indication is configured via a field F in X-DCI. When the value of the field F is a value (e.g., F=0), the beam indication is via MAC CE, and when the value of the field is another value (e.g., F>0), the beam indication is via X-DCI. In one example, when F>0, the value of F indicates both (a) the information that the beam indication is via X-DCI and (b) the updated beam (TCI state) for both data and control.

In one example I.15A.3, the location of the common beam indication is configured via a RRC parameter, e.g., tci-PresentInDCI (in PDSCH-Config). When the RRC parameter is provided, the common beam indication is via X-DCI, otherwise it is via MAC CE.

In embodiment I.15B, which is a variation of embodiment I.15A, the common beam (TCI state) indication can be via X-DCI or MAC CE, where X=DL or UL or TCI, based on a condition. In one example, the condition is based on the value of N (the number of activated TCI states), and at least one of the following examples I.2B.1 through I.2B.3 is used/configured. In one example, the condition is based on the value of M (the number of activated TCI states for UL). At least one of the examples I.8B.1 through I.8B.3 is used/configured.

In embodiment I.15C, which is a variation of embodiment I.15A and I.15B, the common beam (TCI state) indication can be via X-DCI or MAC CE, where X=DL or UL or TCI, based on a condition. In one example, the condition is based on the value of N (the number of activated TCI states for DL) and M (the number of activated TCI states for UL), assuming the activated TCI state sets are different for DL and UL, and at least one of the examples I.2C.1 through I.2C.7 is used/configured.

In embodiment I.16, the common beam (TCI state) indication can be via both TCI-DCI and A-DCI. There are two beam indications, one via TCI-DCI and another via A-DCI, and the location A (or carrier DCI) is either fixed to DL or UL, or configured from the set {UL, DL}. In one example, for A=DL, the higher layer parameter tci-PresentInDCI (in PDSCH-Config) is set to "enabled", which indicates that the TCI state is indicated via DL-DCI (in addition to the beam indication via TCI-DCI). In another example, MAC CE signaling enables/disables the TCI state indication via DL-DCI (in addition to the beam indication via TCI-DCI). At least one of the following examples can be used.

In one example I.16.1, when A=DL, the TCI state used for the reception of DL control (e.g., PDCCH carrying DL-DCI and/or UL-DCI) can be the TCI state indicated via TCI-DCI, and the TCI state used for the reception of DL data (PDSCH) can be the TCI state indicated via DL-DCI.

The TCI state for the transmission of PUCCH and/or PUSCH and/or PRACH can be the TCI state indicated via TCI-DCI. Alternatively, the TCI state for the transmission of PUCCH and/or PUSCH and/or PRACH can be the TCI state indicated via DL-DCI. Alternatively, the TCI state for the transmission of PUCCH and/or PUSCH and/or PRACH can be configured from the TCI state indicated via TCI-DCI or DL-DCI. Alternatively, the TCI state for the transmission of PUCCH and/or PUSCH and/or PRACH can be the latest TCI state indicated via either TCI-DCI or DL-DCI.

In one example I.16.2, when A=DL, the TCI state used for the reception of DL control (e.g., PDCCH carrying DL-DCI and/or UL-DCI) can be the TCI state indicated via TCI-DCI, and the TCI state used for the reception of DL data (PDSCH) can be the latest TCI state indicated via either TCI-DCI or DL-DCI.

The TCI state for the transmission of PUCCH and/or PUSCH and/or PRACH can be the TCI state indicated via TCI-DCI. Alternatively, the TCI state for the transmission of PUCCH and/or PUSCH and/or PRACH can be the TCI state indicated via DL-DCI. Alternatively, the TCI state for the transmission of PUCCH and/or PUSCH and/or PRACH can be configured from the TCI state indicated via TCI-DCI or DL-DCI. Alternatively, the TCI state for the transmission of PUCCH and/or PUSCH and/or PRACH can be the latest TCI state indicated via either TCI-DCI or DL-DCI.

In one example I.16.3, when A=UL, the TCI state used for the reception of DL control (e.g., PDCCH carrying DL-DCI and/or UL-DCI) can be the TCI state indicated via TCI-DCI, and the TCI state used for the reception of DL data (PDSCH) can be the TCI state indicated via TCI-DCI or UL-DCI. Alternatively, the TCI state used for the reception of DL data (PDSCH) can be configured from the TCI state indicated via TCI-DCI or UL-DCI.

The TCI state for the transmission of PUCCH and/or PUSCH and/or PRACH can be the TCI state indicated via TCI-DCI. Alternatively, the TCI state for the transmission of PUCCH and/or PUSCH and/or PRACH can be the TCI state indicated via UL-DCI. Alternatively, the TCI state for the transmission of PUCCH and/or PUSCH and/or PRACH can be configured from the TCI state indicated via TCI-DCI or UL-DCI. Alternatively, the TCI state for the transmission of PUCCH and/or PUSCH and/or PRACH can be the latest TCI state indicated via either TCI-DCI or UL-DCI.

In one example I.16.4, when A=UL, the TCI state used for the reception of DL control (e.g., PDCCH carrying DL-DCI and/or UL-DCI) can be the TCI state indicated via TCI-DCI, and the TCI state used for the reception of DL data (PDSCH) can be the latest TCI state indicated via either TCI-DCI or UL-DCI.

The TCI state for the transmission of PUCCH and/or PUSCH and/or PRACH can be the TCI state indicated via TCI-DCI. Alternatively, the TCI state for the transmission of PUCCH and/or PUSCH and/or PRACH can be the TCI state indicated via UL-DCI. Alternatively, the TCI state for the transmission of PUCCH and/or PUSCH and/or PRACH can be configured from the TCI state indicated via TCI-DCI or UL-DCI. Alternatively, the TCI state for the transmission of PUCCH and/or PUSCH and/or PRACH can be the latest TCI state indicated via either TCI-DCI or UL-DCI.

In embodiment I.16A, the common beam (TCI state) indication can be via both X-DCI and MAC CE, where X=UL or DL or TCI, and MAC CE is carried via PDSCH which is scheduled via a DCI. The rest of the details (examples) are the same as embodiment I.2A and I.9A.

In embodiment I.17, the common beam (TCI state) indication can be via one or both of TCI-DCI and A-DCI, where the location A (or carrier DCI) is either fixed to DL or UL, or configured from the set {UL, DL}. At least one of the following examples can be used.

In one example I.17.1, the common beam (TCI state) indication can be via one of the two states (a) TCI-DCI only or (b) both TCI-DCI and A-DCI. In one option, one of the two states is configured via higher layer signaling and/or MAC CE signaling. In another option, the TCI-DCI indicates one of the two states. When the configured/indicated state is (a), then the common beam indication is according to some of the embodiments of this disclosure, and when the configured/indicated state is (b), then the common beam indication is according to embodiment I.16. In an example, TCI-DCI includes a parameter Z, indicating a number of TCI states. When Z=1, the beam indication is via (a), and when Z=2, the beam indication is via (b). In one example, one of the two states is configured by two RRC parameters, e.g., setting tci-dci-IsPresent='enabled' and enabling/disabling tci-PresentInDCI (in PDSCH-Config). In another example, one of the two states is configured using one RRC parameter, e.g., tci-dci-IsPresent or tci-PresentInDCI (in PDSCH-Config).

In one example I.17.2, the common beam (TCI state) indication can be via one of the two states (a) A-DCI only or (b) both TCI-DCI and A-DCI. In one option, one of the two states is configured via higher layer signaling and/or MAC CE signaling. In another option, the TCI-DCI indicates one of the two states. When the configured/indicated state is (a), then the common beam indication is according to some of the embodiments of this disclosure, and when the configured/indicated state is (b), then the common beam indication is according to embodiment I.16. In an example, TCI-DCI includes a parameter Z, indicating a number of TCI states. When Z=1, the beam indication is via (a), and when Z=2, the beam indication is via (b). In one example, one of the two states is configured by two RRC parameters, e.g., setting tci-PresentInDCI (in PDSCH-Config)='enabled' and enabling/disabling tci-dci-IsPresent. In another example, one of the two states is configured using one RRC parameter, e.g., tci-dci-IsPresent or tci-PresentInDCI (in PDSCH-Config).

In one example I.17.3, the common beam (TCI state) indication can be via one of the three states (a) TCI-DCI only or (b) A-DCI only or (c) both TCI-DCI and A-DCI. In one option, one of the three states is configured via higher layer signaling and/or MAC CE signaling. In another option, the TCI-DCI indicates one of the three states. When the configured/indicated state is (a) or (b), then the common beam indication is according to some of the embodiments of this disclosure, and when the configured/indicated state is (c), then the common beam indication is according to embodiment I.16. In an example, TCI-DCI includes a parameter Z, indicating a number of TCI states. When Z=0, the beam indication is via (a); when Z=1, the beam indication is via (b); and when Z=2, the beam indication is via (c). In one example, one of the three states is configured by enabling/disabling two RRC parameters, e.g., tci-dci-IsPresent and tci-PresentInDCI (in PDSCH-Config). In another example, one of the three states is configured using one RRC parameter, e.g., tci-dci-IsPresent or tci-PresentInDCI (in PDSCH-Config).

In one example I.17.4, the common beam (TCI state) indication can be via one of the three states (a) TCI-DCI only or (b) A-DCI only or (c) both TCI-DCI and B-DCI, where A≠B, and (A, B) is either fixed to (DL, UL) or (UL, DL), or configured from the set {(DL, UL), (UL, DL)}. In one option, one of the three states is configured via higher layer signaling and/or MAC CE signaling. In another option, the TCI-DCI indicates one of the three states. When the configured/indicated state is (a) or (b), then the common beam indication is according to some of the embodiments of this disclosure, and when the configured/indicated state is (c), then the common beam indication is according to embodiment I.16. In an example, TCI-DCI includes a parameter Z, indicating a number of TCI states. When Z=0, the beam indication is via (a); when Z=1, the beam indication is via (b); and when Z=2, the beam indication is via (c). In one example, one of the three states is configured by enabling/disabling two RRC parameters, e.g., tci-dci-IsPresent and tci-PresentInDCI (in PDSCH-Config). In another example, one of the three states is configured using one RRC parameter, e.g., tci-dci-IsPresent or tci-PresentInDCI (in PDSCH-Config).

In embodiment I.17A, the common beam (TCI state) indication can be via one or both X-DCI and MAC CE, where X=UL or DL or TCI, and MAC CE is carried via PDSCH which is scheduled via a DCI. The rest of the details (examples) are the same as embodiment I.3A and I.10A.

In embodiment I.18, the common beam (TCI state) indication can be via all three DCIs, TCI-DCI, DL-DCI, and UL-TCI. In one example, a higher layer parameter is set to "enabled", which indicates that the TCI state is indicated via DL-DCI and/or UL-DCI (in addition to the beam indication via TCI-DCI). In another example, MAC CE signaling enables/disables the TCI state indication via DL-DCI and/or UL-DCI (in addition to the beam indication via TCI-DCI). At least one of the following examples can be used.

In one example I.18.1, the TCI state used for the reception of DL control (e.g., PDCCH carrying DL-DCI and/or UL-DCI) can be the TCI state indicated via TCI-DCI, the TCI state used for the reception of DL data (PDSCH) can be the TCI state indicated via DL-DCI, and the TCI state used for the transmission of UL data (PDSCH) and/or PUCCH and/or PRACH can be the TCI state indicated via UL-DCI. Alternatively, the TCI state for the transmission of PUCCH and/or PUSCH and/or PRACH can be configured, e.g., from the TCI state indicated via TCI-DCI or DL-DCI or UL-DCI. Alternatively, the TCI state for the transmission of PUCCH and/or PUSCH and/or PRACH can be the latest TCI state indicated via either TCI-DCI or DL-DCI or UL-DCI.

In one example I.18.2, the TCI state used for the reception of DL control (e.g., PDCCH carrying DL-DCI and/or UL-DCI) can be the TCI state indicated via TCI-DCI, the TCI state for the reception of PDSCH can be configured, e.g., from the TCI state indicated via TCI-DCI or DL-DCI or UL-DCI, and the TCI state used for the transmission of UL data (PDSCH) and/or PUCCH and/or PRACH can be the TCI state indicated via UL-DCI. Alternatively, the TCI state for the transmission of PUCCH and/or PUSCH and/or PRACH can be configured, e.g., from the TCI state indicated via TCI-DCI or DL-DCI or UL-DCI. Alternatively, the TCI state for the transmission of PUCCH and/or PUSCH and/or PRACH can be the latest TCI state indicated via either TCI-DCI or DL-DCI or UL-DCI.

In one example I.18.3, the TCI state used for the reception of DL control (e.g., PDCCH carrying DL-DCI and/or UL-DCI) can be the TCI state indicated via TCI-DCI, the TCI state for the reception of PDSCH can be the latest TCI state indicated via either TCI-DCI or DL-DCI or UL-DCI, and the TCI state used for the transmission of UL data (PDSCH) and/or PUCCH and/or PRACH can be the TCI state indicated via UL-DCI. Alternatively, the TCI state for the transmission of PUCCH and/or PUSCH and/or PRACH can be configured, e.g., from the TCI state indicated via TCI-DCI or DL-DCI or UL-DCI. Alternatively, the TCI state for the transmission of PUCCH and/or PUSCH and/or PRACH can be the latest TCI state indicated via either TCI-DCI or DL-DCI or UL-DCI.

In embodiment I.18AA, the common beam indication can be a two-stage indication comprising a first stage indication and a second stage indication, wherein the first stage indication is always present (i.e., configured and hence can be received by the UE), has a fixed payload, and indicates the presence (i.e., configured and hence can be received by the UE) or absence (i.e., not configured and/or hence not received) of the second stage indication. When the second stage indication is absent (not configured and/or not received), the UE assumes that there is no update in the TCI state. When the second stage indication is present (configured and hence can be received by the UE), the UE uses/updates the TCI state according to the second stage DCI. At least one of the following examples can be used. In one example, the first stage indication is via MAC CE, and the second stage indication is via X-DCI.

In one example I.18AA.1, the first stage indication is via MAC CE, and the location of the second stage indication is fixed to X-DCI, where X=UL or DL or TCI-DCI.

In one example I.18AA.2, the first stage indication is via a first stage MAC CE, and the location of the second stage indication is fixed to a second stage MAC CE.

In one example I.18AA.3, the first stage indication is via X-DCI, where X=UL or DL or TCI-DCI, and the location of the second stage indication is fixed to MAC CE.

In one example I.18AA.4, the first stage indication is via MAC CE, and the location of the second stage DCI can be X-DCI or MAC CE. In this case, when the first stage indication indicates that the second stage is present (configured to the UE), the location of the second stage indication is also indicated (via the first stage indication). For example, when a field Y in the first stage indication is set to 00, the second stage indication is absent; when the field Y in the first stage indication is set to 01, the second stage indication is present and the location of the second stage indication is X-DCI; and when the field Y in the first stage indication is set to 10, the second stage indication is present and the location of the second stage indication is (second stage) MAC CE.

In embodiment I.18A, the common beam (TCI state) indication can be via one or both of TCI-DCI and A-DCI, where the location A (or carrier DCI) is either fixed to DL or UL, or configured from the set {UL, DL}. At least one of the following examples can be used.

In one example I.18A.1, the common beam (TCI state) indication is based in two RRC parameters, for example, tci-dci-IsPresent and tci-PresentInDCI as follows. When tci-dci-IsPresent=enabled, tci-PresentInDCI=enabled, and
When a time threshold is met, then the TCI state for UL control transmission (and DL control reception) is via TCI-DCI, and the TCI state for UL data transmission (and DL data reception) is via A-DCI, and
When a time threshold is not met, then the TCI state for both UL data and UL control transmission (and DL data and DL control reception) is via TCI-DCI.
When tci-dci-IsPresent=enabled and tci-PresentInDCI is not provided, then TCI state for both UL data and UL control transmission (and DL data and DL control reception) is via TCI-DCI. The TCI state for PRACH transmission can be the one via TCI-DCI or A-DCI. Alternatively, the TCI state for PRACH transmission can be indicated separately, e.g., via MAC CE and/or a separate DCI.

In one example I.18A.2, the common beam (TCI state) indication is via both TCI-DCI and A-DCI. In particular, TCI state 1 is indicated via TCI-DCI and TCI state 2 is indicated via A-DCI (e.g., by setting tci-PresentInDCI=enabled). Then, the TCI state for UL control transmission (and DL control reception) is the latest of TCI state 1 and TCI state 2. Alternatively, the TCI state for UL control transmission (and DL control reception) is the latest of TCI state 1 or TCI state 2 or a TCI state indicated via MAC CE. The TCI state for UL data transmission (and DL data reception) is TCI state 2. The TCI state for PRACH transmission can be the one via TCI-DCI or A-DCI. Alternatively, the TCI state for PRACH transmission can be indicated separately, e.g., via MAC CE and/or a separate DCI.

In one example I.18A.3, the common beam (TCI state) indication is via both TCI-DCI and A-DCI. In particular, TCI state 1 is indicated via TCI-DCI and TCI state 2 is indicated via A-DCI (e.g., by setting tci-PresentInDCI=enabled). The TCI state for both UL data and UL control transmission (and DL data and DL control reception) is the latest of TCI state 1 and TCI state 2. Alternatively, the TCI state for both UL data and UL control transmission (and DL data and DL control reception) is the latest of TCI state 1 or TCI state 2 or a TCI state indicated via MAC CE. Alternatively, the TCI state for both UL data and UL control transmission (and DL data and DL control reception) is the latest of TCI state 1 or TCI state 2 or a TCI state indicated via MAC CE subject to fixed timeline restrictions. The TCI state for PRACH transmission can be the one via TCI-DCI or A-DCI. Alternatively, the TCI state for PRACH transmission can be indicated separately, e.g., via MAC CE and/or a separate DCI.

In embodiment I.18B, the common beam (TCI state) indication can be via one of or multiple of TCI-DCI or A-DCI or PDSCH, where the location A (or carrier DCI) is either fixed to DL or UL, or configured from the set {UL, DL}. In one example, PDSCH can carry a MAC CE parameter (or activation command or bitmap) for the common beam indication, where the MAC CE parameter is included in the MAC control message that the UE is configured to receive via a MAC CE PDSCH, and such a configuration can be received via a DCI in PDCCH. Also, the MAC CE PDSCH can be dedicated for MAC control message (without any DL data), or it can be a PDSCH with both MAC CE control message and DL-data multiplexed together. In one example, PDSCH can carry the common beam indication multiplexed with DL data (i.e., without any MAC control message). At least one of the following examples can be used.

In one example I.18B.1, the common beam (TCI state) indication is via both X-DCI and PDSCH, where X=TCI or A. In particular, TCI state 1 is indicated via X-DCI and TCI state 2 is indicated via PDSCH. Then, the TCI state for UL control transmission (and DL control reception) is the latest of TCI state 1 and TCI state 2. Alternatively, the TCI state for UL control transmission (and DL control reception) is the latest of TCI state 1 or TCI state 2 or a TCI state indicated via MAC CE. The TCI state for UL data transmission (and DL data reception) is TCI state 1. In one example, X is fixed to TCI. In one example, X is fixed to A. In one example, X is configured via RRC and/or MAC CE. When there are HARQ retransmissions for the PDSCH reception (due to PDSCH decoding failure in previous transmission/retransmissions), the TCI state indicated via retransmissions can be the same as the first PDSCH transmission, or it can change during the retransmissions. The TCI state for PRACH transmission can be the one via X-DCI or PDSCH. Alternatively, the TCI state for PRACH transmission can be indicated separately, e.g., via MAC CE and/or a separate DCI.

In one example I.18B.2, the common beam (TCI state) indication is via all of TCI-DCI, A-DCI, and PDSCH. In particular, TCI state 1 is indicated via TCI-DCI, TCI state 2 is indicated A-TCI, TCI state 3 is indicated via PDSCH. Then, the TCI state for UL control transmission (and DL control reception) is the latest of TCI state 1 or TCI state 3. Alternatively, the TCI state for UL control transmission (and DL control reception) is the latest of TCI state 1 or TCI state 3 or a TCI state via MAC CE. The TCI state for UL data transmission (and DL data reception) is TCI state 2. Alternatively, the TCI state for UL data transmission (and DL data reception) is the latest of TCI state 1 and TCI state 2. When there are HARQ retransmissions for the PDSCH reception (due to PDSCH decoding failure in previous transmission/retransmissions), the TCI state indicated via retransmissions can be the same as the first PDSCH transmission, or it can change during the retransmissions. The TCI state for PRACH transmission can be the one via TCI-DCI, A-DCI or PDSCH. Alternatively, the TCI state for PRACH transmission can be indicated separately, e.g., via MAC CE and/or a separate DCI.

In embodiment I.19, the common beam indication according to some embodiments of this disclosure is subject to UE capability reporting. That is, when the UE capability reporting includes an indication that the UE is capable of the common beam indication, then the NW/gNB can configure the UE with the common beam indication as proposed in some embodiments of this disclosure. Otherwise (when the UE doesn't report the common beam indication capability), the NW/gNB can configure the UE with the beam indication according to Rel. 15/16 beam indication mechanism (i.e., the TCI state for DL control reception is via MAC CE, and the TCI state for DL data reception is either the same TCI state as for DL control, or is indicated via DL-DCI).

Also, multiple common beam indication schemes (as proposed in this disclosure) are supported by the UE, then one of them can be configured via RRC and/or MAC CE and/or DCI.

In embodiment I.20, the UE can be configured with one of the following configurations for the common beam (TCI state) indication.

Config1: the TCI state indication is based on Rel. 15/R16 beam indication mechanism (i.e., the TCI state for DL control reception or UL control transmission is via MAC CE, and the TCI state for DL data reception or UL data transmission is either the same TCI state as for DL/UL control, or is indicated via DL/UL-DCI).

Config2: the TCI state indication is updated via UL/DL-DCI (e.g., DCI Format 1_x and/or DCI Format 0_x, where x=0,1)

Config3: the TCI state indication is updated via a dedicated DL/TC-TCI-DCI or TCI-DCI.

Config4: the TCI state indication is updated via a combination of Config2 and Config3, e.g., the latest TCI state indicated via Config2 and Config3. This could be subject to a fixed timeline restriction.

Config5: the TCI state indication is updated via MAC-CE command for both data and control.

The common beam indication for both DL and UL can also be via MAC CE (and/or DCI). When the beam indication is via MAC CE, it is according to a straightforward extension of at least one of embodiments I.1A, I.2A, I.3A, I.4A, I.5AA, I.5AAA.

Component 4: MAC CE Based Beam Indication

As described in the 3GPP specification TS 38.321, a MAC PDU consists of one or more MAC subPDUs. Each MAC subPDU consists of one of the following:
- A MAC subheader only (including padding);
- A MAC subheader and a MAC SDU;
- A MAC subheader and a MAC CE;
- A MAC subheader and padding.

The MAC SDUs are of variable sizes. Each MAC subheader corresponds to either a MAC SDU, a MAC CE, or padding. A MAC subheader except for fixed sized MAC CE, padding, and a MAC SDU containing UL CCCH consists of the header fields R/F/LCID/(eLCID)/L. A MAC subheader for fixed sized MAC CE, padding, and a MAC SDU containing UL CCCH consists of the two header fields R/LCID.

Figure 16:
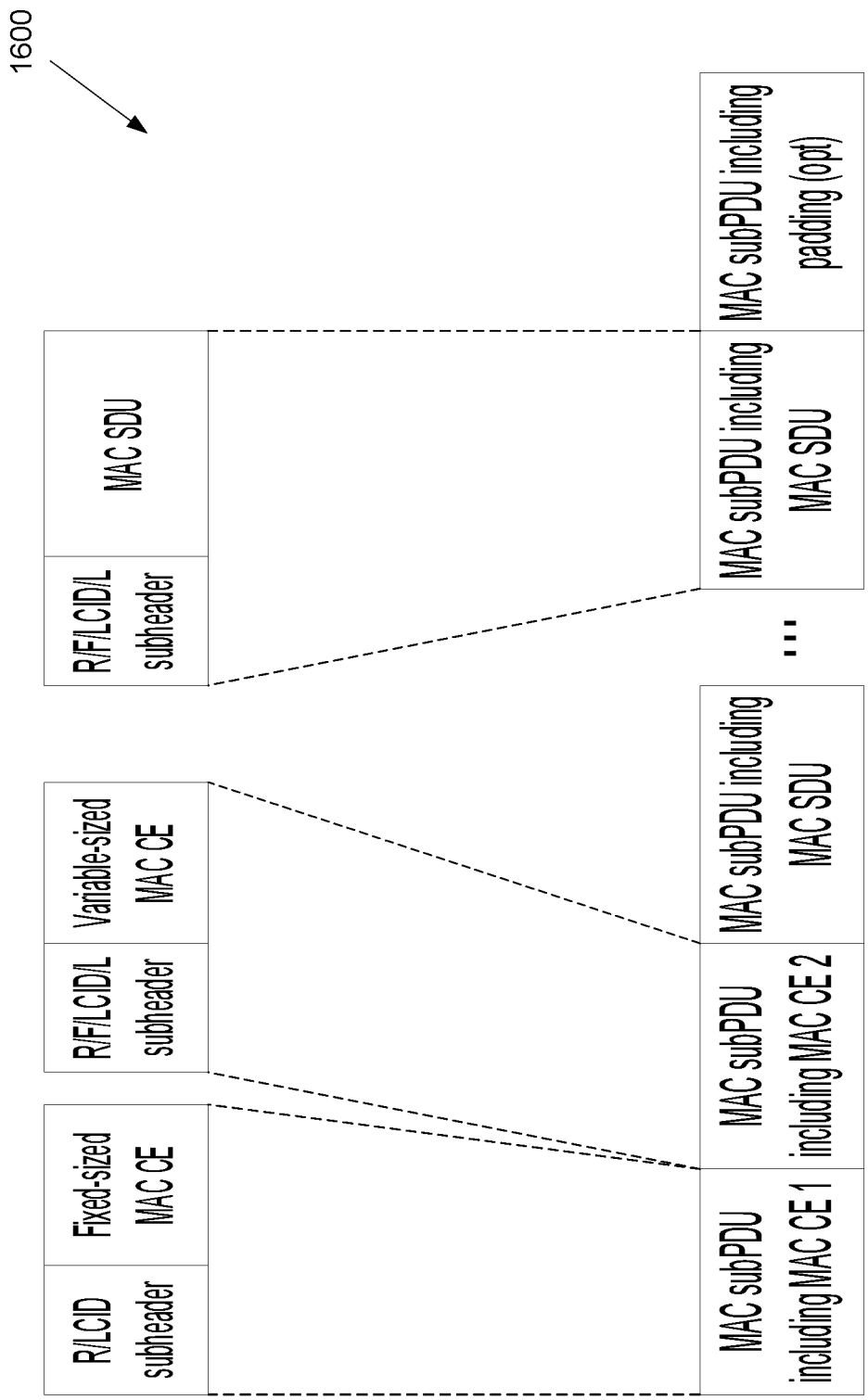
FIG. 16 illustrates an example of a DL MAC PDU according to embodiments of the present disclosure.

An example of a DL MAC PDU 1600 is illustrated in FIG. 16. The example of a DL MAC PDU 1600 illustrated in FIG. 16 is for illustration only. FIG. 16 does not limit the scope of this disclosure to any particular implementation of the example of a DL MAC PDU 1600.

As shown in FIG. 16, MAC CEs are placed together. DL MAC subPDU(s) with MAC CE(s) is placed before any MAC subPDU with MAC SDU and MAC subPDU with padding.

In embodiment II.1, when the beam (or TCI state) indication is via MAC CE, the TCI State Indication MAC CE is identified by a MAC subheader with LCID as specified in Table 6.2.1-1 of TS 38.321, for example, by using an existing codepoint/index (e.g., 52 or 53) in Table 6.2.1-1 or using a new codepoint/index (e.g., 63) in Table 6.2.1-1.

TABLE 6.2.1-1

Values of LCID for DL-SCH

| Codepoint/Index | LCID values |
| --- | --- |
| 0 | CCCH |
| 1-32 | Identity of the logical channel |
| 33 | Extended logical channel ID field (two-octet eLCID field) |
| 34 | Extended logical channel ID field (one-octet eLCID field) |
| 35 | Reserved |
| 36 | SP Positioning SRS Activation/Deactivation |
| 37 | Duplication RLC Activation/Deactivation |
| 38 | Absolute Timing Advance Command |
| 39 | CC list-based SRS Activation/Deactivation |
| 40 | PUSCH Pathloss Reference RS Activation/Deactivation |
| 41 | SRS Pathloss Reference RS Activation/Deactivation |
| 42 | AP SRS spatial relation Indication |
| 43 | Enhanced PUCCH spatial relation Activation/Deactivation |
| 44 | Enhanced TCI States Activation/Deactivation for UE-specific PDSCH |
| 45 | Number of Provided Guard Symbols |
| 46 | Timing Delta |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octets) |
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

The MAC CE has a fixed size of 16 or 24 bits and all of some include the following fields:

Serving Cell ID: This field indicates the identity of the Serving Cell for which the MAC CE applies.

CORESET ID: This field indicates a Control Resource Set identified with ControlResourceSetId as specified in TS 38.331, for which the TCI State is being indicated.

TCI State ID: This field indicates the TCI state identified by TCI-StateId as specified in TS 38.331 applicable to the DL data and control and also to UL data and control.

BWP ID: This field indicates a DL BWP for which the MAC CE applies as the codepoint of the DCI bandwidth part indicator field as specified in TS 38.212.

CORESET Pool ID: This field indicates that mapping between the activated TCI states and the codepoint of the DCI Transmission Configuration Indication set by field Ti is specific to the ControlResourceSetId configured with CORESET Pool ID as specified in TS 38.331. This field is set to 1 indicates that this MAC CE shall be applied for the DL transmission scheduled by CORESET with the CORESET pool ID equal to 1, otherwise, this MAC CE shall be applied for the DL transmission scheduled by CORESET pool ID equal to 0.

Figure 17:
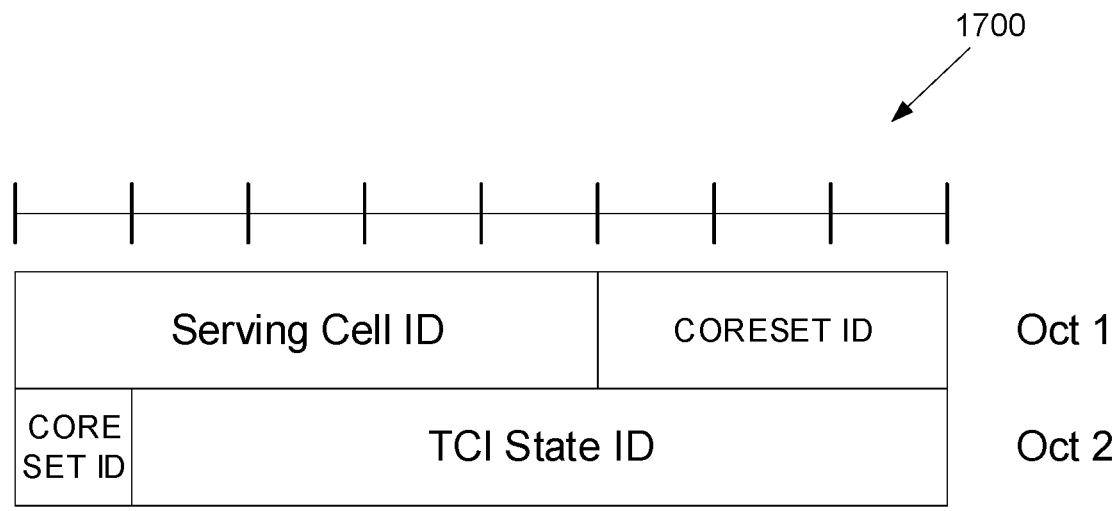
FIG. 17 illustrates an example of a MAC CE for common beam (TCI State) indication wherein a single TCI state is indicated according to embodiments of the present disclosure.

FIG. 17 illustrates an example of a MAC CE for common beam (TCI State) indication wherein a single TCI state is indicated 1700. The example of a MAC CE for common beam (TCI State) indication 1700 is for illustration only. FIG. 17 does not limit the scope of this disclosure to any particular implementation of the example of a MAC CE for common beam (TCI State) indication 1700.

Figure 18:
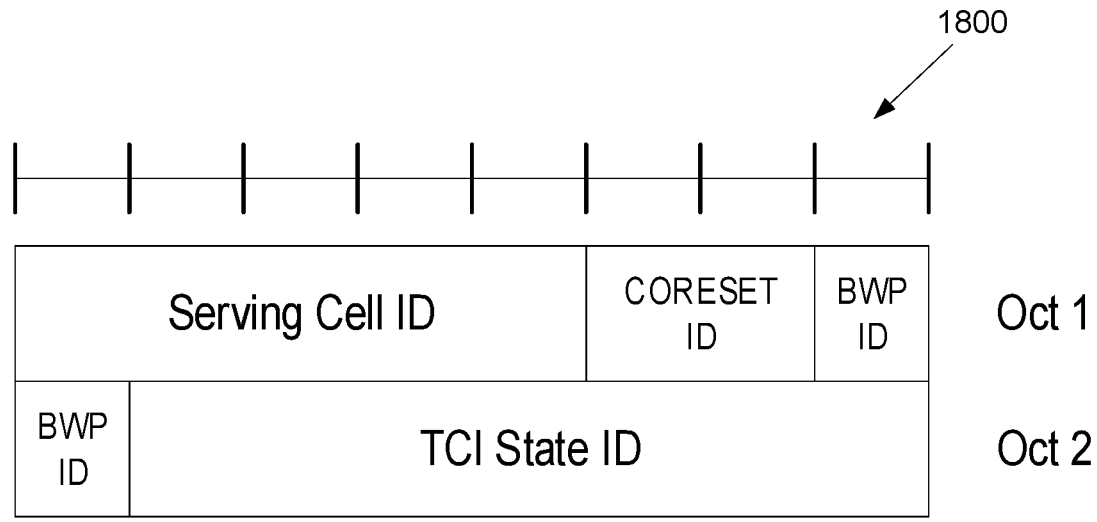
FIG. 18 illustrates another example of a MAC CE for common beam (TCI State) indication wherein a single TCI state is indicated according to embodiments of the present disclosure.

FIG. 18 illustrates another example of a MAC CE for common beam (TCI State) indication wherein a single TCI state is indicated 1800. The example of a MAC CE for common beam (TCI State) indication 1800 is for illustration only. FIG. 18 does not limit the scope of this disclosure to any particular implementation of the example of a MAC CE for common beam (TCI State) indication 1800.

Figure 19:
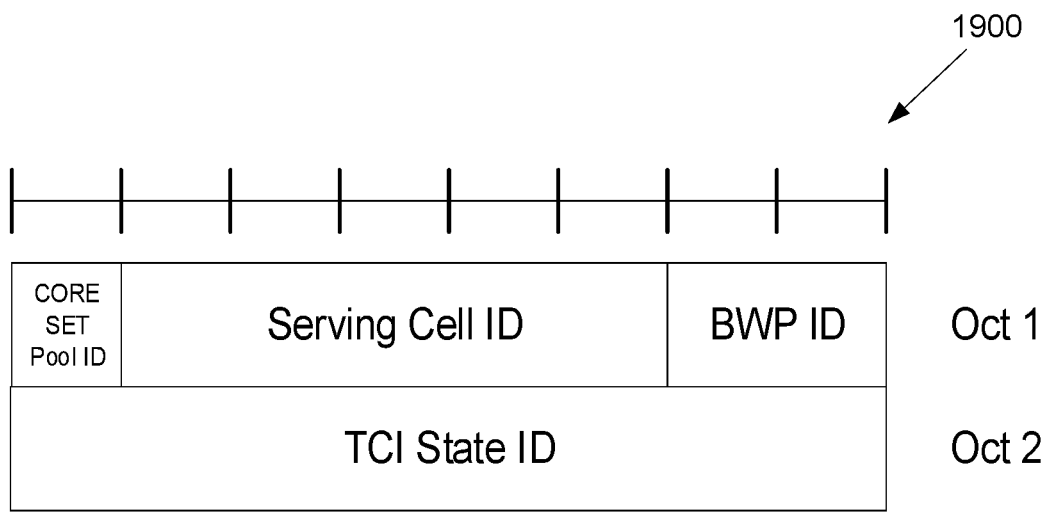
FIG. 19 illustrates yet another example of a MAC CE for common beam (TCI State) indication wherein a single TCI state is indicated according to embodiments of the present disclosure.

FIG. 19 illustrates yet another example of a MAC CE for common beam (TCI State) indication wherein a single TCI state is indicated 1900. The example of a MAC CE for common beam (TCI State) indication 1900 is for illustration only. FIG. 19 does not limit the scope of this disclosure to any particular implementation of the example of a MAC CE for common beam (TCI State) indication 1900.

Figure 20:
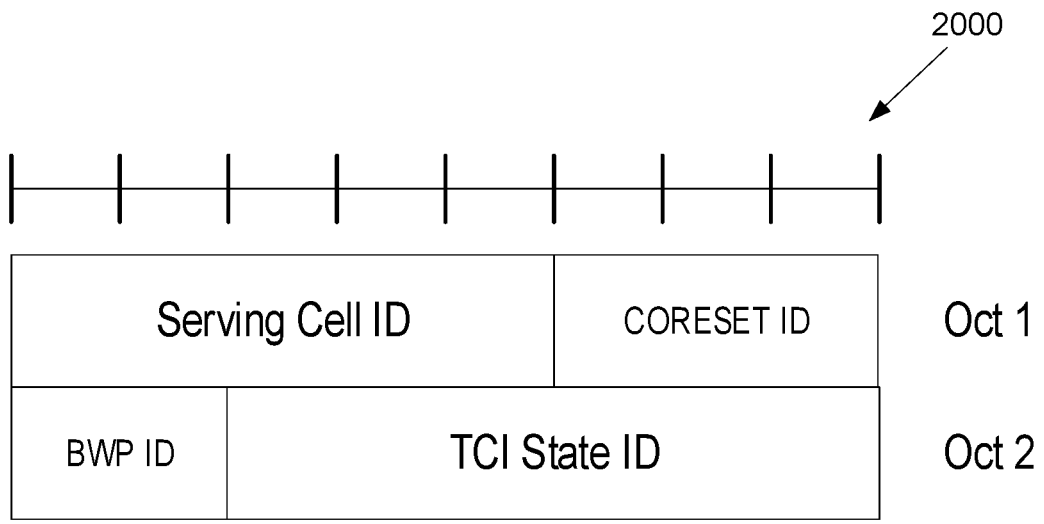
FIG. 20 illustrates an example of a MAC CE for common beam (TCI State) indication wherein a single TCI state is indicated according to embodiments of the present disclosure.

FIG. 20 illustrates still another example of a MAC CE for common beam (TCI State) indication wherein a single TCI state is indicated 2000. The example of a MAC CE for common beam (TCI State) indication 2000 is for illustration only. FIG. 20 does not limit the scope of this disclosure to any particular implementation of the example of a MAC CE for common beam (TCI State) indication 2000.

Figure 21:
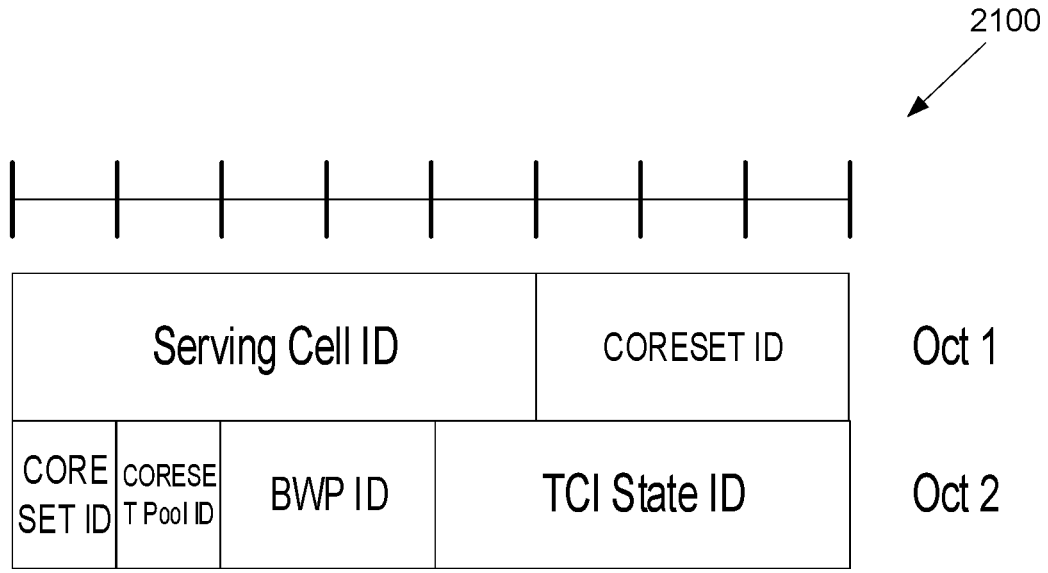
FIG. 21 illustrates another example of a MAC CE for common beam (TCI State) indication wherein a single TCI state is indicated according to embodiments of the present disclosure.

FIG. 21 illustrates another example of a MAC CE for common beam (TCI State) indication wherein a single TCI state is indicated 2100. The example of a MAC CE for common beam (TCI State) indication 2100 is for illustration only. FIG. 21 does not limit the scope of this disclosure to any particular implementation of the example of a MAC CE for common beam (TCI State) indication 2100.

Figure 22:
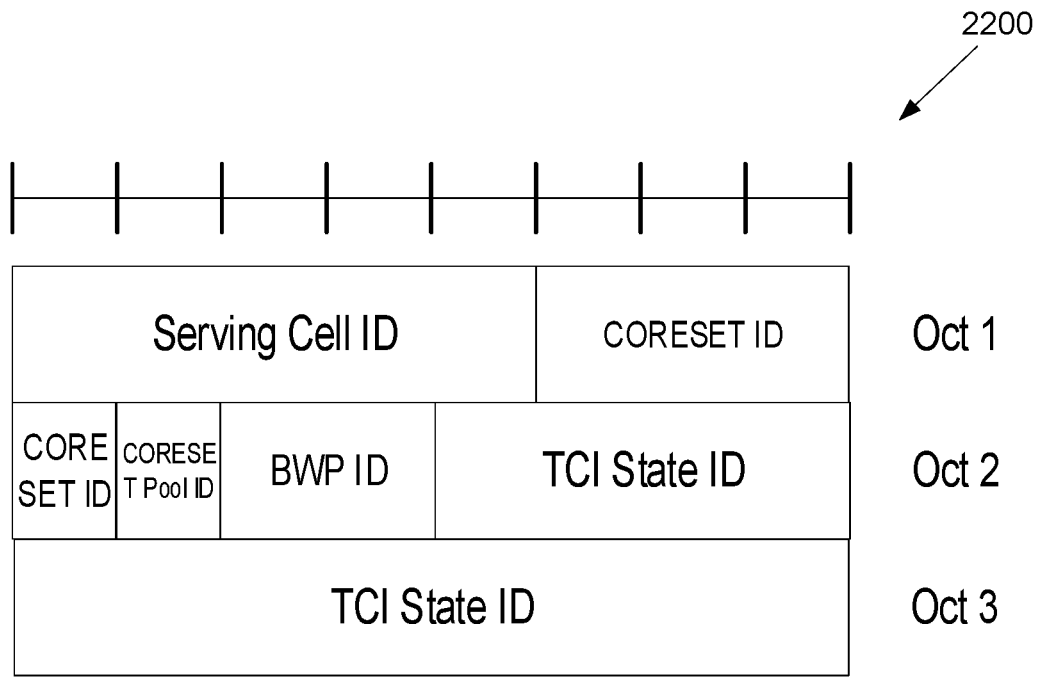
FIG. 22 illustrates yet another example of a MAC CE for common beam (TCI State) indication wherein a single TCI state is indicated according to embodiments of the present disclosure.

FIG. 22 illustrates yet another example of a MAC CE for common beam (TCI State) indication wherein a single TCI state is indicated 2200. The example of a MAC CE for common beam (TCI State) indication 2200 is for illustration only. FIG. 22 does not limit the scope of this disclosure to any particular implementation of the example of a MAC CE for common beam (TCI State) indication 2200.

Figure 23:
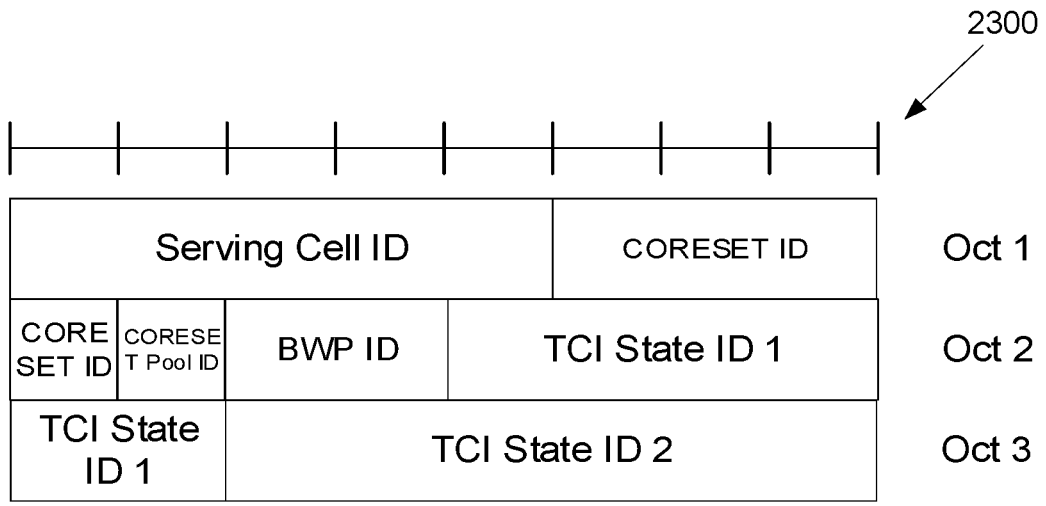
FIG. 23 illustrates an example of a MAC CE for common beam (TCI State) indication wherein two TCI states are indicated according to embodiments of the present disclosure.

FIG. 23 illustrates an example of a MAC CE for common beam (TCI State) indication wherein two TCI states are indicated 2300. The example of a MAC CE for common beam (TCI State) indication 2300 is for illustration only. FIG. 23 does not limit the scope of this disclosure to any particular implementation of the example of a MAC CE for common beam (TCI State) indication 2300.

Figure 24:
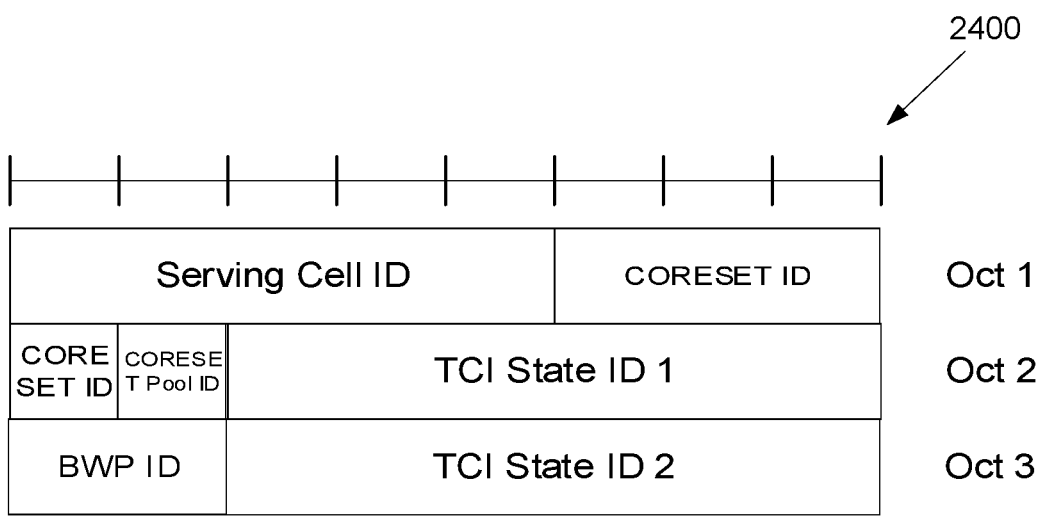
FIG. 24 illustrates another example of a MAC CE for common beam (TCI State) indication wherein two TCI states are indicated according to embodiments of the present disclosure.

FIG. 24 illustrates another example of a MAC CE for common beam (TCI State) indication wherein two TCI states are indicated 2400. The example of a MAC CE for common beam (TCI State) indication 2400 is for illustration only. FIG. 24 does not limit the scope of this disclosure to any particular implementation of the example of a MAC CE for common beam (TCI State) indication 2400.

As described above, some examples of the MAC CE are shown in FIG. 17 through FIG. 22, wherein a single TCI state is indicated, which for example can be used for all DL and UL control and data channels (and RSs). A few examples of the MAC CE are shown in FIG. 23 and FIG. 24, wherein two TCI states (1 and 2) are indicated, one of them for example can be used for all DL control and data channels (and RSs), and the other can be used for all UL control and data channels (and RSs).

Any of the above variation embodiments can be utilized independently or in combination with at least one other variation embodiment.

Figure 25:
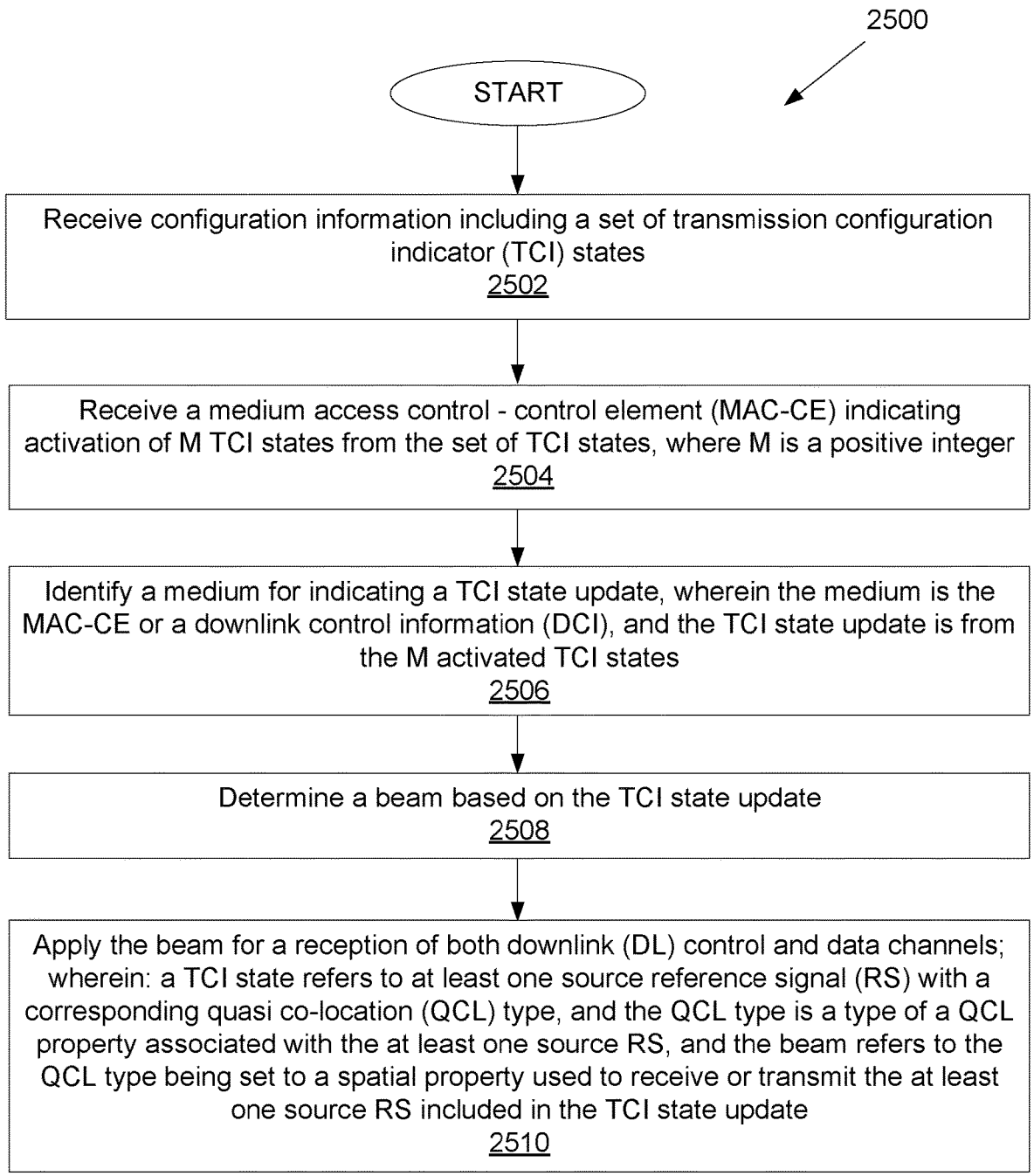
FIG. 25 illustrates a flow chart of a method for operating a UE according to embodiments of the present disclosure.

FIG. 25 illustrates a flow chart of a method 2500 for operating a user equipment (UE), as may be performed by a UE such as UE 116, according to embodiments of the present disclosure. The embodiment of the method 2500 illustrated in FIG. 25 is for illustration only. FIG. 25 does not limit the scope of this disclosure to any particular implementation.

As illustrated in FIG. 25, the method 2500 begins at step 2502. In step 2502, the UE (e.g., 111-116 as illustrated in FIG. 1) receives configuration information including a set of transmission configuration indicator (TCI) states.

In step 2504, the UE receives a medium access control-control element (MAC-CE) indicating activation of M TCI states from the set of TCI states, where M is a positive integer.

In step 2506, the UE identifies a medium for indicating a TCI state update, wherein the medium is the MAC-CE or a downlink control information (DCI), and the TCI state update is from the M activated states;

In step 2508, the UE determines a beam based on the TCI state update.

In step 2510, the UE applies the beam for a reception of both downlink (DL) control and data channels; wherein a TCI state refers to at least one source reference signal (RS) with a corresponding quasi co-location (QCL) type; the QCL type is a type of a QCL property associated with the at least one source RS; and the beam refers to the QCL type being set to a spatial property used to receive or transmit the at least one source RS included in the TCI state update.

In one embodiment, wherein the medium is determined based on a condition on a value of M.

In one embodiment, the condition corresponds to whether M≤t or M>t, where t is a threshold.

In one embodiment, t=1, and: when M=1, the medium is the MAC-CE that activates the M TCI states, and the M activated TCI states corresponds to a single activated TCI state that also corresponds to the TCI state update; and when M>1, the medium is the DCI.

In one embodiment, the medium is identified based on an information included in the configuration information.

In one embodiment, in response to the TCI state update indicating a joint TCI state for both DL and uplink (UL), the processor is configured to apply the beam for a transmission of both UL control and data channels.

In one embodiment, in response to the TCI state update indicating two separate TCI states for DL and UL, a DL TCI state and an UL TCI state, respectively, the processor is configured to: determine the beam based on the DL TCI state, determine an UL transmit beam based on the UL TCI state, and apply the UL transmit beam for a transmission of both UL control and data channels, wherein: the UL TCI state is indicated from N UL TCI states that are activated via the MAC-CE, the N UL TCI states are activated from a second set of TCI states, where N>1, and the medium is determined based on a condition that depends on both of or one of a value of M and a value of N.

Figure 26:
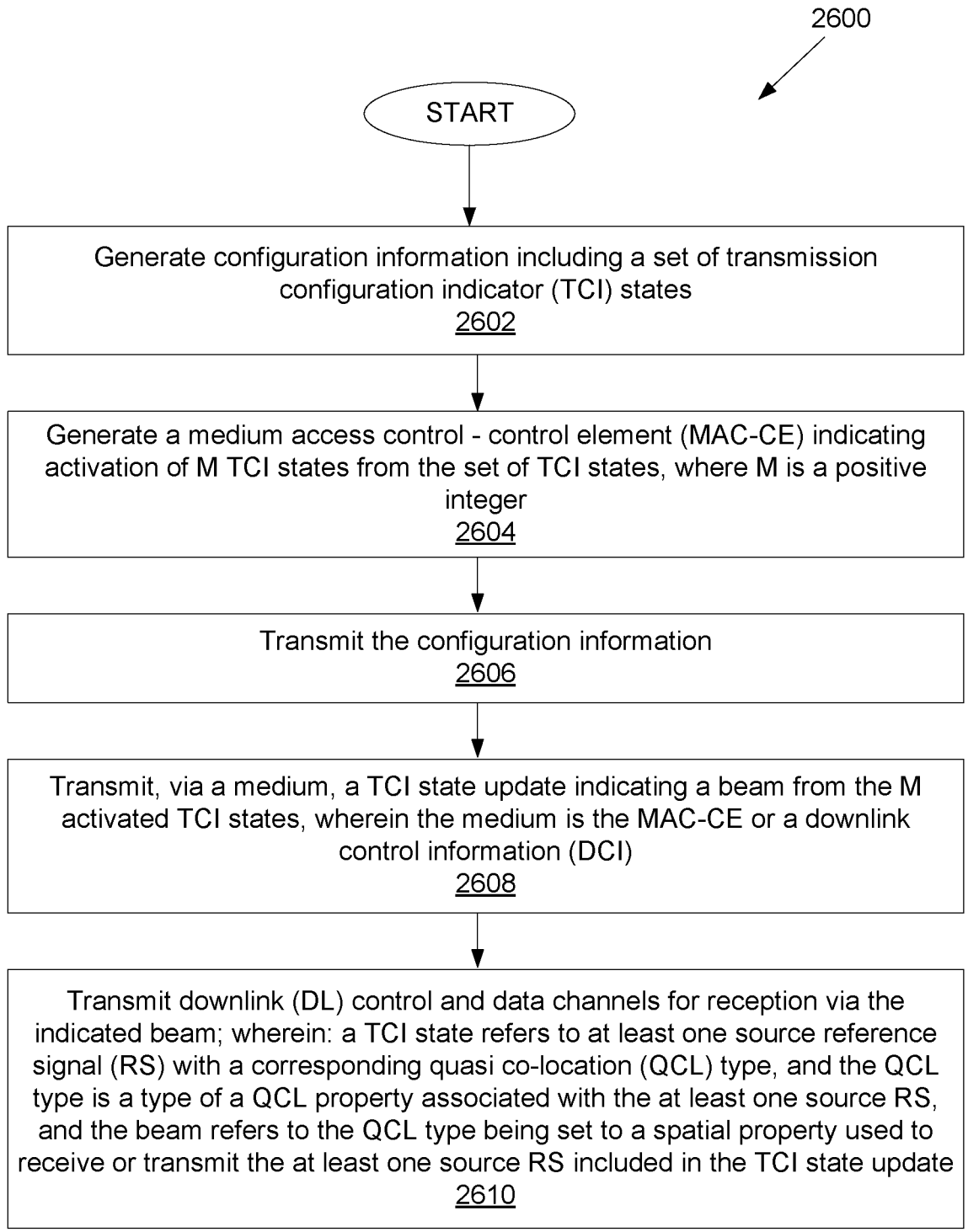
FIG. 26 illustrates a flow chart of a method for operating a BS according to embodiments of the present disclosure.

FIG. 26 illustrates a flow chart of another method 2600, as may be performed by a base station (BS) such as BS 102, according to embodiments of the present disclosure. The embodiment of the method 2600 illustrated in FIG. 26 is for illustration only. FIG. 26 does not limit the scope of this disclosure to any particular implementation.

As illustrated in FIG. 26, the method 2600 begins at step 2602. In step 2602, the BS (e.g., 101-103 as illustrated in FIG. 1), generates configuration information including a set of transmission configuration indicator (TCI) states.

In step 2604, the BS generates a medium access control-control element (MAC-CE) indicating activation of M TCI states from the set of TCI states, where M is a positive integer.

In step 2606, the BS transmits the configuration information.

In step 2608, the BS transmits, via a medium, a TCI state update indicating a beam from the M activated TCI states, wherein the medium is the MAC-CE or a downlink control information (DCI).

In step 2610, the BS transmits downlink (DL) control and data channels for reception via the indicated beam; wherein a TCI state refers to at least one source reference signal (RS) with a corresponding quasi co-location (QCL) type; the QCL type is a type of a QCL property associated with the at least one source RS; and the beam refers to the QCL type being set to a spatial property used to receive or transmit the at least one source RS included in the TCI state update.

In one embodiment, the medium is indicated based on a condition on a value of M.

In one embodiment, the condition corresponds to whether M≤t or M>t, where t is a threshold.

In one embodiment, t=1, and: when M=1, the medium is the MAC-CE that activates the M TCI states, and the M activated TCI states corresponds to a single activated TCI state that also corresponds to the TCI state update; and when M>1, the medium is the DCI.

In one embodiment, the medium is indicated based on an information included in the configuration information.

In one embodiment, in response to the TCI state update indicating a joint TCI state for both DL and uplink (UL), the transceiver is configured to receive an UL control and data channels transmitted via the indicated beam.

In one embodiment, in response to the TCI state update indicating two separate TCI states for DL and UL, a DL TCI state and an UL TCI state, respectively, the transceiver is configured to: transmit DL control and data channels for reception via the beam indicated by the DL TCI state, receive UL control and data channels transmitted via an UL transmit beam indicated by the UL TCI state, wherein: the UL TCI state is indicated from N UL TCI states that are activated via the MAC-CE, the N UL TCI states are activated from a second set of TCI states, where N≥1, and the medium is indicated based on a condition that depends on both of or one of a value of M and a value of N.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to:
receive configuration information including a set of transmission configuration indicator (TCI) states, and
receive a medium access control-control element (MAC-CE) indicating activation of M TCI states from the set of TCI states, where M is a positive integer; and
a processor operably coupled to the transceiver, the processor configured to:
identify a medium for receiving an indication indicating a TCI state update, wherein the medium is the MAC-CE or a downlink control information (DCI), and the TCI state update is from the M activated TCI states,
determine a beam based on the TCI state update, and
apply the beam for a reception of both downlink (DL) control and data channels,
wherein:
the identification of the medium is based on a value of M,
a TCI state refers to at least one source reference signal (RS) with a corresponding quasi co-location (QCL) type,
the QCL type is a type of a QCL property associated with the at least one source RS, and
the beam refers to the QCL type being set to a spatial property used to receive or transmit the at least one source RS included in the TCI state update.

2. The UE of claim 1, wherein the value of M is based on whether M≤t or M>t, where t is a threshold.

3. The UE of claim 2, wherein t=1, and:
when M=1, the medium is the MAC-CE that activates the M TCI states, and the M activated TCI states corresponds to a single activated TCI state that also corresponds to the TCI state update; and
when M>1, the medium is the DCI.

4. The UE of claim 1, wherein the medium is identified based on an information included in the configuration information.

5. The UE of claim 1, wherein the TCI state update indicates a joint TCI state for both DL and uplink (UL), and the processor is configured to apply the beam for a transmission of both UL control and data channels.

6. The UE of claim 1, wherein the TCI state update indicates two separate TCI states for DL and UL, a DL TCI state and an UL TCI state, respectively, and the processor is configured to:
determine the beam based on the DL TCI state,
determine an UL transmit beam based on the UL TCI state, and
apply the UL transmit beam for a transmission of both UL control and data channels,
wherein:
the UL TCI state is indicated from N UL TCI states that are activated via the MAC-CE,
the N UL TCI states are activated from a second set of TCI states, where N≥1, and
the identification of the medium is further based on a value of N.

7. A base station (BS) comprising:
a processor configured to:
generate configuration information including a set of transmission configuration indicator (TCI) states, and
generate a medium access control-control element (MAC-CE) indicating activation of M TCI states from the set of TCI states, where M is a positive integer; and
a transceiver operably coupled to the processor, the transceiver configured to:

transmit the configuration information, transmit, via a medium, an indication indicating a TCI state update, the TCI state update indicating a beam from the M activated TCI states, wherein the medium is the MAC-CE or a downlink control information (DCI) identified based on a value of M, and transmit downlink (DL) control and data channels for reception via the indicated beam, wherein:

a TCI state refers to at least one source reference signal (RS) with a corresponding quasi co-location (QCL) type, the QCL type is a type of a QCL property associated with the at least one source RS, and the beam refers to the QCL type being set to a spatial property used to receive or transmit the at least one source RS included in the TCI state update.

8. The BS of claim 7, wherein the value of M is based on whether M≤t or M>t, where t is a threshold.

9. The BS of claim 8, wherein t=1, and:

when M=1, the medium is the MAC-CE that activates the M TCI states, and the M activated TCI states corresponds to a single activated TCI state that also corresponds to the TCI state update; and when M>1, the medium is the DCI.

10. The BS of claim 7, wherein the medium is indicated based on an information included in the configuration information.

11. The BS of claim 7, wherein the TCI state update indicates a joint TCI state for both DL and uplink (UL), and the transceiver is configured to receive an UL control and data channels transmitted via the indicated beam.

12. The BS of claim 7, wherein:

the TCI state update indicates two separate TCI states for DL and UL, a DL TCI state and an UL TCI state, respectively, and the transceiver is configured to:

transmit DL control and data channels for reception via the beam indicated by the DL TCI state, and receive UL control and data channels transmitted via an UL transmit beam indicated by the UL TCI state, wherein:

the UL TCI state is indicated from N UL TCI states that are activated via the MAC-CE, the N UL TCI states are activated from a second set of TCI states, where N≥1, and identification of the medium is further based on a value of N.

13. A method for operating a user equipment (UE), the method comprising:

receiving configuration information including a set of transmission configuration indicator (TCI) states;

receiving a medium access control-control element (MAC-CE) indicating activation of M TCI states from the set of TCI states, where M is a positive integer;

identifying a medium for receiving an indication indicating a TCI state update, wherein the medium is the MAC-CE or a downlink control information (DCI), and the TCI state update is from the M activated TCI states;

determining a beam based on the TCI state update; and applying the beam for a reception of both downlink (DL) control and data channels, wherein:

identification of the medium is based on a value of M, a TCI state refers to at least one source reference signal (RS) with a corresponding quasi co-location (QCL) type, the QCL type is a type of a QCL property associated with the at least one source RS, and the beam refers to the QCL type being set to a spatial property used to receive or transmit the at least one source RS included in the TCI state update.

14. The method of claim 13, wherein the value of M is based on whether M≤t or M>t, where t is a threshold.

15. The method of claim 14, wherein t=1, and:

when M=1, the medium is the MAC-CE that activates the M TCI states, and the M activated TCI states corresponds to a single activated TCI state that also corresponds to the TCI state update; and when M>1, the medium is the DCI.

16. The method of claim 13, wherein the medium is identified based on an information included in the configuration information.

17. The method of claim 13, wherein:

the TCI state update indicates a joint TCI state for both DL and uplink (UL), and the method further comprises applying the beam for a transmission of both UL control and data channels.

\* \* \* \* \*